US008441576B2

(12) United States Patent
Nakajima et al.

(10) Patent No.: US 8,441,576 B2
(45) Date of Patent: May 14, 2013

(54) RECEIVING DEVICE, DELAY-INFORMATION TRANSMITTING METHOD IN RECEIVING DEVICE, AUDIO OUTPUT DEVICE, AND DELAY-CONTROL METHOD IN AUDIO OUTPUT DEVICE

(75) Inventors: Yasuhisa Nakajima, Kanagawa (JP); Hidekazu Kikuchi, Kanagawa (JP)

(73) Assignee: Sony Corporation (JP)

( * ) Notice: Subject to any disclaimer, the term of this patent is extended or adjusted under 35 U.S.C. 154(b) by 667 days.

(21) Appl. No.: 12/312,388

(22) PCT Filed: Nov. 7, 2007

(86) PCT No.: PCT/JP2007/071651
§ 371 (c)(1),
(2), (4) Date: Jan. 13, 2010

(87) PCT Pub. No.: WO2008/056709
PCT Pub. Date: May 15, 2008

(65) Prior Publication Data
US 2010/0128176 A1 May 27, 2010

(30) Foreign Application Priority Data

Nov. 7, 2006 (JP) .............................. P2006-301486
Feb. 28, 2007 (JP) .............................. P2007-050426
Sep. 18, 2007 (JP) .............................. P2007-240681

(51) Int. Cl.
*H04N 9/475* (2006.01)
(52) U.S. Cl.
USPC .......................................... 348/512; 348/515

(58) Field of Classification Search .......... 348/550–552, 348/500, 512, 515, 518
See application file for complete search history.

(56) References Cited

U.S. PATENT DOCUMENTS 7,636,126 B2 * 12/2009 Mallinson ..................... 348/515
7,716,410 B2 *  5/2010 Nagano et al. ................ 710/305
7,920,209 B2 *  4/2011 Mallinson ..................... 348/515
(Continued)

FOREIGN PATENT DOCUMENTS

EP      1657929 A1 *  5/2006
EP      1675345 A2    6/2006
(Continued)

OTHER PUBLICATIONS

Supplementary European Search Report EP 07831382, dated Jul. 1, 2010.
(Continued)

*Primary Examiner* — Jefferey Harold
*Assistant Examiner* — Humam Satti
(74) *Attorney, Agent, or Firm* — Lerner, David, Littenberg, Krumholz & Mentlik, LLP

(57) ABSTRACT

A television receiver computes a delay time of an image displayed on the television receiver with respect to an audio signal transmitted from the television receiver to an audio amplifier, based on video delay information as EDID data, delay information transported from a disc recorder and information of a time required until audio data received from the disc recorder is transmitted to an audio amplifier. The audio amplifier controls a delay time lasting until the audio responsive to the received audio data is outputted so that the delay time matches the aforementioned delay time. Thereby, the displayed image in the television receiver and the audio output in the audio amplifier are synchronized.

17 Claims, 31 Drawing Sheets

U.S. PATENT DOCUMENTS

| | | | |
|---|---|---|---|
| 2002/0140859 A1* | 10/2002 | Kariatsumari | 348/515 |
| 2002/0174440 A1 | 11/2002 | Usuba et al. | |
| 2003/0128294 A1* | 7/2003 | Lundblad et al. | 348/515 |
| 2004/0095509 A1 | 5/2004 | Okamoto et al. | |
| 2005/0182876 A1 | 8/2005 | Kim et al. | |
| 2006/0012710 A1* | 1/2006 | Sasaki | 348/515 |
| 2006/0095401 A1* | 5/2006 | Krikorian et al. | 707/1 |
| 2006/0156376 A1 | 7/2006 | Mukaide et al. | |
| 2006/0290810 A1* | 12/2006 | Mallinson | 348/515 |
| 2008/0138032 A1* | 6/2008 | Leyendecker et al. | 386/66 |
| 2009/0073316 A1* | 3/2009 | Ejima | 348/515 |
| 2009/0135300 A1* | 5/2009 | Suzuki | 348/515 |

FOREIGN PATENT DOCUMENTS

| | | | |
|---|---|---|---|
| JP | 62-75653 | | 5/1987 |
| JP | 2-082887 | A | 3/1990 |
| JP | 02-206249 | A | 8/1990 |
| JP | 7-038860 | A | 2/1995 |
| JP | 11-317916 | A | 11/1999 |
| JP | 2000-165824 | A | 6/2000 |
| JP | 2001057567 | A | 2/2001 |
| JP | 2001-320479 | A | 11/2001 |
| JP | 2002-077825 | A | 3/2002 |
| JP | 2002-290932 | A | 10/2002 |
| JP | 2003-101958 | A | 4/2003 |
| JP | 2004254027 | A | 9/2004 |
| JP | 2004294437 | A | 10/2004 |
| JP | 2004356752 | A | 12/2004 |
| JP | 2005135433 | A | 5/2005 |
| JP | 2005143033 | A | 6/2005 |
| JP | 2006-033436 | A | 2/2006 |
| JP | 2006-107292 | A | 4/2006 |
| JP | 2006-140776 | A | 6/2006 |
| JP | 2006-186544 | A | 7/2006 |
| JP | 2006191161 | A | 7/2006 |
| JP | 2006203800 | A | 8/2006 |
| JP | 2006245949 | A | 9/2006 |
| JP | 2006-295822 | A | 10/2006 |
| JP | 04-245817 | B2 | 4/2009 |
| WO | WO-02/078336 | A1 | 10/2002 |
| WO | 2005-064982 | A1 | 7/2005 |
| WO | WO 2005064982 | A1 * | 7/2005 |
| WO | 2006025441 | A1 | 3/2006 |
| WO | 2006-057324 | A1 | 6/2006 |
| WO | WO 2006057324 | A1 * | 6/2006 |
| WO | WO-2006/118106 | A1 | 11/2006 |
| WO | WO 2006118106 | A1 * | 11/2006 |

OTHER PUBLICATIONS

IEEE Standard for Information Technology Telecommunications, Supplement to Carrier Sense Multiple Access with Collision Detection (CSMA/CD)Access Method and Physical Layer Specifications. Physical Layer Parameters and Specifications for 1000 Mb/s Operation Over 4- Pair of Category 5. Balanced Copper Cabling, Type 1000 BASE-T.

Communication pursuant to Article 94 (3) EPC, from European Application No. 07831380.6-2202, dated Jun. 18, 2012.

Communication pursuant to Article 94 (3) EPC, from European Application No. 07831382.2-2202, dated Jun. 21, 2012.

"High—Definition Multimedia Interface Specification Version 1.3". Internet Citation, Jun. 22, 2006, XP002391813, Retrieved from the Internet: URL:http://www.hdmi.org/download/HDMI_Spec_1.3_GM1.pdf [retrieved on Jul. 24, 2006].

Office Action from Japanese Application No. 2008-543113, dated Jul. 10, 2012.

Office Action from Japanese Application No. 2008-543106, dated Apr. 17, 2012.

Office Action from Japanese Application No. 2008-543113, dated Jan. 8, 2013.

Office Action from Japanese Application No. 2008-543112, dated Nov. 27, 2012.

Office Action from Japanese Application No. 2008-543096, dated Nov. 22, 2012.

Office Action from Japanese Application No. 2008-543107, dated Mar. 19, 2013.

* cited by examiner

FIG. 8

| PIN | SIGNAL ASSIGNMENT |
|---|---|
| 1 | TMDS DATA2+ |
| 3 | TMDS DATA2- |
| 5 | TMDS DATA1 SHIELD |
| 7 | TMDS DATA0+ |
| 9 | TMDS DATA0- |
| 11 | TMDS CLOCK SHIELD |
| 13 | CEC |
| 15 | SCL |
| 17 | DDC/CEC GROUND |
| 19 | HOT PLUG DETECT |

| PIN | SIGNAL ASSIGNMENT |
|---|---|
| 2 | TMDS DATA2 SHIELD |
| 4 | TMDS DATA1+ |
| 6 | TMDS DATA1- |
| 8 | TMDS DATA0 SHIELD |
| 10 | TMDS CLOCK+ |
| 12 | TMDS CLOCK- |
| 14 | RESERVED (N.C. ON DEVICE) |
| 16 | SDA |
| 18 | +5V POWER |

FIG. 11

| BYTE# | 7 | 6 | 5 | 4 | 3 | 2 | 1 | 0 |
|---|---|---|---|---|---|---|---|---|
| 0 | PACKET TYPE (0X84) ||||||||
| 1 | VERSION NUMBER (0X01) ||||||||
| 2 | LENGTH (0X0A) ||||||||
| 3 | CHECKSUM ||||||||
| 4 | CODING TYPE |||| RESERVED | CHANNEL COUNT |||
| 5 | FORMAT DEPENDS ON CODING TYPE ||||||||
| 6 | CHANNEL / SPEAKER ALLOCATION ||||||||
| 7 | DWN MIX | LEVEL SHIFT VALUE |||| RESERVED (0) |||
| 8 | AUDIO LATENCY ||||||||
| 9...N | RESERVED(0) ||||||||

E-EDID DATA STRUCTURE

FIG. 16

| BYTE# | 7 | 6 | 5 | 4 | 3 | 2 | 1 | 0 |
|---|---|---|---|---|---|---|---|---|
| 0 | VENDOR-SPECIFIC TAG CODE (=3) | | | | LENGTH (=N) | | | |
| 1...3 | 24BIT IEEE REGISTRATION IDENTIFIER (0X000C03) LSB FIRST | | | | | | | |
| 4 | A | | | | B | | | |
| 5 | C | | | | D | | | |
| 6 | SUPPORTS-AI | DC_48BIT | DC_36BIT | DC_30BIT | DC_Y444 | RESERVED (0) | | DVI-DUAL |
| 7 | MAX_TMDS_CLOCK | | | | | | | |
| 8 | LATENCY | | FULL DUPLEX | HALF DUPLEX | RESERVED (0) | | | |
| 9 | VIDEO LATENCY | | | | | | | |
| 10 | AUDIO LATENCY | | | | | | | |
| 11 | INTERLACED VIDEO LATENCY | | | | | | | |
| 12 | INTERLACED AUDIO LATENCY | | | | | | | |
| 13...N | RESERVED (0) | | | | | | | |

FIG. 30

| BYTE# | 7 | 6 | 5 | 4 | 3 | 2 | 1 | 0 |
|---|---|---|---|---|---|---|---|---|
| 0 | VENDOR-SPECIFIC TAG CODE (=3) | | | | LENGTH (=N) | | | |
| 1...3 | 24BIT IEEE REGISTRATION IDENTIFIER (0X000C03) LSB FIRST | | | | | | | |
| 4 | A | | | | B | | | |
| 5 | C | | | | D | | | |
| 6 | SUPPORTS-AI | DC_48BIT | DC_36BIT | DC_30BIT | DC_Y444 | RESERVED (0) | | DVI-DUAL |
| 7 | MAX_TMDS_CLOCK | | | | | | | |
| 8 | LATENCY | | | VIDEO LATENCY | | RESERVED (0) | | |
| 9 | | | | AUDIO LATENCY | | | | |
| 10 | | | | | | | | |
| 11 | INTERLACED VIDEO LATENCY | | | | | | | |
| 12 | INTERLACED AUDIO LATENCY | | | | | | | |
| 13...N | RESERVED (0) | | | | | | | |

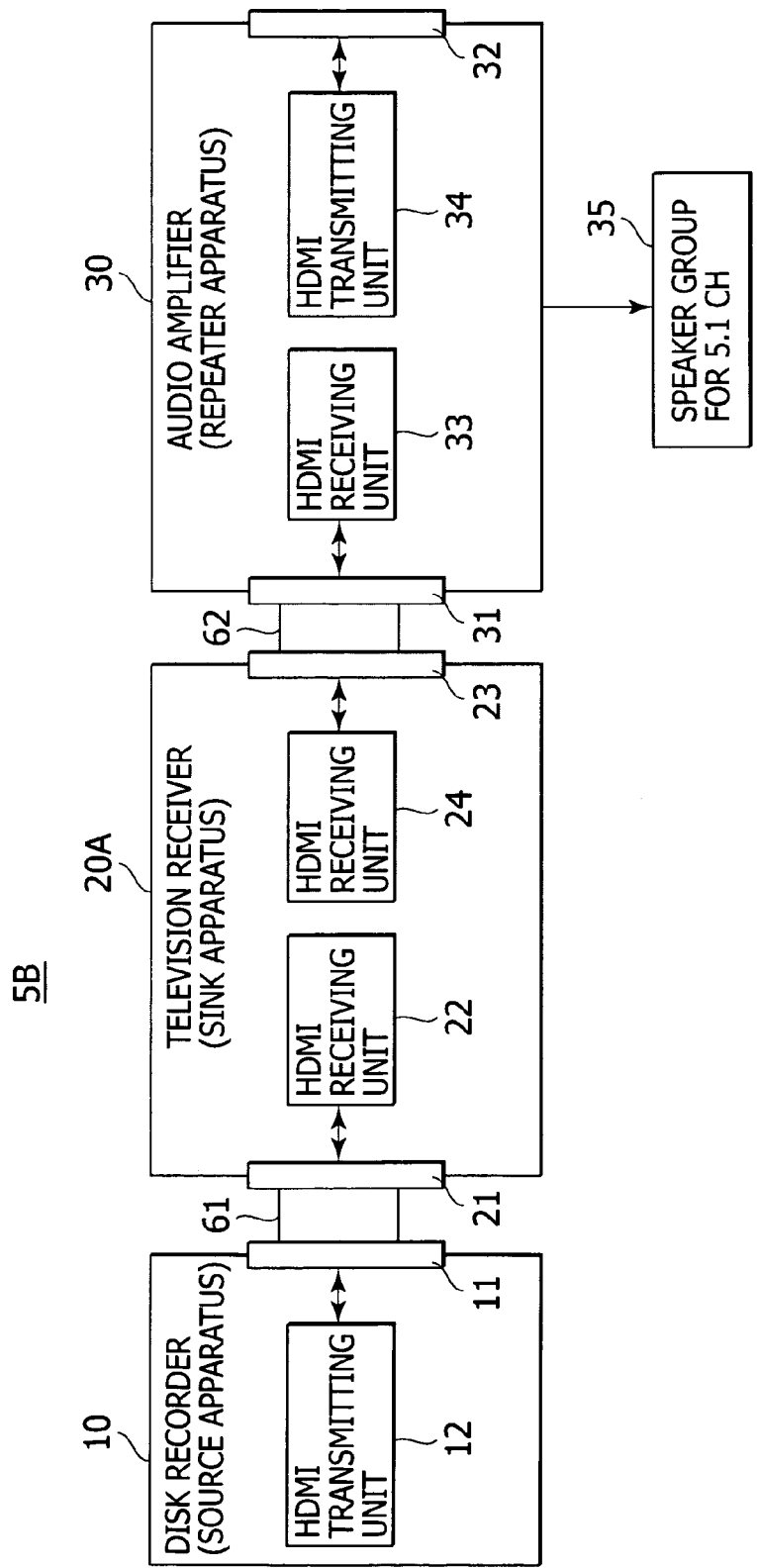

US 8,441,576 B2

RECEIVING DEVICE, DELAY-INFORMATION TRANSMITTING METHOD IN RECEIVING DEVICE, AUDIO OUTPUT DEVICE, AND DELAY-CONTROL METHOD IN AUDIO OUTPUT DEVICE

CROSS-REFERENCES TO RELATED APPLICATIONS

The present application is a national phase entry under 35 U.S.C. §371 of International Application No. PCT/JP2007/071651 filed Nov. 7, 2007, published on May 15, 2008 as WO 2008/056709 A1, which claims priority from Japanese Patent Application No. JP 2006-301486 filed in the Japanese Patent Office on Nov. 7, 2006, Japanese Patent Application No. JP 2007-050426 filed in the Japanese Patent Office on Feb. 28, 2007. and Japanese Patent Application No. JP 2007-240681 filed in the Japanese Patent Office on Sep. 18, 2007.

TECHNICAL FIELD

The present invention relates to a receiving device that receives video and audio signals from an external apparatus to perform image displaying and audio outputting, a delay-information transmitting method of the receiving device, an audio output device, and a delay-control method of the audio output device.

More specifically, the present invention relates to a device such as a receiving device that is capable of transmitting a received audio signal to another external apparatus. Such a receiving device computes a delay time of a displayed image with respect to a transmitted audio signal and transmits delay information indicating the delay time to the other external apparatus, thereby facilitating synchronization of audio output with the displayed image in the other external apparatus.

The present invention also relates to a device such as an audio output device that receives an audio signal from an external apparatus to output an audio. Such an audio output device receives delay information indicating a delay time of a displayed image in an external apparatus with respect to the received audio signal from the external apparatus and controls a delay time lasting until the audio responsive to the received audio signal is outputted so that the delay time matches a delay time indicated by the received delay information. The audio output device thus facilitates synchronization of the audio output with the displayed image in the external apparatus.

BACKGROUND ART

Recently, HDMI (High Definition Multimedia Interface) has been in widespread use as a communication interface for transporting at high speed a digital video signal from an AV source (Audio Visual source) such as a DVD (Digital Versatile Disc) recorder or a set top box to a display such as a television receiver or a projector. For example, the digital video signal is a non-compressed (baseband) video signal (hereinafter, referred to as "image data") with a digital audio signal (hereinafter, referred to as "audio data") accompanying the video signal. For example, Patent Document 1 describes in detail the HDMI standard.

FIG. 27 shows a configuration example of an AV (Audio Visual) system 5.

The AV system 5 includes a disc recorder 10 as a source apparatus and a television receiver 20 as a sink apparatus. The disc recorder 10 and the television receiver 20 are connected via an HDMI cable 61. In the disc recorder 10, an HDMI terminal 11 connected with an HDMI transmitting unit (HDMI TX) 12 is arranged. In the television receiver 20, an HDMI terminal 21 connected with an HDMI receiving unit (HDMI RX) 22 is arranged. One end of the HDMI cable 61 is connected to the HDMI terminal 11 of the disc recorder 10, and the other end of the HDMI cable 61 is connected to the HDMI terminal 21 of the television receiver 20.

In the AV system 5 shown in FIG. 27, a video signal and an audio signal reproduced in the disc recorder 10 are transmitted to the television receiver 20 via the HDMI cable 61. In the television receiver 20, image displaying and audio outputting are performed.

Content relating to a multi-channel audio is also present in the audio signal reproduced in the disc recorder 10, and thus, when the television receiver 20 is not able to decode the multi-channel audio, an audio amplifier 30, as a repeater apparatus, is connected between the disc recorder 10 and the television receiver 20 so as to solve this problem, as shown in FIG. 28.

That is, in the audio amplifier 30, an HDMI terminal 31 connected with an HDMI receiving unit (HDMI RX) 33 is arranged, and besides, an HDMI terminal 32 connected with an HDMI transmitting unit (HDMI TX) 34 is arranged. One end of the HDMI cable 61 is connected to the HDMI terminal 11 of the disc recorder 10, and the other end of the HDMI cable 61 is connected to the HDMI terminal 31 of the audio amplifier 30. Furthermore, one end of an HDMI cable 62 is connected to the HDMI terminal 32 of the audio amplifier 30, and the other end of the HDMI cable 62 is connected to the HDMI terminal 21 of the television receiver 20.

In an AV system 5A shown in FIG. 28, a video signal reproduced in the disc recorder 10 is supplied to the television receiver 20 via the HDMI cable 61, the audio amplifier 30, and the HDMI cable 62, and an image is displayed in the television receiver 20. On the other hand, an audio signal reproduced in the disc recorder 10 is supplied to the audio amplifier 30 via the HDMI cable 61, and after the audio signal is processed in the audio amplifier 30, the processed signal is supplied to an externally mounted 5.1 channel speaker group, for example, and audio is outputted in the speaker group 35.

In the case of the AV system 5A shown in FIG. 28, without taking into consideration a process delay of the video signal and the audio signal generated in the audio amplifier 30 and a process delay of the video signal and the audio signal generated in the television receiver 20, the displayed image cannot be synchronized with the outputted audio, and a disturbance of a so-called lip-sync takes place.

To synchronize the displayed image with the outputted audio, a process as shown in FIG. 29 is performed. That is, the television receiver (sink apparatus) 20 stores therein delay information (T2$v$=80, T2$a$=80) about video and audio in an internal EDID of HDMI. The audio amplifier 30 reads the delay information (T2$v$=80), and computes a delay time (T=T2$v$−T3$a$−T4$a$=30) of the displayed image with respect to an audio signal, based on delay time generated by the audio amplifier 30 (T3$a$=50) and delay information (T4$a$=20) of the disc recorder (source apparatus) 10. Thereafter, the audio amplifier 30 internally delays the audio signal by only the calculated delay time so as to synchronize the displayed image and the outputted audio.

FIG. 30 shows a data structure of Vendor Specific Data Block in a storage region of the EDID of the sink apparatus.

In data represented by "Vender Specific", 0-th to N-th blocks, each of which is 1-byte block, are arranged.

In the 0-th block (Byte0) at a head of data represented by "Vender Specific", information indicating a header indicating a data region of the data "Vender Specific" represented by "Vendor-Specific tag code (=3)" and information indicating a length of the data "Vender Specific" represented by "Length (=N)" are placed.

In the first block (Byte1) to the third block (Byte3), information indicating a number "0x000c03" registered for the HDMI, represented by "24 bit IEEE Registration Identifier (0x000C03) LSB first", is placed. Further, in the fourth block (Byte4) and the fifth block (Byte5), 24-bit information indicating physical addresses of the sink apparatus, each represented by "A", "B", "C", and "D", is placed.

In the sixth block (Byte6), a flag, represented by "Supports-AI", indicating a function which the sink apparatus supports, pieces of information, which are represented by "DC-48 bit", "DC-36 bit", and "DC-30 bit", respectively, designating a bit number per pixel, a flag, represented by "DC-Y444", indicating whether the sink apparatus supports a transport of an image of YCbCr 4:4:4, and a flag, represented by "DVI-Dual", indicating whether the sink apparatus supports a dual DVI (Digital Visual Interface) are placed.

Also, in the seventh block (Byte7), information, represented by "Max-TMDS-Clock", indicating a maximum frequency of a pixel clock of TMDS is placed. Further, in 2-bit MSB of the eighth block (Byte8), a flag (indicating whether or not values in the Bytes 9 to 12 are effective), represented by "Latency", indicating presence or absence of delay information of video and audio is placed.

In the ninth block (Byte9) of the data represented by "Vender Specific", delay-time data of progressive video, represented by "Video Latency", is placed. In the tenth block (Byte10), delay-time data of audio accompanying the progressive video, represented by "Audio Latency", is placed. In the 11th block (Byte11), delay-time data of interlaced video, represented by "Interlaced Video Latency", is placed. In the 12th block (Byte12), delay-time data of the audio accompanying the interlaced video, represented by "Interlaced Audio Latency", is placed.

Incidentally, as shown in FIG. 31, when the disc recorder 10 is connected with not only the HDMI terminal 21 connected with the HDMI receiving unit 22 but also with the television receiver 20A in which the HDMI terminal 23 connected with the HDMI receiving unit 24 is arranged, it is possible to consider a configuration that the HDMI terminal 23 of the television receiver 20A is connected with the audio amplifier 30 via the HDMI cable 62. In this case, from the television receiver 20A to the audio amplifier 30, the audio data is sent via Ethernet (not shown), for example.

In an AV system 5B shown in FIG. 31, when the aforementioned process as shown in FIG. 29 is employed, it is not possible to synchronize the displayed image and the outputted audio. That is, when computing the delay time of the audio signal with respect to the displayed image, the audio amplifier 30 needs to consider not only the delay time generated by itself, and delay information of the disc recorder (source apparatus) 10 but also a time required for processes such as encryption of the television receiver 20A for transmitting the audio signal to the audio amplifier 30.

Patent Document 2 describes a lip-sync function embodied using CEC control. Also, Patent Document 3 describes that adjustment for a delay time is performed in an apparatus inserted between a source apparatus and a sink apparatus. Furthermore, Patent Document 4 describes a delay matching, performed in a source apparatus, between a video signal and an audio signal.

[Patent Document 1] WO2002/078336
[Patent Document 2] Japanese Unexamined Patent Application Publication No. 2006-33436
[Patent Document 3] Japanese Unexamined Patent Application Publication No. 2006-186544
[Patent Document 4] WO2002/077825

DISCLOSURE OF INVENTION

Technical Problem

In the techniques described in the aforementioned Patent Document 2 to Patent Document 4, the complete lip-sync function cannot work in connection examples other than a recommended connection example as shown in the AV system 5A in FIG. 28. That is, in the techniques described in the Patent Document 2 to Patent Document 4, the lip-sync function cannot work in a connection example as shown in the AV system 5B in FIG. 31.

An object of the present invention is to enable synchronization of an audio output with a displayed image to be facilitated when an audio output device receives supply of an audio signal from a sink apparatus, for example.

Technical Solution

A concept of the present invention lies in a receiving device, and the receiving device includes a signal receiving unit for receiving a video signal and an audio signal via a transport channel from an external apparatus, an image display unit for processing the video signal received by the signal receiving unit to display an image, an audio output unit for processing the audio signal received by the signal receiving unit to output an audio, a storage unit storing therein video delay information indicating a delay time lasting until the image responsive to the video signal received by the signal receiving unit is displayed on the image display unit and audio delay information indicating a delay time lasting until the audio responsive to the audio signal received by the signal receiving unit is outputted by the audio output unit, an audio-signal transmitting unit for transmitting the audio signal received by the signal receiving unit to another external apparatus different from the external apparatus via another transport channel different from the transport channel, a computing unit for computing a delay time of the image displayed on the image display unit with respect to the audio signal to be transmitted from the audio-signal transmitting unit, based on at least the video delay information stored in the storage unit and information of a time required until the audio signal received by the signal receiving unit is transmitted by the audio-signal transmitting unit, and a delay-information transmitting unit for transmitting, to the other external apparatus, delay information indicating the delay time obtained by the computing unit.

In the present invention, the audio signal received from the external apparatus is transmitted to another external apparatus by the audio-signal transmitting unit. In this case, the delay time of the displayed image with respect to the transmitted audio signal is computed by the computing unit, and the delay information indicating the delay time is transmitted to the other external apparatus by the delay-information transmitting unit. The other external apparatus controls the delay time of the audio signal so that the delay time of the audio signal matches the delay time indicated by the delay information, thereby enabling the audio output to be synchronized with the displayed image.

Furthermore, in the present invention, for example, there is further provided a delay-information receiving unit for receiving delay information indicating the delay time of the audio signal received by the signal receiving unit with respect to the video signal received by the signal receiving unit via the transport channel from the external apparatus. The computing unit may compute the delay time of the image displayed on the image display unit with respect to the audio signal transmitted from the audio-signal transmitting unit, based on the delay information received by the delay-information receiving unit in addition to the video delay information stored in the storage unit and the information of the time required until the audio signal received by the signal receiving unit is transmitted by the audio-signal transmitting unit. In this case, even if there is a time difference between the video signal and the audio signal received from the external apparatus, the synchronization of the audio output with respect to the displayed image is enabled in the other external apparatus.

Furthermore, a concept of the present invention lies in an audio output device, and the audio output device includes an audio-signal receiving unit for receiving an audio signal via a transport channel from an external apparatus, an audio output unit for processing the audio signal received by the audio-signal receiving unit to output an audio, a delay-information receiving unit for receiving, from the external apparatus delay, information indicating a delay time of a displayed image in the external apparatus with respect to the audio signal received by the audio-signal receiving unit, and a delay controller for controlling a delay time lasting until the audio by the audio signal received by the audio-signal receiving unit is outputted by the audio output unit so that the delay time matches a delay time indicated by the delay information received by the delay-information receiving unit.

In the present invention, the delay information indicating the delay time of the displayed image in the external apparatus with respect to the received audio signal is received by the delay-information receiving unit. Thus, the delay controller simply controls the delay time lasting until the audio responsive to the received audio signal is outputted so that the delay time matches the delay time indicated by the received delay information, and the synchronization of the audio output with the displayed image on the external apparatus is thus established.

Advantageous Effects

According to the present invention, the received audio signal can be transmitted to the other external apparatus. The delay time of the displayed image with respect to the transmitted audio signal is calculated, and the delay information indicating the delay time is transmitted to the other external apparatus. The synchronization of the audio output with a displayed image on the other external apparatus is thus facilitated.

Furthermore, according to the present invention, the audio signal from the external apparatus is received and the audio is output. The delay information indicating the delay time of the displayed image on the external apparatus with respect to the received audio signal is received from the external apparatus. The delay time lasting until the audio responsive to the received audio signal is outputted is controlled to the delay time indicated by the received delay information. The synchronization of the audio output with respect to the displayed image on the external apparatus is facilitated.

BRIEF DESCRIPTION OF DRAWINGS

FIG. 8 is a table showing a pin array (type A) of an HDMI terminal.

FIG. 11 is a diagram showing a data structure of Audio InfoFrame indicating an attribute of an audio signal outputted from the disc recorder.

FIG. 16 is a diagram showing a structure of an E-EDID Vendor Specific Data Block.

FIG. 30 is a diagram showing a structure of an E-EDID Vendor Specific Data Block.

FIG. 31 is a block diagram showing another configuration example of the AV system.

EXPLANATION OF REFERENCE NUMERALS

200 . . . AV system, 210 . . . Disc recorder, 211 . . . HDMI terminal, 212 . . . HDMI transmitting unit, 213 . . . High-speed data line interface, 250 . . . Television receiver, 251, 254 . . . HDMI terminal, 252, 255 . . . HDMI receiving unit, 253, 256 . . . High-speed data line interface, 310 . . . Audio amplifier, 311, 314 . . . HDMI terminal, 312 . . . HDMI receiving unit, 313, 316 . . . High-speed data line interface, 315 . . . HDMI transmitting unit, 350 . . . 5.1 channel speaker group, 351, 352 . . . HDMI cable

BEST MODE FOR CARRYING OUT THE INVENTION

Figure 1:
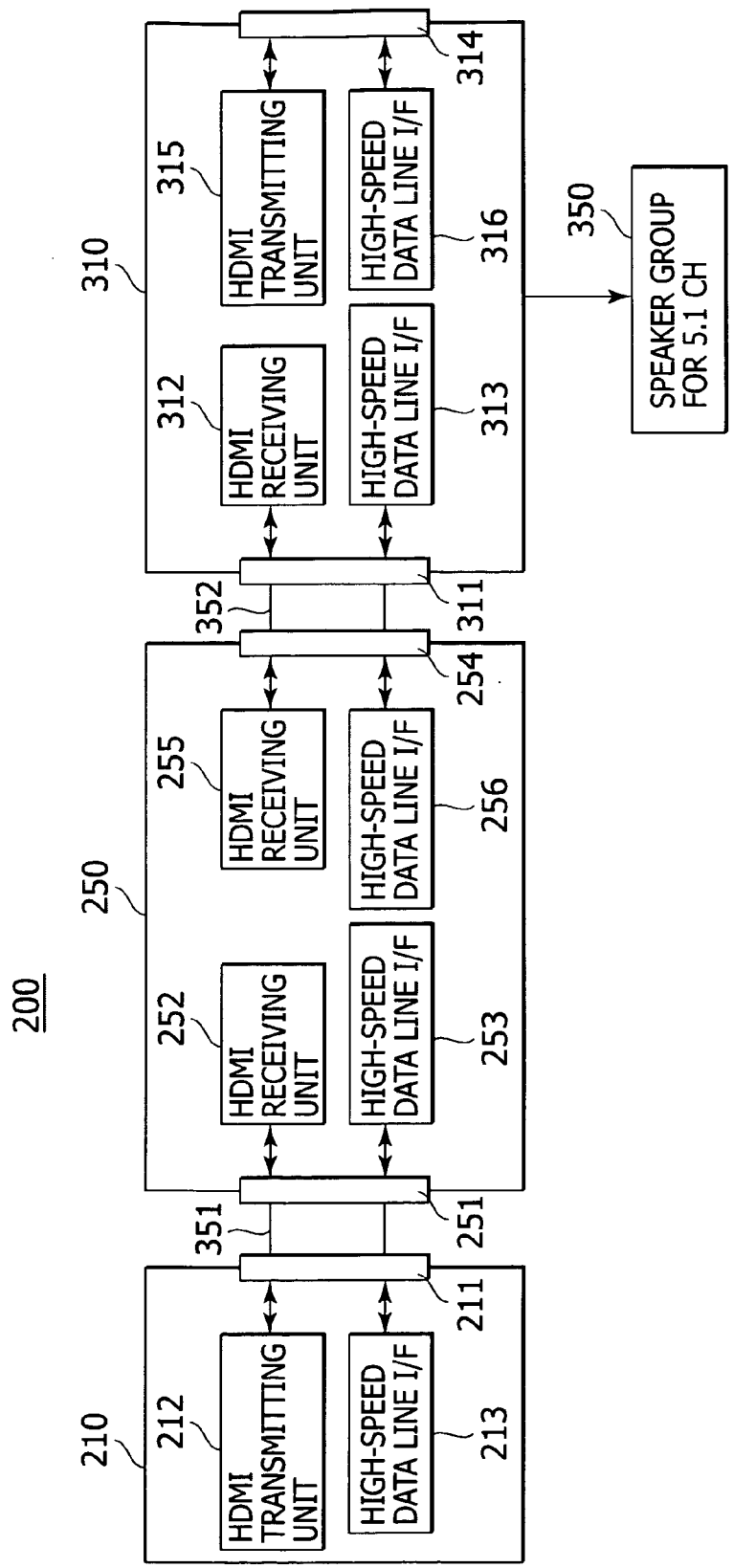
FIG. 1 is a block diagram showing a configuration example of an AV system as an embodiment of the present invention.

Hereinafter, with reference to drawings, an embodiment of the present invention will be described. FIG. 1 shows a configuration example of an AV (Audio Visual) system 200 as an embodiment.

The AV system 200 includes a disc recorder 210 as a source apparatus, a television receiver 250 as a sink apparatus, and an audio amplifier 310 as a repeater apparatus.

The disc recorder 210 and the television receiver 250 are connected via an HDMI cable 351. The disc recorder 210 is arranged with an HDMI terminal 211 connected with an HDMI transmitting unit (HDMI TX) 212 and a high-speed data line interface (I/F) 213. The television receiver 250 is arranged with an HDMI terminal 251 connected with an HDMI receiving unit (HDMI RX) 252 and a high-speed data line interface (I/F) 253. One end of the HDMI cable 351 is connected to the HDMI terminal 211 of the disc recorder 210, and the other end of the HDMI cable 351 is connected to the HDMI terminal 251 of the television receiver 250.

The television receiver 250 and the audio amplifier 310 are connected via an HDMI cable 352. The television receiver 250 is arranged with an HDMI terminal 254 connected with an HDMI receiving unit (HDMI TX) 255 and a high-speed data line interface (I/F) 256. The audio amplifier 310 is arranged with an HDMI terminal 311 connected with an HDMI receiving unit (HDMI RX) 312 and a high-speed data line interface (I/F) 313. One end of the HDMI cable 352 is connected to the HDMI terminal 254 of the television receiver 250, and the other end of the HDMI cable 352 is connected to the HDMI terminal 311 of the audio amplifier 310.

The audio amplifier 310 is further arranged with an HDMI terminal 314 connected with an HDMI transmitting unit (HDMI RX) 315 and a high-speed data line interface (I/F) 316. A 5.1 channel speaker group 350 is externally attached to the audio amplifier 310.

In the AV system 200 shown in FIG. 1, a video signal reproduced in the disc recorder 210 is supplied to the television receiver 250 via the HDMI cable 351, and the image is displayed on the television receiver 250.

When an audio responsive to an audio signal reproduced in the disc recorder 210 is outputted from a speaker (not shown) of the television receiver 250, the audio output is supplied to the television receiver 250 via the HDMI cable 351, and then, the audio is outputted from the speaker of the television receiver 250. On the other hand, when an audio of the audio signal reproduced in the disc recorder 210 is outputted from the speaker group 350 external to the audio amplifier 310, the audio signal is supplied to the television receiver 250 via the HDMI cable 351, and further supplied via the HDMI cable 352 to the audio amplifier 310, in which the supplied signal is processed. Thereafter, the resultant signal is supplied to the externally mounted 5.1 channel speaker group 350, and as a result, the audio is outputted from the speaker group 350.

Figure 2:
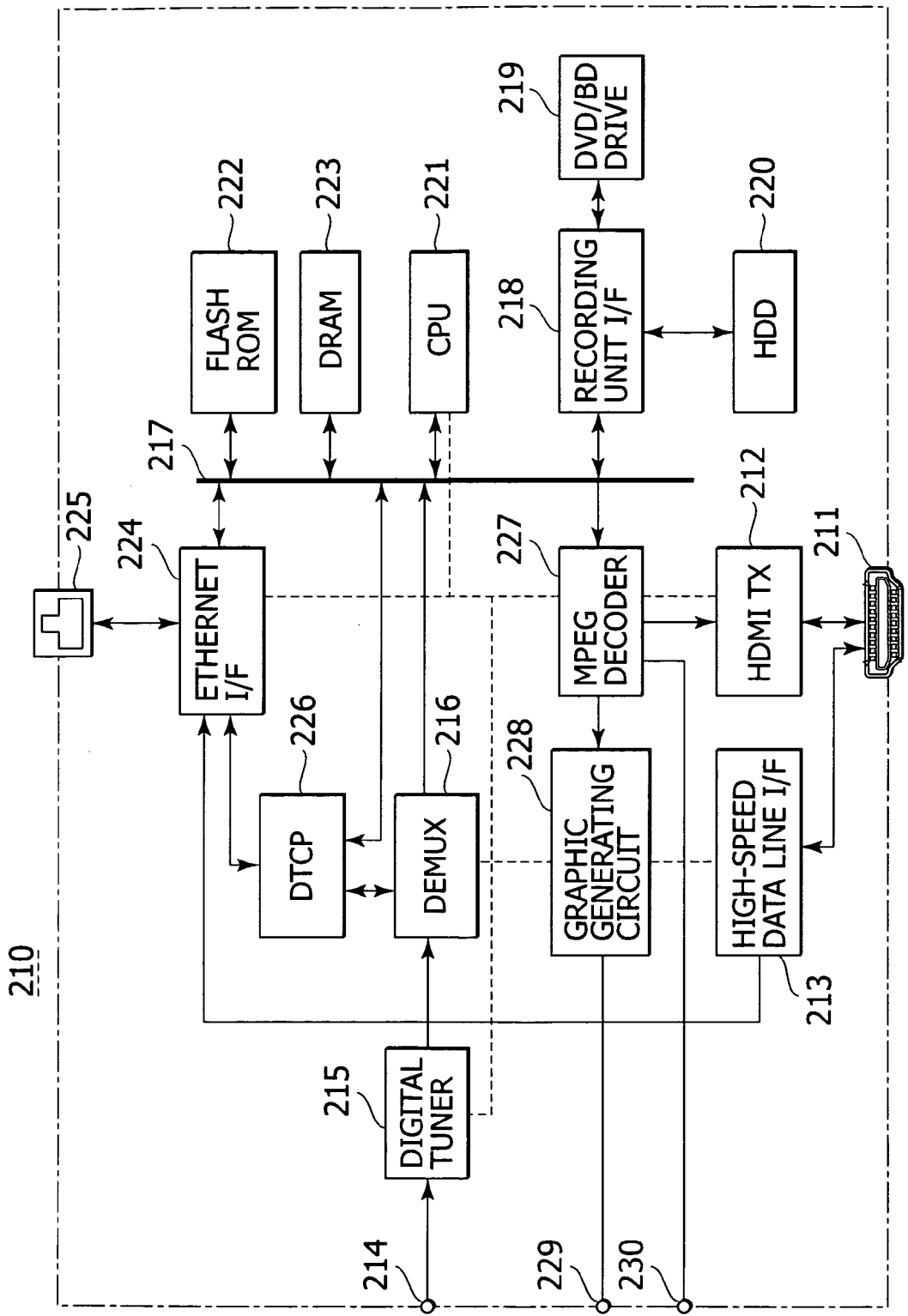
FIG. 2 is a block diagram showing a configuration example of a disc recorder (source apparatus) configuring the AV system.

FIG. 2 shows a configuration example of the disc recorder 210. The disc recorder 210 includes the HDMI terminal 211, the HDMI transmitting unit 212, the high-speed data line interface 213, an antenna terminal 214, a digital tuner 215, a demultiplexer 216, an internal bus 217, a recording-unit interface 218, a DVD/BD drive 219, an HDD (Hard Disk Drive) 220, a CPU (Central Processing Unit) 221, a flash ROM (Read Only Memory) 222, a DRAM (Dynamic Random Access Memory) 223, an Ethernet interface (Ethernet I/F) 224, a network terminal 225, a DTCP (Digital Transmission Content Protection) circuit 226, an MPEG decoder 227, a graphic generating circuit 228, a video output terminal 229, and an audio output terminal 230. It should be noted that the "Ethernet" is a registered trademark.

The HDMI transmitting unit (HDMI source) 212 sends out baseband video (image) and audio data from the HDMI terminal 211 according to a communication that complies with the HDMI. A detail of the HDMI transmitting unit 212 is described later. The high-speed data line interface 213 is a bi-directional communication interface using predetermined lines (in this embodiment, a reserved line and an HPD line) configuring the HDMI cable. A detail of the high-speed data line interface 213 is described later.

The antenna terminal 214 is a terminal for inputting a television broadcast signal received by a receiving antenna (not shown). The digital tuner 215 processes the television broadcast signal inputted to the antenna terminal 214 and outputs a predetermined transport stream. The demultiplexer 216 extracts, from the transport stream obtained by the digital tuner 215, a partial TS (Transport Stream) (a TS packet of video data and a TS packet of audio data) corresponding to a predetermined selected channel.

The demultiplexer 216 extracts PSI/SI (Program Specific Information/Service Information) from the transport stream obtained by the digital tuner 215, and outputs the PSI/SI to the CPU 221. A plurality of channels are multiplexed in the transport stream obtained by the digital tuner 215. A process of the demultiplexer 216 for extracting the partial TS of an arbitrary channel from the transport stream becomes enabled by obtaining information of a packet ID (PID) of the arbitrary channel from the PSI/SI (PAT/PMT).

The CPU 221, the flash ROM 222, the DRAM 223, the demultiplexer 216, the Ethernet interface 224, and the recording-unit interface 218 are connected to the internal bus 217. The DVD/BD drive 219 and the HDD 220 are connected to the internal bus 217 via the recording-unit interface 218. The DVD/BD drive 219 and the HDD 220 record the partial TS extracted by the demultiplexer 216. The DVD/BD drive 219 and the HDD 220 respectively reproduce the partial TS recorded in a recording medium.

The MPEG decoder 227 performs a decoding process on the video PES packet configuring the partial TS extracted by the demultiplexer 216 or reproduced in the DVD/BD drive 219 or the HDD 220 so as to obtain the video data. The MPEG decoder 227 performs a decoding process on the audio PES packet configuring the partial TS so as to obtain the audio data.

The graphic generating circuit 228 performs a superimposing process, etc., of graphics data, as needed, on the video data obtained in the MPEG decoder 227. The video output terminal 229 outputs the video data outputted from the graphic generating circuit 228. The audio output terminal 230 outputs the audio data obtained in the MPEG decoder 227.

The DTCP circuit 226 encrypts, as needed, the partial TS extracted by the demultiplexer 216 or the partial TS reproduced in the DVD/BD drive 219 or the HDD 220. Furthermore, the DTCP circuit 226 decodes the encrypted data supplied to the Ethernet interface 224 from the network terminal 225 or the high-speed data line interface 213.

The CPU 221 controls an operation of each element of the disc recorder 210. The flash ROM 222 stores control software and manages data. The DRAM 223 forms a working area of the CPU 221. The CPU 221 expands the software or the data read from the flash ROM 222 onto the DRAM 223 to start the software, and controls each element of the disc recorder 210.

An operation of the disc recorder 210 shown in FIG. 2 is briefly described.

The television broadcast signal inputted to the antenna terminal 214 is supplied to the digital tuner 215. In the digital tuner 215, the television broadcast signal is processed to extract a predetermined transport stream, and the predetermined transport stream is supplied to the demultiplexer 216. The demultiplexer 216 extracts the partial TS (the TS packet of the video data and the TS packet of the audio data) corresponding to a predetermined channel from the transport stream. The partial TS is supplied to the DVD/BD drive 219 or the HDD 220 via the recording-unit interface 218, and recorded therein in response to a recording instruction from the CPU 221.

As described above, the partial TS extracted by the demultiplexer 216 or the partial TS reproduced by the DVD/BD drive 219 or the HDD 220 is supplied to the MPEG decoder 227. The MPEG decoder 227 performs a decoding process on the video PES packet constructed of the TS packet of the video data, thereby resulting in the video data. The video data is subjected to a superimposing process, etc., of graphics data in the graphic generating circuit 228, and thereafter, outputted to the video output terminal 229. The MPEG decoder 227 performs a decoding process on the audio PES packet constructed of the TS packet of the audio data, thereby resulting in the audio data. The audio data is outputted to the audio output terminal 230.

The video (image) data and the audio data, obtained in the MPEG decoder 227, corresponding to the partial TS reproduced in the DVD/BD drive 219 or the HDD 220, are supplied to the HDMI transmitting unit 212, and sent out to the HDMI cable connected to the HDMI terminal 211.

An IP packet including a remote control code, transmitted through a predetermined line of the HDMI cable connected to the HDMI terminal 211, is received by the high-speed data line interface 213. The IP packet is supplied to the CPU 221 via the Ethernet interface 224. The CPU 221 controls each elements of the disc recorder 210 based on the remote control code if the remote control code included in the IP packet relates to control of the disc recorder 210.

When the partial TS extracted by the demultiplexer 216 or the partial TS reproduced by the DVD/BD drive 219 or the HDD 220 is sent out to a network, the partial TS is encrypted by the DTCP circuit 226, and thereafter, outputted to the network terminal 225 via the Ethernet interface 224.

Figure 3:
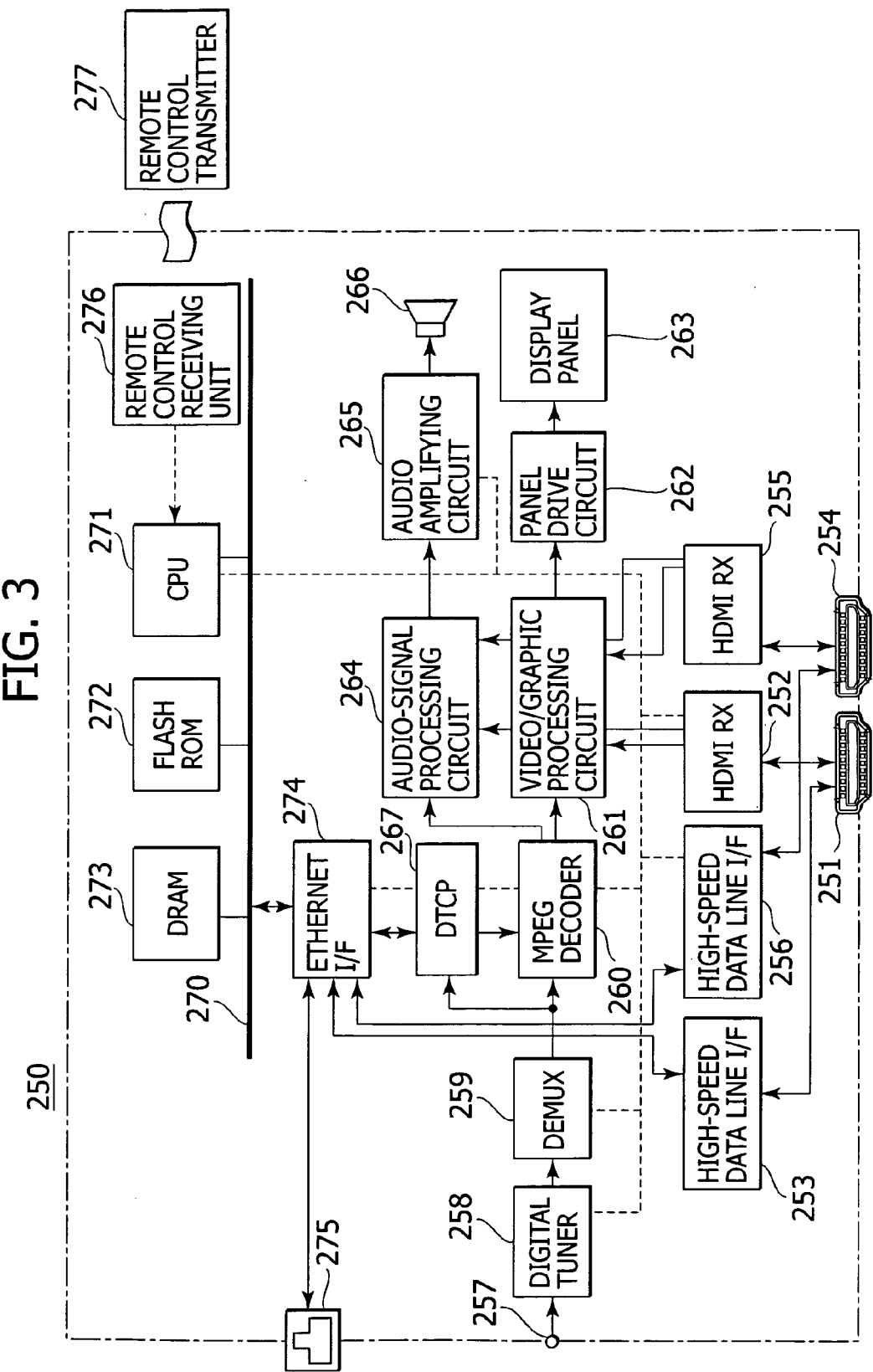
FIG. 3 is a block diagram showing a configuration example of a television receiver (sink apparatus) configuring the AV system.

FIG. 3 shows a configuration example of the television receiver 250. The television receiver 250 includes HDMI terminals 251 and 254, HDMI receiving units 252 and 255, high-speed data line interfaces 253 and 256, an antenna terminal 257, a digital tuner 258, a demultiplexer 259, an MPEG (Moving Picture Expert Group) decoder 260, a video/graphic processing circuit 261, a panel drive circuit 262, a display panel 263, an audio-signal processing circuit 264, an audio amplifying circuit 265, a speaker 266, a DTCP circuit 267, an internal bus 270, a CPU 271, a flash ROM 272, a DRAM 273, an Ethernet interface (I/F) 274, a network terminal 275, a remote control receiving unit 276, and a remote control transmitter 277.

The antenna terminal 257 is a terminal for inputting a television broadcast signal received by a receiving antenna (not shown). The digital tuner 258 processes the television broadcast signal inputted to the antenna terminal 257 and outputs a predetermined transport stream corresponding to a user's selected channel. The demultiplexer 259 extracts from the transport stream obtained by the digital tuner 258 a partial TS (Transport Stream) (a TS packet of video data and a TS packet of audio data) corresponding to the user's selected channel.

The demultiplexer 259 extracts PSI/SI (Program Specific Information/Service Information) from the transport stream obtained by the digital tuner 258, and outputs the PSI/SI to the CPU 271. A plurality of channels are multiplexed in the transport stream obtained by the digital tuner 258. A process of the demultiplexer 259 for extracting the partial TS of an arbitrary channel from the transport stream becomes enabled by obtaining information of a packet ID (PID) of the arbitrary channel from the PSI/SI (PAT/PMT).

The MPEG decoder 260 performs a decoding process on a video PES (Packetized Elementary Stream) packet constructed of the TS packet of the video data obtained by the demultiplexer 259, thereby resulting in the video data. Also, the MPEG decoder 260 performs a decoding process on an audio PES packet constructed of the TS packet of the audio data obtained by the demultiplexer 259, thereby resulting in the audio data. The MPEG decoder 260 may perform, as needed, a decoding process on the PES packet of the video and the audio obtained by decoding in the DTCP circuit 267, thereby resulting in the video data and the audio data.

The video/graphic processing circuit 261 may perform, as needed, a multi-screen process, a superimposing process of graphics data, etc., on the video data obtained by the MPEG decoder 260. The panel drive circuit 262 drives the display panel 263 in response to the video data outputted from the video/graphic processing circuit 261. The display panel 263 is constructed of an LCD (Liquid Crystal Display), a PDP (Plasma Display Panel), etc, for example. The audio-signal processing circuit 264 performs a necessary process, such as a D/A conversion on the audio data obtained by the MPEG decoder 260. The audio amplifying circuit 265 amplifies the audio signal outputted from the audio-signal processing circuit 264 and supplies the audio signal to the speaker 266.

The DTCP circuit 267 encrypts, as needed, the partial TS extracted by the demultiplexer 259. Furthermore, the DTCP circuit 267 decrypts the encrypted data supplied to the Ethernet interface 274 from the network terminal 275 or from the high-speed data line interfaces 253 and 256.

The CPU 271 controls an operation of each elements of the television receiver 250. The flash ROM 272 stores control software and manages data. The DRAM 273 forms a working area of the CPU 271. The CPU 271 expands the software or the data read from the flash ROM 272 onto the DRAM 273 to cause the software to start, and controls each element of the television receiver 250. The remote control receiving unit 276 receives a remo control signal (remote control code) transmitted from the remote control transmitter 277, and supplies the received signal to the CPU 271. The CPU 271, the flash ROM 272, the DRAM 273, and the Ethernet interface 274 are connected to the internal bus 270.

The HDMI receiving units (HDMI sink) 252 and 255 receive the baseband video (image) and audio data supplied to the HDMI terminals 251 and 254, according to a communication that complies with the HDMI. A detail of the HDMI receiving units 252 and 255 is described later. The high-speed data line interfaces 253 and 256 are bi-directional communication interfaces using predetermined lines (in this embodiment, a reserved line and an HPD line) configuring the HDMI cable. A detail of the high-speed data line interfaces 253 and 256 is described later.

An operation of the television receiver 250 shown in FIG. 3 is briefly described.

The television broadcast signal inputted to the antenna terminal 257 is supplied to the digital tuner 258. The digital tuner 258 processes the television broadcast signal, thereby outputting a predetermined transport stream corresponding to a user's selected channel, and the predetermined transport stream is supplied to the demultiplexer 259. The demultiplexer 259 extracts a partial TS (a TS packet of the video data and a TS packet of the audio data) corresponding to the user's selected channel from the transport stream, and supplies the partial TS to the MPEG decoder 260.

The MPEG decoder 260 performs a decoding process on the video PES packet constructed of the TS packet of the video data, thereby resulting in the video data. The video data is subjected, as needed, to a multi-screen process, a superimposing process of graphics data, etc., in the video/graphic processing circuit 261, and thereafter, the processed data is supplied to the panel drive circuit 262. As a result, an image corresponding to the user's selected channel is displayed on the display panel 263.

Also, the MPEG decoder 260 performs a decoding process on the audio PES packet constructed of the TS packet of the audio data, thereby resulting in the audio data. This audio data is subjected to a necessary process, such as a D/A conversion, in the audio-signal processing circuit 264, and further, amplified in the audio amplifying circuit 265, and then, supplied to the speaker 266. Thus, the audio corresponding to the user's selected channel is outputted from the speaker 266.

At the time of receiving the aforementioned television broadcast signal, when the partial TS extracted in the demultiplexer 259 is sent out to the network, the partial TS is encrypted in the DTCP circuit 267, and thereafter, outputted to the network terminal 275 via the Ethernet interface 274.

The remote control receiving unit 276 receives the remote control code (remo control signal) transmitted from the remote control transmitter 277, and the remote control code is supplied to the CPU 271. The CPU 271 controls each element of the television receiver 250 based on the remote control code if the remote control code relates to control of the television receiver 250.

The CPU 271 generates the IP packet including the remote control code supplied from the remote control receiving unit 276. The IP packet is outputted to the HDMI terminal 251 via the Ethernet interface 274 and the high-speed data line interface 253.

The IP packet is sent out to the network, as needed. In that case, the IP packet is outputted to the network terminal 275 via the Ethernet interface 274. The IP packet is also outputted to the HDMI terminals 251 and 254 via the Ethernet interface 274 and the high-speed data line interfaces 253 and 256.

The encrypted partial TS supplied from the network terminal 275 to the Ethernet interface 274 or supplied from the HDMI terminals 251 and 254 to the Ethernet interface 274 via the high-speed data line interfaces 253 and 256 is decrypted in the DTCP circuit 267, and thereafter, supplied to the MPEG decoder 260. From this point onward, an operation similar to the above-described operation to receive the television broadcast signal is performed, and the image is displayed on the display panel 263 and the audio is outputted from the speaker 266.

Also, in the HDMI receiving units 252 and 255, the video (image) data and the audio data inputted, to the HDMI terminals 251 and 254 through the HDMI cable, are obtained. The video data and the audio data are supplied to the video/graphic processing circuit 261 and the audio-signal processing circuit 264, respectively. From this point onward, an operation similar to the above-described operation to receive the television broadcast signal is performed, and the image is displayed on the display panel 263 and the audio is outputted from the speaker 266.

When the audio is outputted from the speaker group 350 externally mounted to the audio amplifier 310, the TS packet of the audio data transmitted from the disc recorder 210 is encrypted in the DTCP circuit 267, and thereafter, outputted to the HDMI terminal 254 via the Ethernet interface 274 and the high-speed data line interface 256. Thus, the TS packet of the audio data is transmitted to the audio amplifier 310 through the HDMI cable 352 connected to the HDMI terminal 254.

Figure 4:
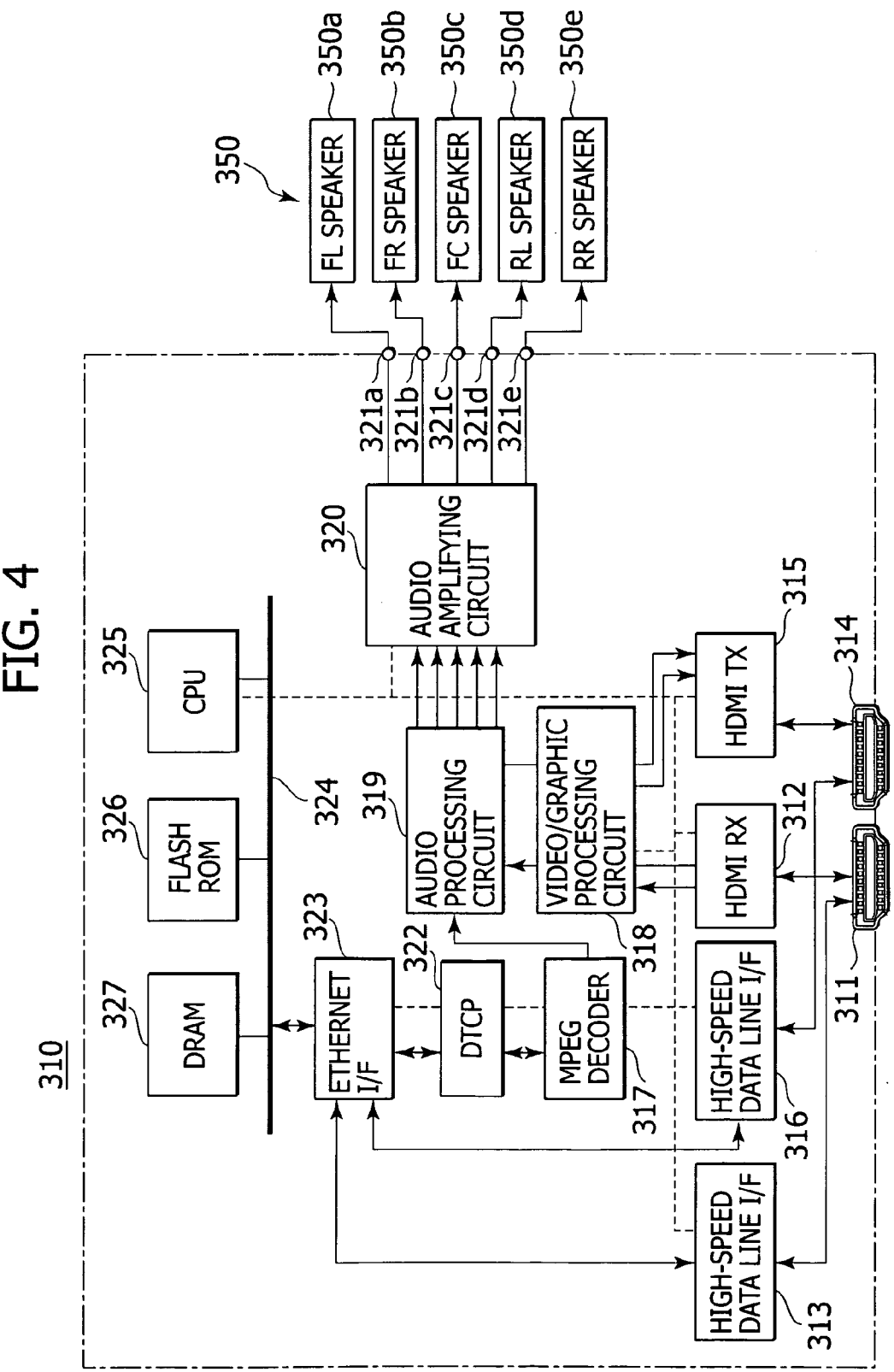
FIG. 4 is a block diagram showing a configuration example of an audio amplifier (repeater apparatus) configuring the AV system.

FIG. 4 shows a configuration example of the audio amplifier 310. The audio amplifier 310 includes the HDMI terminals 311 and 314, the HDMI receiving unit 312, the HDMI transmitting unit 315, the high-speed data line interfaces 313 and 316, an MPEG decoder 317, a video/graphic processing circuit 318, an audio processing circuit 319, an audio amplifying circuit 320, audio output terminals 321*a* to 321*e*, a DTCP circuit 322, an Ethernet interface 323, an internal bus 324, a CPU 325, a flash ROM 326, and a DRAM 327.

The HDMI receiving unit (HDMI sink) 312 receives the baseband video (image) and audio data supplied to the HDMI terminal 311 according to a communication that complies with the HDMI. The HDMI transmitting unit (HDMI source) 315 sends out the baseband video (image) and audio data from the HDMI terminal 314 according to a communication that complies with the HDMI. A detail of the HDMI receiving unit 312 and the HDMI transmitting unit 315 is described later. The high-speed data line interfaces 313 and 316 are bi-directional communication interfaces using predetermined lines (in this embodiment, a reserved line and an HPD line) configuring the HDMI cable. A detail of the high-speed data line interfaces 313 and 316 is described later.

The DTCP circuit 322 decrypts the encrypted partial TS supplied to the Ethernet interface 323 via the high-speed data line interface 313. The MPEG decoder 317 performs a decoding process on the audio PES packet out of the partial TS obtained by decoding in the DTCP circuit so as to obtain the audio data.

The audio processing circuit 319 performs a necessary process, such as a D/A conversion, on the audio data obtained in the MPEG decoder 317. The audio amplifying circuit 320 amplifies a front-left audio signal SFL, a front-right audio signal SFR, a front-center audio signal SFC, a rear-left audio signal SRL, and a rear-right audio signal SRR outputted from the audio processing circuit 319, and outputs the amplified signals to the audio output terminals 321*a*, 321*b*, 321*c*, 321*d*, and 321*e*.

The audio output terminals 321*a*, 321*b*, 321*c*, 321*d*, and 321*e* are connected with a front-left speaker 350*a*, a front-right speaker 350, a front-center speaker 350*c*, a rear-left speaker 350*d*, and a rear-right speaker 350*e* configuring the speaker group 350, respectively.

The audio processing circuit 319 further performs a necessary process on the audio data obtained in the HDMI receiving unit 312, and thereafter, supplies the processed data to the HDMI transmitting unit 315. The video/graphic processing circuit 318 performs a process, such as superimposing of graphics data, on the video (image) data obtained in the HDMI receiving unit 312, and thereafter, supplies the processed data to the HDMI transmitting unit 315. The audio amplifier 310 thus performs a repeater function.

The CPU 325 controls an operation of each elements of the audio amplifier 310. The flash ROM 326 stores control software and manages data. The DRAM 327 forms a working area of the CPU 325. The CPU 325 expands the software or the data read from the flash ROM 326 onto the DRAM 327 to start the software, and controls each element of the audio amplifier 310. The CPU 325, the flash ROM 326, the DRAM 327, and the Ethernet interface 323 are connected to the internal bus 324.

An operation of the audio amplifier 310 shown in FIG. 4 is briefly described.

In the HDMI receiving unit 312, the video (image) data and the audio data, inputted to the HDMI terminal 311 through the HDMI cable 352, are obtained. The video data and the audio data are supplied to the HDMI transmitting unit 315 via the video/graphic processing circuit 318 and the audio processing circuit 319, respectively, and transmitted via the HDMI cable connected to the HDMI terminal 314.

The TS packet of the encrypted audio data, supplied to the Ethernet interface 323 via the high-speed data line interface 313 from the HDMI terminal 311, is decrypted in the DTCP circuit 322. In the MPEG decoder, a decoding process is performed on the PES packet of the audio data obtained in the DTCP circuit 322, and thereby, the audio data is obtained.

The audio data received by the HDMI receiving unit 312 or the audio data obtained in the MPEG decoder 317 is supplied to the audio processing circuit 319, and the supplied audio data is subjected to a necessary process such as a D/A conversion. When muting is in an off state, each audio signal SFL, SFR, SFC, SRL, and SRR outputted from the audio processing circuit 319 is amplified, and the amplified signals are outputted to the audio output terminals 321a, 321b, 321c, 321d, and 321e. The audio is thus outputted from the speaker group 350.

Also, in the high-speed data line interfaces 313 and 316, the IP packet including the remote control code, transmitted through the HDMI cable connected to the HDMI terminals 311 and 314, is received. The IP packet is supplied to the CPU 325 via the Ethernet interface 323. The CPU 325 controls each element of the audio amplifier 310 based on the remote control code if the remote control code included in the IP packet relates to control of the audio amplifier 310. For example, the CPU 325 controls the audio amplifying circuit 320 so that muting of the audio amplifying circuit 320 is changed from an on-state to an off-state when the remote control code indicates an instruction of a "theater mode" as an external audio output mode.

Figure 5:
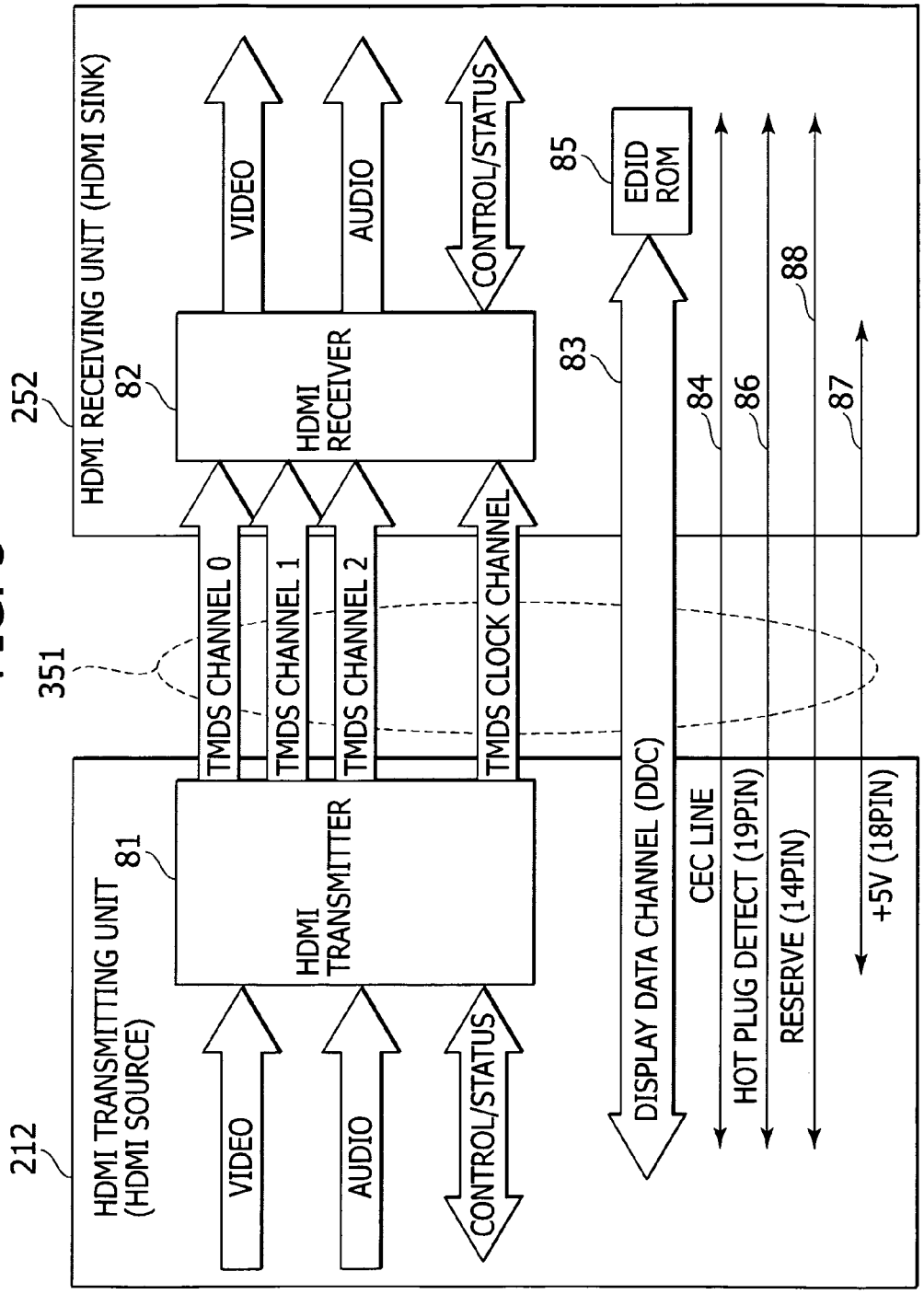
FIG. 5 is a block diagram showing a configuration example of an HDMI transmitting unit (HDMI source) and an HDMI receiving unit (HDMI sink).

FIG. 5 shows a configuration example of the HDMI transmitting unit (HDMI source) 212 of the disc recorder 210 and the HDMI receiving unit (HDMI sink) 252 of the television receiver 250, in the AV system 200 in FIG.

The HDMI source 212 transmits a differential signal corresponding to pixel data of a non-compressed 1-screen image unidirectionally to the HDMI sink 252 through a plurality of channels in an effective image period (hereinafter, referred to as an active video period as appropriate), i.e., a period obtained by removing a horizontal blanking period and a vertical blanking period from a period between one vertical synchronizing signal and a subsequent vertical synchronizing signal. The HDMI source 12 further transmits differential signals corresponding to the audio data and the control data which accompany at least the image, other auxiliary data, etc., unidirectionally to the HDMI sink 252 through a plurality of channels in the horizontal blanking period or the vertical blanking period.

That is, the HDMI source 212 has a transmitter 81. The transmitter 81 converts the pixel data of the non-compressed image into a corresponding differential signal, and serially transports unidirectionally the converted signal to the HDMI sink 252 connected thereto via the HDMI cable 351 through a plurality of channels, i.e., three TMDS channels #0, #1, and #2, for example.

The transmitter 81 further converts the audio data that accompanies the non-compressed image, the necessary control data, other auxiliary data, etc., into a corresponding differential signal, and serially transports unidirectionally the converted signal to the HDMI sink 252 connected thereto via the HDMI cable 351 through the three TMDS channels #0, #1, and #2.

The transmitter 81 also transmits through a TMDS clock channel a pixel clock, synchronized with the pixel data transmitted through the three TMDS channels #0, #1, and #2, to the HDMI sink 252 connected thereto via the HDMI cable 351. In this case, through one TMDS channel #i (i=0, 1, 2), 10-bit pixel data is transmitted during one clock of the pixel clock.

In the active video period, the HDMI sink 252 receives the differential signal which is transmitted unidirectionally from the HDMI source 212 through a plurality of channels and which corresponds to the pixel data, and in the horizontal blanking period or the vertical blanking period, receives the differential signal which is transmitted unidirectionally from the HDMI source 212 through a plurality of channels and which corresponds to the audio data and the control data.

That is, the HDMI sink 252 has a receiver 82. The receiver 82 receives the differential signal corresponding to the pixel data and the differential signal corresponding to the audio data or the control data, transmitted unidirectionally from the HDMI source 212 connected thereto via the HDMI cable 351 through the TMDS channels #0, #1, and #2, in synchronization with the pixel clock transmitted through the TMDS clock channel from the same HDMI source 212.

Transport channels of the HDMI system formed of the HDMI source 212 and the HDMI sink 252 include the three TMDS channels, i.e., #0 to #2, as transport channels for serially transporting unidirectionally the pixel data and the audio data from the HDMI source 212 to the HDMI sink 252 in synchronization with the pixel clock, the TMDS clock channel, as a transport channel for transporting the pixel clock, and transport channels called a DDC (Display Data Channel) 83 and a CEC line 84.

The DDC 83 is formed of two unshown signal lines included in the HDMI cable 351, and is used for the HDMI source 212 to read E-EDID (Enhanced Extended Display Identification Data) from the HDMI sink 252 connected thereto via the HDMI cable 351.

That is, the HDMI sink 252 includes, in addition to the HDMI receiver 81, an EDID ROM (Read Only Memory) 85 storing the E-EDID, which is capability information about capability (configuration/capability) thereof. The HDMI source 212 reads out the E-EDID of the HDMI sink 252 via the DDC 83 from the HDMI sink 252 connected thereto via the HDMI cable 351, and based on the E-EDID, recognizes a setting of a capability of the HDMI sink 212, i.e., an image format (profile), e.g., RGB, YCbCr 4:4:4, YCbCr 4:2:2, etc., with which an electronic apparatus having the HDMI sink 252 is compatible.

The CEC line 84 is formed of one unshown signal line included in the HDMI cable 351, and is used for performing a bi-directional communication of data for control between the HDMI source 212 and the HDMI sink 252.

The HDMI cable 351 also includes a line 86 connected to a pin called an HPD (Hot Plug Detect). The source apparatus may utilize the line 86 to detect the connection of the sink apparatus. The HDMI cable 351 further includes a line 87 used for supplying power to the sink apparatus from the source apparatus. The HDMI cable 351 also includes a reserved line 88.

Figure 6:
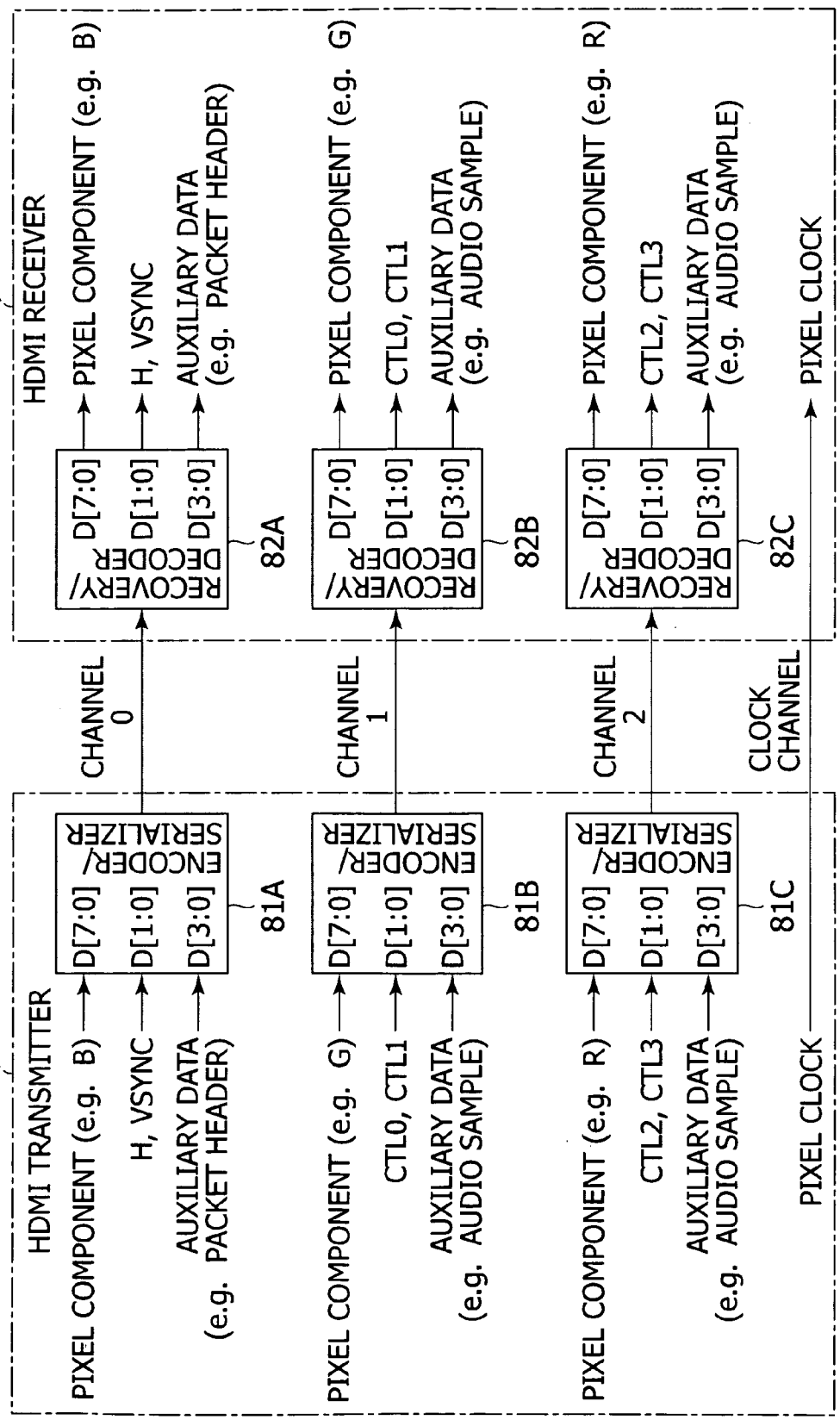
FIG. 6 is a block diagram showing a configuration example of an HDMI transmitter and an HDMI receiver.

FIG. 6 shows a configuration example of the HDMI transmitter 81 and the HDMI receiver 82 in FIG. 5.

The transmitter 81 has three encoders/serializers 81A, 81B, and 81C, which correspond to the three TMDS channels #0, #1, and #2, respectively. Each of the encoders/serializers 81A, 81B, and 81C encodes the image data, the auxiliary data, and the control data supplied thereto, converts the encoded data from parallel data to serial data, and transmits the converted data by the differential signal. Herein, when the image data has three components, for example, R (red), G (green), and B (blue), a B component is supplied to the encoder/serializer 81A, a G component is supplied to the encoder/serializer 81B, and an R component is supplied to the encoder/serializer 81C.

Furthermore, for example, examples of the auxiliary data include audio data and a control packet. The control packet is supplied to the encoder/serializer 81A, and the audio data is supplied to the encoders/serializers 81B and 81C, for example.

Furthermore, examples of the control data include a 1-bit vertical synchronizing signal (VSYNC), a 1-bit horizontal synchronizing signal (HSYNC), and control bits CTL0, CTL1, CTL2, and CTL3, each of which is one bit. The vertical synchronizing signal and the horizontal synchronizing signal are supplied to the encoder/serializer 81A. The control bits CTL0 and CTL1 are supplied to the encoder/serializer 81B, and the control bits CTL2 and CTL3 are supplied to the encoder/serializer 81C.

The encoder/serializer 81A transmits in a time division manner the B component of the image data, the vertical synchronizing signal and the horizontal synchronizing signal, and the auxiliary data, each of which is supplied to the encoder/serializer 81A. That is, the encoder/serializer 81A converts the B component of the image data supplied thereto into parallel data of an 8-bit unit which is a fixed bit number. Furthermore, the encoder/serializer 81A encodes the parallel data, converts the encoded data into serial data, and transmits the serial data through the TMDS channel #0.

Furthermore, the encoder/serializer 81A encodes 2-bit parallel data of each of the vertical synchronizing signal and the horizontal synchronizing signal supplied thereto, converts the encoded data into serial data, and transmits the converted data through the TMDS channel #0. The encoder/serializer 81A further converts the auxiliary data supplied thereto into 4-bit-unit parallel data. The encoder/serializer 81A encodes the parallel data, converts the encoded data into serial data, and transmits the serial data through the TMDS channel #0.

The encoder/serializer 81B transmits in a time division manner the G component of the image data, the control bits CTL0 and CTL1, and the auxiliary data, each of which is supplied to the encoder/serializer 81B. That is, the encoder/serializer 81B converts the G component of the image data supplied thereto into parallel data of an 8-bit unit, which is a fixed bit number. Furthermore the encoder/serializer 81B encodes the parallel data, converts the encoded data into serial data, and transmits the serial data through the TMDS channel #1.

Also, the encoder/serializer 81B encodes the 2-bit parallel data of the control bits CTL0 and CTL1 supplied thereto, converts the encoded data into serial data, and transmits the serial data through the TMDS channel #1. Furthermore, the encoder/serializer 81B converts the auxiliary data supplied thereto into 4-bit-unit parallel data. The encoder/serializer 81B encodes the parallel data, converts the encoded data into serial data, and transmits the serial data through the TMDS channel #1.

The encoder/serializer 81C transmits in a time division manner the R component of the image data, the control bits CTL2 and CTL3, and the auxiliary data, each of which is supplied to the encoder/serializer 81C. That is, the encoder/serializer 81C converts the R component of the image data supplied thereto into parallel data of an 8-bit unit, which is a fixed bit number. Furthermore, the encoder/serializer 81C encodes the parallel data, converts the encoded data into serial data, and transmits the serial data through the TMDS channel #2.

Also, the encoder/serializer 81C encodes the 2-bit parallel data of the control bits CTL2 and CTL3 supplied thereto, converts the encoded data into serial data, and transmits the serial data through the TMDS channel #2. Furthermore, the encoder/serializer 81C converts the auxiliary data supplied thereto into 4-bit-unit parallel data. The encoder/serializer 81C encodes the parallel data, converts the encoded data into serial data, and transmits the serial data through the TMDS channel #2.

The receiver 82 has three recovery/decoders 82A, 82B, and 82C, which correspond to the three TMDS channels #0, #1, and #2, respectively. Each of the recovery/decoders 82A, 82B, and 82C receives the image data, the auxiliary data, and the control data, transmitted as the differential signal through the TMDS channels #0, #1, and #2. Each of the recovery/decoders 82A, 82B, and 82C converts the image data, the auxiliary data, and the control data, from the serial data into the parallel data, decodes the converted data, and outputs the decoded data.

That is, the recovery/decoder 82A receives the B component of the image data, the vertical synchronizing signal and horizontal synchronizing signal, and the auxiliary data transmitted as the differential signals through the TMDS channel #0. The recovery/decoder 82A converts the B component of the image data, the vertical synchronizing signal and the horizontal synchronizing signal, and the auxiliary data from the serial data into the parallel data, decodes the converted data, and outputs the decoded data.

The recovery/decoder 82B receives the G component of the image data, the control bits CTL0 and CTL1, and the auxiliary data transmitted as the differential signals through the TMDS channel #1. The recovery/decoder 82B converts the G component of the image data, the control bits CTL0 and CTL1, and the auxiliary data, from the serial data into the parallel data, decodes the converted data, and outputs the decoded data.

The recovery/decoder 82C receives the R component of the image data, the control bits CTL2 and CTL3, and the auxiliary data, transmitted as the differential signal through the TMDS channel #2. The recovery/decoder 82C converts the R component of the image data, the control bits CTL2 and CTL3, and the auxiliary data, from the serial data into the parallel data, decodes the converted data, and outputs the decoded data.

Figure 7:
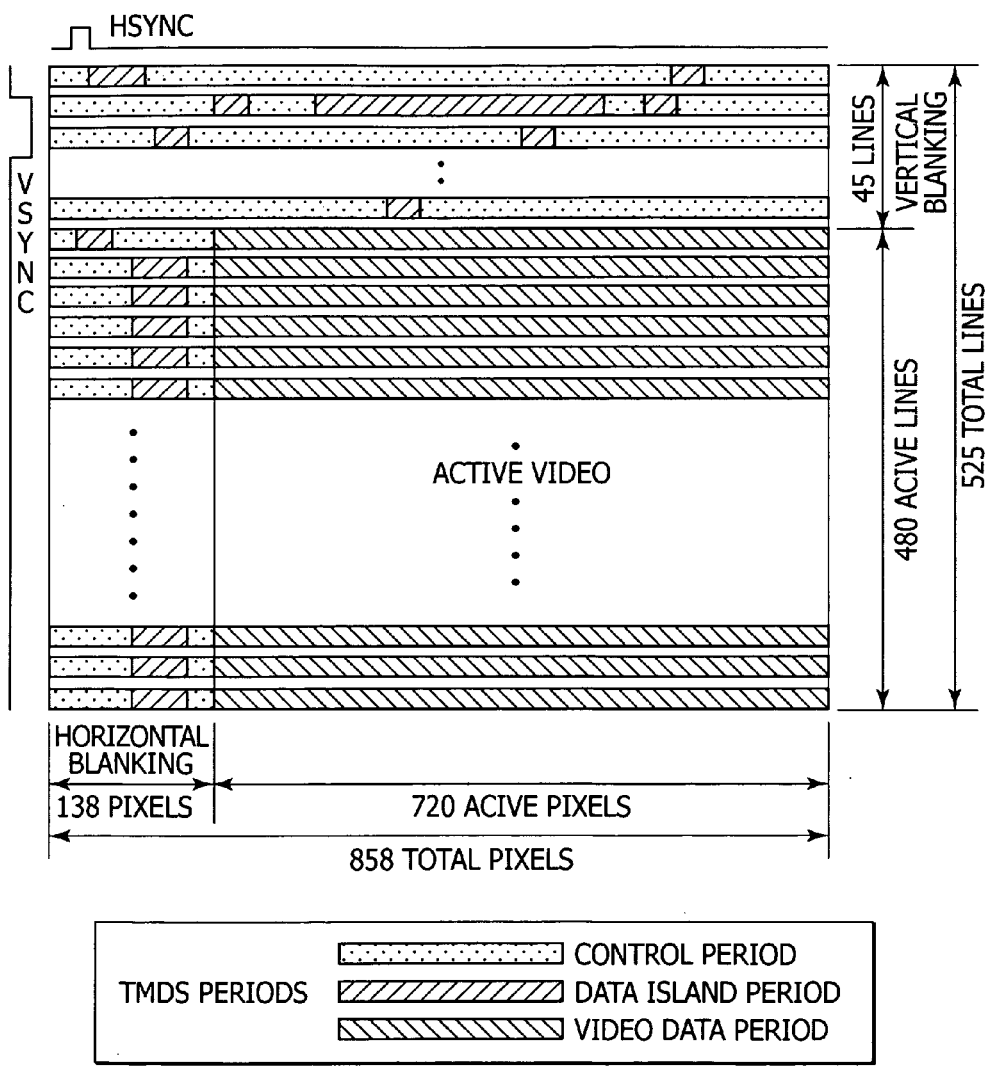
FIG. 7 is a diagram showing a structure of TMDS transport data.

FIG. 7 shows an example of a transport period (interval) in which various transport data are transported through the three TMDS channels #0, #1, and #2 of the HDMI. Furthermore, FIG. 7 shows periods of the various transport data when a progressive image composed of vertical 720 pixels by horizontal 480 pixels is transported through the TMDS channels #0, #1, and #2.

In a video field in which the transport data are transported through the three TMDS channels #0, #1, and #2 of the HDMI, there exist three types of periods, i.e., a video data period, a data island period, and a control period, depending on types of the transport data.

In this case, the video field period is a period which lasts from a rising edge (active edge) of a certain vertical synchronizing signal to a rising edge of a subsequent vertical synchronizing signal, and is divided into the horizontal blanking period, the vertical blanking period, and the active video period obtained by removing the horizontal blanking period and the vertical blanking period from the video field period.

The video data period is allotted to the active video period. In this video data period, data of active pixels equal to 720 pixels×480 lines forming non-compressed 1-screen image data is transported.

The data island period and the control period are allotted to the horizontal blanking interval and the vertical blanking interval. In the data island period and the control period, the auxiliary data is transported.

That is, the data island period is allotted to a part of the horizontal blanking period and the vertical blanking period. In the data island period, out of the auxiliary data, data not related to control, e.g., a packet of the audio data, etc., are transported.

The control period is allotted to other parts of the horizontal blanking period and the vertical blanking period. In this control period, out of the auxiliary data, data related to control, e.g., the vertical synchronizing signal, the horizontal synchronizing signal, the control packet, etc., are transported.

Herein, according to the current HDMI, a frequency of the pixel clock transported through the TMDS clock channel is 165 MHz, for example, and in this case, a transport rate of the data island period is about 500 Mbps. In the embodiment, within the data island period, the thumbnail data as data for an index-use video is transported from the video camera recorder 10 to the television receiver 30.

FIG. 8 shows a pin array of the HDMI terminals 29 and 31. This pin array is called a type-A.

Two lines, i.e., differential lines through which TMDS Data#i+ and TMDS Data#i− as differential signals of the TMDS channel #1 are transported, are connected to pins (pins having pin numbers 1, 4, and 7) allotted with the TMDS Data#i+ and pins (pins having pin numbers 3, 6, and 9) allotted with the TMDS Data#i−.

Also, the CEC line 84 through which the CEC signal as the data for control is transported is connected to the pin having pin number 13, and the pin having pin number 14 is an empty (Reserved) pin. Also, a line through which an SDA (Serial Data) signal such as the E-EDID is transported is connected to the pin having pin number 16, and a line through which an SCL (Serial Clock) signal as a clock signal for use in synchronization at the time of transmitting and receiving the SDA signal is transported is connected to the pin having pin number 15. The aforementioned DDC 83 is constructed of the line transporting the SDA signal and the line transporting the SCL signal.

Also, as described above, the line 86 used by the source apparatus to detect the connection of the sink apparatus is connected to the pin having pin number 19. As described above, the line 87 for supplying power is connected to the pin having pin number 18.

FIG. 5 shows a configuration example of the HDMI transmitting unit (HDMI source) 212 of the disc recorder 210 and the HDMI receiving unit (HDMI sink) 252 of the television receiver 250, in the AV system 200 in FIG. 1. Although the detailed description is omitted, the other HDMI transmitting unit, and HDMI receiving unit in the AV system 200 in FIG. 1 are similarly configured.

Figure 9:
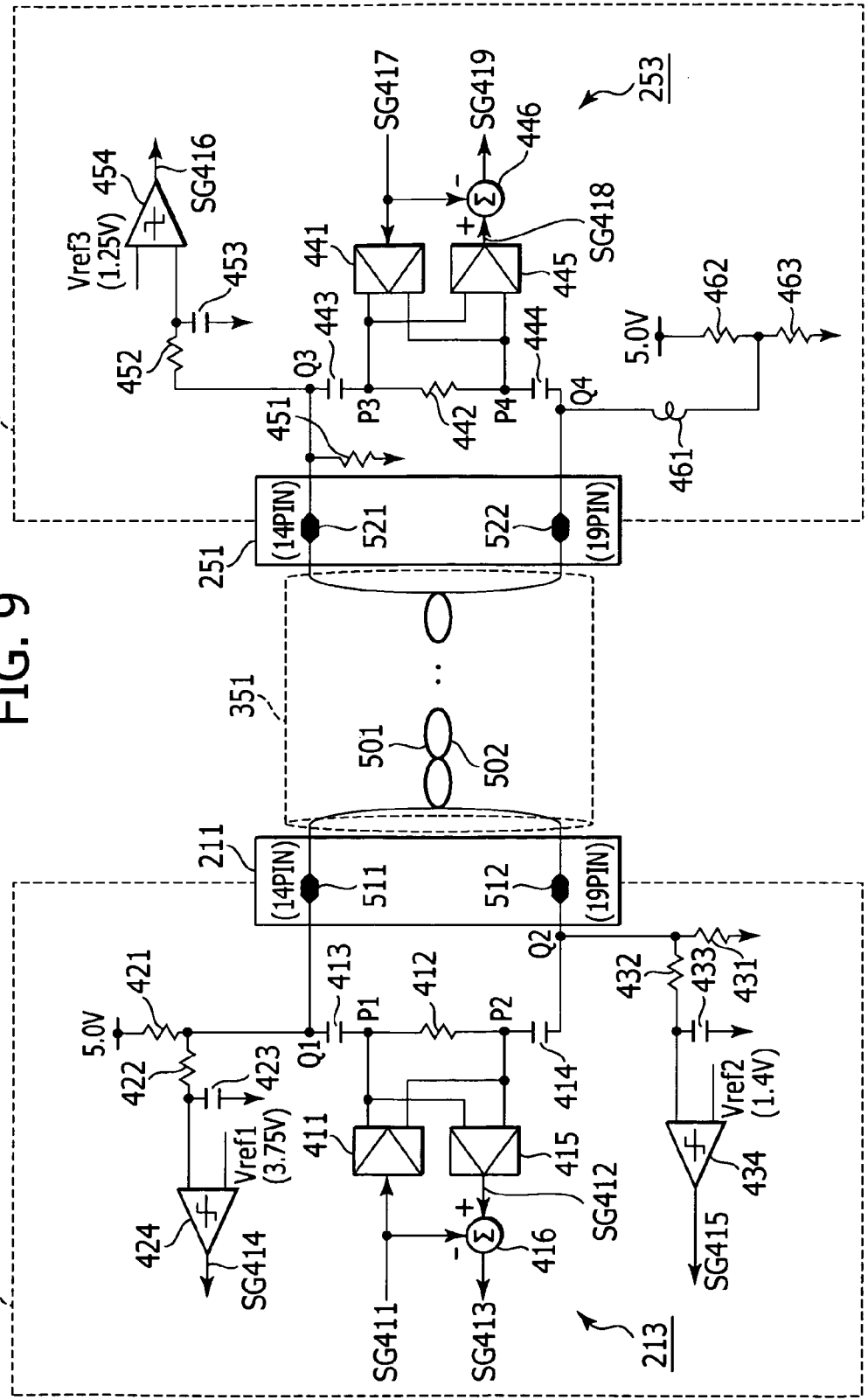
FIG. 9 is a connection diagram showing a configuration example of high-speed data line interfaces of the disc recorder and the television receiver.

FIG. 9 shows a configuration example of the high-speed data line interface 213 of the disc recorder 210 and the high-speed data line interface 253 of the television receiver 250, in the AV system 200 in FIG. 1. These interfaces 213 and 253 configure a communicating unit for performing a LAN (Local Area Network) communication. The communicating unit performs communications using, out of a plurality of lines configuring the HDMI cable 351, a pair of differential lines, i.e., in this embodiment, the reserved line (Ether− line) corresponding to the empty (reserve) pin (14th pin) and the HPD line (Ether+ line) corresponding to the HPD pin (19th pin) line.

The disc recorder 210 includes a LAN signal transmitting circuit 411, an end-terminal resistance 412, AC-coupling capacitances 413 and 414, a LAN signal receiving circuit 415, a subtracting circuit 416, a pull-up resistance 421, a resistance 422 and a capacitance 423 configuring a low-pass filter, a comparator 424, a pull-down resistance 431, a resistance 432 and a capacitance 433 forming a low-pass filter, and a comparator 434. Herein, the high-speed data line interface 213 is formed of the LAN signal transmitting circuit 411, the end-terminal resistance 412, the AC-coupling capacitances 413 and 414, the LAN signal receiving circuit 415, and the subtracting circuit 416.

Connected between a power line (+5.0 V) and a ground line is a series circuit formed of the pull-up resistance 421, the AC-coupling capacitance 413, the end-terminal resistance 412, the AC-coupling capacitance 414, and the pull-down resistance 431 is connected. A mutual connection point P1 of the AC-coupling capacitance 413 and the end-terminal resistance 412 is connected to a positive output side of the LAN signal transmitting circuit 411, and connected to a positive input side of the LAN signal receiving circuit 415. Also, a mutual connection point P2 of the AC-coupling capacitance 414 and the end-terminal resistance 412 is connected to a negative output side of the LAN signal transmitting circuit 411, and is connected to a negative input side of the LAN signal receiving circuit 415. An input side of the LAN signal transmitting circuit 411 is supplied with a transmission signal (transmission data) SG411.

Also, a positive-side terminal of the subtracting circuit 416 is supplied with an output signal SG412 of the LAN signal receiving circuit 415, and a negative-side terminal of the subtracting circuit 416 is supplied with the transmission signal (transmission data) SG411. In the subtracting circuit 416, the transmission signal SG411 is subtracted from the output signal SG412 of the LAN signal receiving circuit 415, and a reception signal (reception data) SG413 is obtained.

Also, a mutual connection point Q1 of the pull-up resistance 421 and the AC-coupling capacitance 413 is connected to the ground line via the series circuit of the resistance 422 and the capacitance 423. An output signal of the low-pass filter, formed at the mutual connection point of the resistance 422 and the capacitance 423, is supplied to one of input terminals of the comparator 424. In the comparator 424, the output signal of the low-pass filter is compared with a reference voltage Vref1 (+3.75 V) supplied to the other input terminal. An output signal SG414 of the comparator 424 is supplied to the CPU 221.

Also, a mutual connection point Q2 of the AC-coupling capacitance 414 and the pull-down resistance 431 is connected to the ground line via the series circuit of the resistance 432 and the capacitance 433. An output signal of the low-pass filter, formed at the mutual connection point of the resistance 432 and the capacitance 433, is supplied to one input terminal of the comparator 434. In the comparator 434, the output signal of the low-pass filter is compared with a reference voltage Vref2 (+1.4 V) supplied to the other input terminal.

An output signal SG415 of the comparator 434 is supplied to the CPU 221.

The television receiver 250 includes a LAN signal transmitting circuit 441, an end-terminal resistance 442, AC-coupling capacitances 443 and 444, a LAN signal receiving circuit 445, a subtracting circuit 446, a pull-down resistance 451, a resistance 452 and a capacitance 453 configuring a low-pass filter, a comparator 454, a choke coil 461, a resistance 462, and a resistance 463. Herein, the high-speed data line interface 253 is formed of the LAN signal transmitting circuit 441, the end-terminal resistance 442, the AC-coupling capacitances 443 and 444, the LAN signal receiving circuit 445, and the subtracting circuit 446.

A series circuit of the resistance 462 and the resistance 463 is connected between a power line (+5.0 V) and the ground line. Connected between a mutual connection point of the resistance 462 and the resistance 463, and the ground line is a series circuit formed of the choke coil 461, the AC-coupling capacitance 444, the end-terminal resistance 442, the AC-coupling capacitance 443, and the pull-down resistance 451.

A mutual connection point P3 of the AC-coupling capacitance 443 and the end-terminal resistance 442 is connected to a positive output side of the LAN signal transmitting circuit 441, and is connected to a positive input side of the LAN signal receiving circuit 445. A mutual connection point P4 of the AC-coupling capacitance 444 and the end-terminal resistance 442 is connected to a negative output side of the LAN signal transmitting circuit 441, and is connected to a negative input side of the LAN signal receiving circuit 445. An input side of the LAN signal transmitting circuit 441 is supplied with a transmission signal (transmission data) SG417.

Also, a positive-side terminal of the subtracting circuit 446 is supplied with an output signal SG418 of the LAN signal receiving circuit 445, and a negative-side terminal of the subtracting circuit 446 is supplied with the transmission signal SG417. In the subtracting circuit 446, the transmission signal SG417 is subtracted from the output signal SG418 of the LAN signal receiving circuit 445, and a reception signal (reception data) SG419 is obtained.

Also, a mutual connection point Q3 of the pull-down resistance 451 and the AC-coupling capacitance 443 is connected to the ground line via the series circuit of the resistance 452 and the capacitance 453. An output signal of the low-pass filter, formed at the mutual connection point of the resistance 452 and the capacitance 453, is supplied to one input terminal of the comparator 454. In the comparator 454, the output signal of the low-pass filter is compared with a reference voltage Vref3 (+1.25 V) supplied to the other input terminal. An output signal SG416 of the comparator 454 is supplied to the CPU 271.

A reserved line 501 and an HPD line 502 included in the HDMI cable 351 configure a differential twisted pair. A source-side end 511 of the reserved line 501 is connected to the 14th pin of the HDMI terminal 211, and a sink-side end 521 of the reserved line 501 is connected to the 14th pin of the HDMI terminal 251. Also, a source-side end 512 of the HPD line 502 is connected to the 19th pin of the HDMI terminal 211, and a sink-side end 522 of the HPD line 502 is connected to the 19th pin of the HDMI terminal 251.

In the disc recorder 210, the mutual connection point Q1 of the aforementioned pull-up resistance 421 and AC-coupling capacitance 413 is connected to the 14th pin of the HDMI terminal 211, and also, the mutual connection point Q2 of the pull-down resistance 431 and the AC-coupling capacitance 414 is connected to the 19th pin of the HDMI terminal 211.

On the other hand, in the television receiver 250, the mutual connection point Q3 of the pull-down resistance 451 and the AC-coupling capacitance 443 is connected to the 14th pin of the HDMI terminal 251, and also, the mutual connection point Q4 of the aforementioned choke coil 461 and the AC-coupling capacitance 444 is connected to the 19th pin of the HDMI terminal 251.

Subsequently described is an operation of the LAN communication by the high-speed data line interfaces 213 and 253 thus configured.

In the disc recorder 210, the transmission signal (transmission data) SG411 is supplied to the input side of the LAN signal transmitting circuit 411, and from the LAN signal transmitting circuit 411, differential signals (a positive-output signal and a negative-output signal) corresponding to the transmission signal SG411 are outputted. The differential signals outputted from the LAN signal transmitting circuit 411 are supplied to the connection points P1 and P2, and transmitted to the television receiver 250 through a pair of lines (the reserved line 501 and the HPD line 502) of the HDMI cable 351.

Also in the television receiver 250, the transmission signal (transmission data) SG417 is supplied to the input side of the LAN signal transmitting circuit 441, and from the LAN signal transmitting circuit 441, differential signals (a positive-output signal and a negative-output signal) corresponding to the transmission signal SG417 are outputted. The differential signals outputted from the LAN signal transmitting circuit 441 are supplied to the connection points P3 and P4, and transmitted to the disc recorder 210 through a pair of lines (the reserved line 501 and the HPD line 502) of the HDMI cable 351.

Also in the disc recorder 210, the input side of the LAN signal receiving circuit 415 is connected to the connection points P1 and P2, and thus, as the output signal SG412 of the LAN signal receiving circuit 415, an added signal results from the transmission signal corresponding to the differential signal (a current signal) outputted from the LAN signal transmitting circuit 411 and the reception signal corresponding to the differential signal thus transmitted from the television receiver 250. In the subtracting circuit 416, the transmission signal SG411 is subtracted from the output signal SG412 of the LAN signal receiving circuit 415. Thus, the output signal SG413 of the subtracting circuit 416 becomes a signal corresponding to the transmission signal (transmission data) SG417 of the television receiver 250.

Also, in the television receiver 250, the input side of the LAN signal receiving circuit 445 is connected to the connection points P3 and P4, and thus, as the output signal SG418 of the LAN signal receiving circuit 445, an added signal results from the transmission signal corresponding to the differential signal (a current signal) outputted from the LAN signal transmitting circuit 441 and the reception signal corresponding to the differential signal thus transmitted from the disc recorder 210. In the subtracting circuit 446, the transmission signal SG417 is subtracted from the output signal SG418 of the LAN signal receiving circuit 445. Thus, the output signal SG419 of the subtracting circuit 446 becomes a signal corresponding to the transmission signal (transmission data) SG411 of the disc recorder 210.

Thus, a two-way LAN communication may be performed between the high-speed data line interface 213 of the disc recorder 210 and the high-speed data line interface 253 of the television receiver 250.

Furthermore, in FIG. 9, the HPD line 502 notifies the disc recorder 210 of a connection of the HDMI cable 351 to the television receiver 250 at a DC bias level, besides the aforementioned LAN communication. That is, the resistances 462 and 463 and the choke coil 461 within the television receiver 250 biases the HPD line 502 at about 4V via the 19th pin of the HDMI terminal 251 when the HDMI cable 351 is connected to the television receiver 250. The disc recorder 210 extracts the DC bias of the HPD line 502 by the low-pass filter formed of the resistance 432 and the capacitance 433, and causes the comparator 434 to compare the extracted DC bias with the reference voltage Vref2 (for example, 1.4 V).

Voltage of the 19th pin of the HDMI terminal 211 is lower than the reference voltage Vref2 because of the existence of the pull-down resistance 431 when the HDMI cable 351 is not connected to the television receiver 250. On the contrary, when the HDMI cable 351 is connected to the television receiver 250, the voltage of the 19th pin is higher than the reference voltage Vref2. Therefore, the output signal SG415 of the comparator 434 is at a high level when the HDMI cable 351 is connected to the television receiver 250, and otherwise, at a low level. Thereby, the CPU 221 of the video disc recorder 210 may be able to recognize whether the HDMI cable 351 is connected to the television receiver 250 on the basis of the output signal SG415 of the comparator 434.

Also in FIG. 9, apparatuses connected to both ends of the HDMI cable 351 have functions of mutually recognizing by the DC bias potential of the reserved line 501 whether the apparatus is the one capable of performing the LAN communication (hereinafter, called an "e-HDMI compatible apparatus") or the one not capable of performing the LAN communication (hereinafter, called an "e-HDMI non-compatible apparatus").

As described above, the disc recorder 210 pulls up (+5V) the reserved line 501 by the resistance 421, and the television receiver 250 pulls down the reserved line 501 by the resistance 451. The resistances 421 and 451 do not exist in the e-HDMI non-compatible apparatus.

The disc recorder 210 uses the comparator 424 to compare the DC potential, of the reserved line 501, passing through the low-pass filter formed of the resistance 422 and the capacitance 423, with the reference voltage Vref1, as described above. When the television receiver 250 is the e-HDMI compatible apparatus with the pull-down resistance 451, the voltage of the reserved line 501 becomes 2.5V. However, when the television receiver 250 is the e-HDMI non-compatible apparatus with no pull-down resistance 451, the voltage of the reserved line 501 becomes 5V because of the existence of the pull-up resistance 421.

Thus, when the reference voltage Vref1 is rendered 3.75V, for example, the output signal SG414 of the comparator 424 is at a low level when the television receiver 250 is the e-HDMI compatible apparatus, and otherwise, at a high level. In this way, based on the output signal SG414 of the comparator 424, the CPU 221 of the disc recorder 210 is able to recognize whether the television receiver 250 is the e-HDMI compatible apparatus.

Likewise, the television receiver 250 uses the comparator 454 to compare the DC potential, of the reserved line 501, passing through the low-pass filter formed of the resistance 452 and the capacitance 453, with the reference voltage Vref3, as described above. When the disc recorder 210 is the e-HDMI compatible apparatus with the pull-up resistance 421, the voltage of the reserved line 501 becomes 2.5V. However, when the disc recorder 210 is the e-HDMI non-compatible apparatus with no pull-up resistance 421, the voltage of the reserved line 501 becomes 0V because of the existence of the pull-down resistance 451.

Thus, when the reference voltage Vref3 is rendered 1.25V, for example, the output signal SG416 of the comparator 454 is at a high level when the disc recorder 210 is the e-HDMI compatible apparatus, and otherwise, at a low level. Thereby, based on the output signal SG416 of the comparator 454, the CPU 271 of the television receiver 250 is able to recognize whether the disc recorder 210 is the e-HDMI compatible apparatus.

According to the configuration example shown in FIG. 9, the interface performs with one HDMI cable 351 a video-and-audio data transport, an exchange and a verification of connection-apparatus information, a communication of apparatus control data, and a LAN communication. In such an interface, the LAN communication is performed in the bi-directional communication via a pair of differential transport channels and a connection state of the interface is sent in a DC bias potential of at least one of the transport channels. Thus, a spatial separation in which the SCL line and the SDA line are not physically used for the LAN communication may be enabled. As a result, this separation may enable the formation of a circuit for the LAN communication irrespective of electrical specifications formulated regarding DDC, and thus, a stable and reliable LAN communication may be achieved at low cost.

FIG. 9 shows the configuration example of the high-speed data line interface 213 of the disc recorder 210 and the high-speed data line interface 253 of the television receiver 250, in the AV system 200 in FIG. 1. Although the detailed description is omitted, the other high-speed data line interfaces in the AV system 200 in FIG. 1 are similarly configured.

Also, it is noted that the pull-up resistance 421 shown in FIG. 9 may not be arranged within the disc recorder 210 but may be arranged within the HDMI cable 351. In such a case, the terminals of the pull-up resistance 421 are connected to, out of the lines arranged within the HDMI cable 351, the reserved line 501 and the line (signal line) connected to the power supply (power supply potential), respectively.

Furthermore, the pull-down resistance 451 and the resistance 463 shown in FIG. 9 may not be arranged within the television receiver 250 but may be arranged within the HDMI cable 351. In such a case, the terminals of the pull-down resistance 451 are connected to, out of the lines arranged within the HDMI cable 351, the reserved line 501 and the line (grounding line) connected to the ground (reference potential), respectively. Furthermore, the terminals of the resistance 463 are connected to, out of the lines arranged within the HDMI cable 351, the HPD line 502 and the line (grounding line) connected to the ground (reference potential), respectively.

Figure 10:
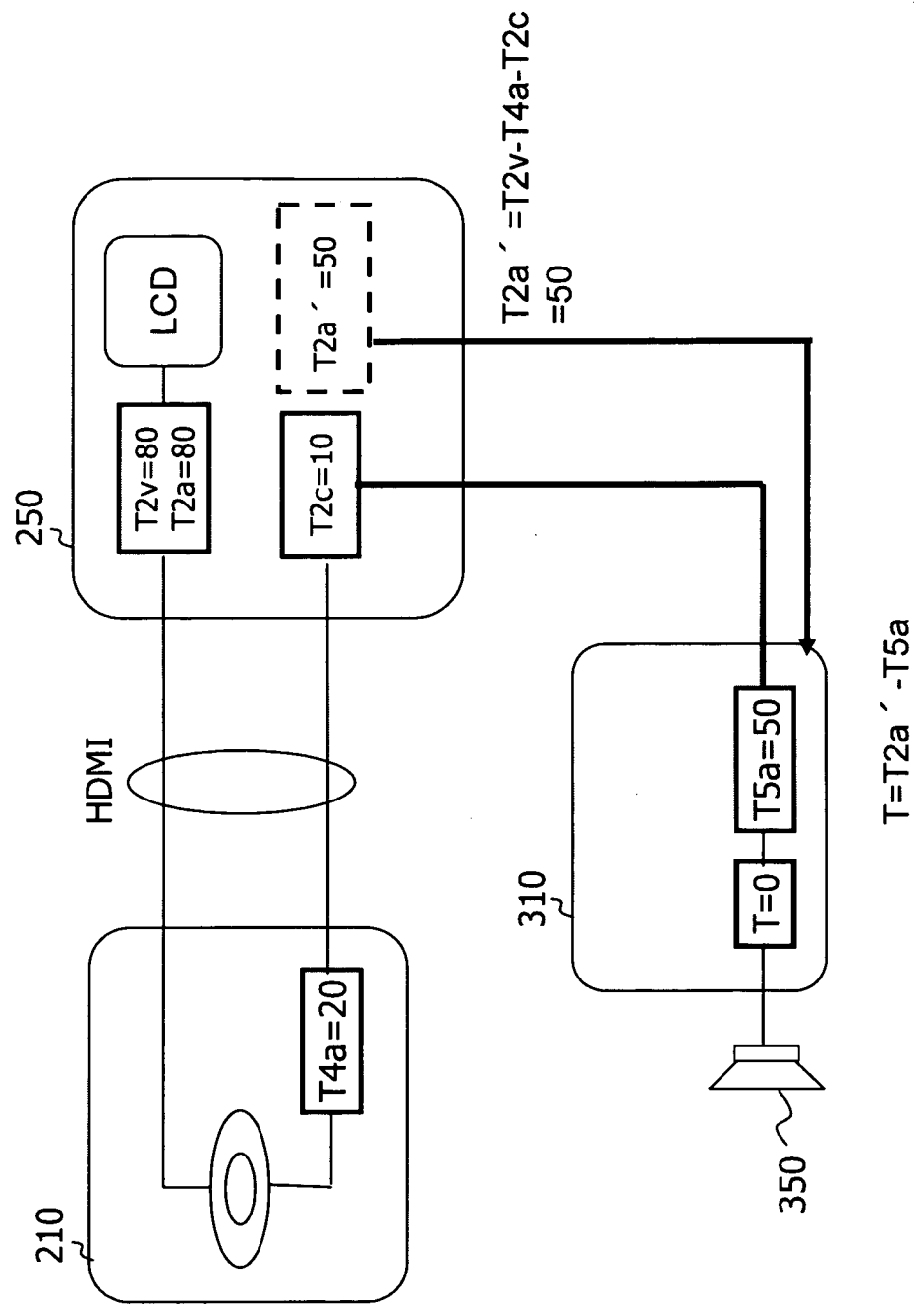
FIG. 10 is a diagram for describing a synchronization process between an image and an audio.

Subsequently described with reference to FIG. 10 is a process (lip-sync process) for synchronizing the displayed image and the outputted audio, performed in the AV system 200 shown in FIG. 1.

The television receiver 250 stores video delay information and audio delay information in the EDID data of the internal HDMI. Herein, the video delay information indicates a delay time T$2v$ lasting until the image responsive to the received image data (video signal) is displayed. The audio delay information indicates a delay time T$2a$ lasting until the audio responsive to the received audio data (audio signal) is outputted. The television receiver 250 performs by itself a time process so that the displayed image is synchronized with the outputted audio, and thus, T$2v$ and T$2a$ are the same value. In an example in FIG. 10, T$2v$ and T$2a$=80 msec.

The television receiver 250 obtains delay information of an audio signal defined by Audio InfoFrame, indicating an attribute of an audio signal, out of AVI InfoFrame transported from the disc recorder 210. The delay information indicates a delay time T$4a$ of the audio data (audio signal) outputted from the disc recorder 210, with respect to the image data (video signal) outputted from the disc recorder 210. In other words, the delay information indicates the delay time T4a of the audio data (audio signal) received by the television receiver 250, with respect to the image data (video signal) received by the television receiver 250. In the example in FIG. 10, T4a=20 msec.

FIG. 11 shows a data structure of the Audio InfoFrame indicating an attribute of the audio signal outputted from the disc recorder 210. For example, in Byte#=8, delay information indicating a delay time of the audio data (audio signal) outputted by the disc recorder 210, with respect to the image data (video signal) outputted by the disc recorder 210, is placed. In this case, 1 bit of MSB represents a delay relationship between video and audio and when the value is negative, it means that the audio advances the video. Transmission of the delay information from the disc recorder 210 to the television receiver 250 may also be performed by using a CEC line or a high-speed data line, for example.

Returning to FIG. 10, the television receiver 250 computes a delay time T2a' of a displayed image in the television receiver 250 with respect to an audio signal transmitted from the television receiver 250 to the audio amplifier 310, based on video delay information (T2v) stored as EDID data, delay information (T4a) transported from the disc recorder 210, and information of a time T2c required until the audio data (audio signal) received from the disc recorder 210 is transmitted to the audio amplifier 310. The television receiver 250 holds the information of the delay time T2a' as EDID data for the audio amplifier 310 in the flash ROM 272 or the DRAM 273. In the example in FIG. 10, T2a'=T2v−T4a−T2c=50 msec.

The audio amplifier 310 reads out the information of the delay time T2a' which is EDID data for the audio amplifier 310, held in the television receiver 250. In this case, the audio amplifier 310 uses the DDC channel, the CEC line, or the high-speed data line so as to read out the information of the delay time T2a' from the television receiver 250.

The audio amplifier 310 controls the delay time lasting until the audio by the received audio data (audio signal) is outputted so that the delay time matches the aforementioned delay time T2a'. In this case, a delay of T=T2a'−T5a is further applied if the time required for processing the received audio data is T5a in the audio amplifier 310. In the example in FIG. 10, T2a'=50, msec, T5a=50 msec, and T=0. With the audio amplifier 310 controlled in this way, the displayed image in the television receiver 250 and the audio output in the audio amplifier 310 are synchronized with each other.

Figure 12:
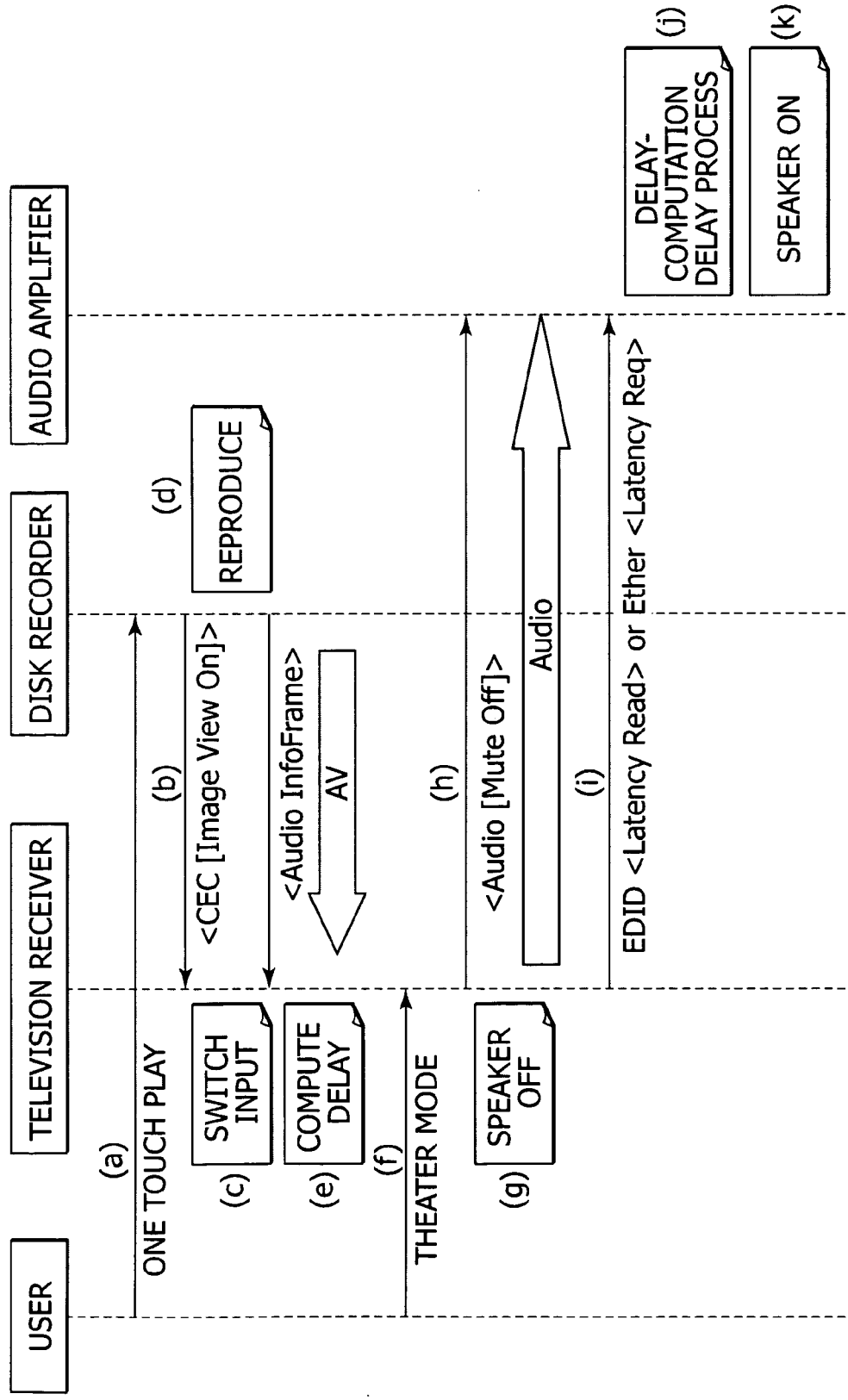
FIG. 12 is a diagram showing an operation sequence example of the AV system.

FIG. 12 shows an operation sequence example of the AV system 200 shown in FIG. 1.

(a) When a user operates the remote control transmitter 277 of the television receiver 250 to instruct a predetermined content stored on the disc recorder 210 to be reproduced, (b) the disc recorder 210 instructs the television receiver 250 to switch inputs using a high-speed data line, for example.

(c) The television receiver 250 switches to the HDMI input connected with the disc recorder 10 in response to the input switching instruction. (d) Also, the disc recorder 210 reproduces the predetermined content, and transmits the image data (video signal) and the audio data (audio signal) to the television receiver 250 through a TMD channel and also transmits the delay information (T4a) (see FIG. 10) to the television receiver 250. At this point of time, the television receiver 250 is in a state of displaying an image responsive to the predetermined content and outputting the audio.

(e) The television receiver 250 computes the delay time T2a' (see FIG. 10) of the displayed image in the television receiver 250, with respect to the audio signal transmitted from the television receiver 250 to the audio amplifier 310, and stores the delay time as the EDID data for the audio amplifier 310.

(f) When an audio output mode (theater mode) from the audio amplifier 310 is instructed by the user operation, (g) the television receiver 250 turns off the audio output by itself, and (h) transmits the audio data (audio signal) through the high-speed data line to the audio amplifier 310 and also performs an audio process and ON-control of the audio output.

(i) The audio amplifier 310 reads out the information of the delay time T2a' as the EDID data for the audio amplifier 310 from the television receiver 250 through the high-speed data line. (j) The audio amplifier 310 controls a delay time lasting until the audio responsive to the received audio data (audio signal) is outputted so that the delay time matches the delay time T2a', and (k) thereafter, the audio amplifier 310 on-controls speaker output. Thereby, a state is established where the audio synchronized with the displayed image of the television receiver 250 is outputted from the speaker group 350 of the audio amplifier 310.

In this way, in the AV system 200 shown in FIG. 1, synchronization of the displayed image in the television receiver 250 with the audio output in the audio amplifier 310 may excellently be performed in the aforementioned process (lip-sync process) for synchronization.

Also in the AV system 200 shown in FIG. 1, there is shown the communicating unit for performing a bi-directional communication, configured by using the reserved line (Ether−line) and the HPD line (Ether+line) of the HDMI cable 351. However, the configuration of the communicating unit for performing a bi-directional communication is not limited thereto. Hereinafter, another configuration example is described. In the example described below, the disc recorder 210 is a source apparatus and the television receiver 250 is a sink apparatus.

Figure 13:
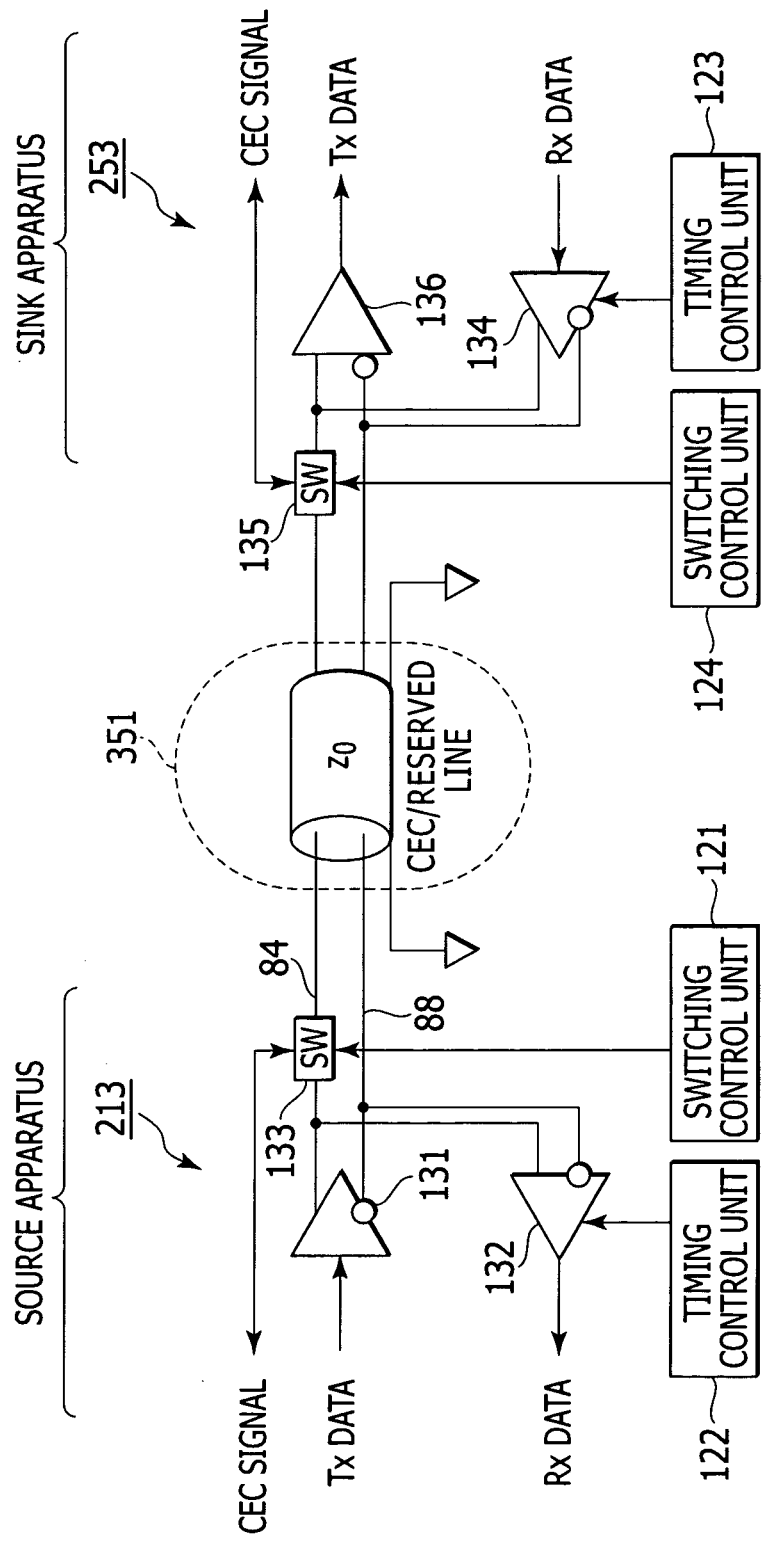
FIG. 13 is a connection diagram showing another configuration example of high-speed data line interfaces of the disc recorder and the television receiver.

FIG. 13 shows an example in which the CEC line 84 and the reserved line 88 are used to perform an IP communication in a half duplex mode. Portions in FIG. 13 corresponding to those in FIG. 5 are designated with the same numerals, and the description is omitted, where appropriate.

The high-speed data line interface 213 in the source apparatus includes a converting unit 131, a decoding unit 132, a switch 133, a switching control unit 121, and a timing control unit 122. The converting unit 131 is supplied with Tx data, i.e., data transmitted from the source apparatus to the sink apparatus, in a two-way IP communication between the source apparatus and the sink apparatus.

The converting unit 131 is constructed of a differential amplifier, for example, and converts the supplied Tx data into a differential signal formed of two partial signals. Also, the converting unit 131 transmits the differential signal obtained through the conversion to the sink apparatus via the CEC line 84 and the reserved line 88. That is, the converting unit 131 supplies one partial signal forming the differential signal obtained through the conversion to the switch 133 via the CEC line 84, more specifically, a signal line arranged in the source apparatus, the signal line being connected to the CEC line 84 of the HDMI cable 351, and supplies the other partial signal forming the differential signal to the sink apparatus via the reserved line 88, more specifically, a signal line arranged in the source apparatus, the signal line being connected to the reserved line 88 of the HDMI cable 351, and the reserved line 88.

The decoding unit 132 is constructed of a differential amplifier, for example, and input terminals of the decoding unit 132 are connected to the CEC line 84 and the reserved line 88. Under the control of the timing control unit 122, the decoding unit 132 receives the differential signal transmitted from the sink apparatus via the CEC line 84 and the reserved line 88, i.e., the differential signal formed of the partial signal on the CEC line 84 and the partial signal on the reserved line 88, decodes the received differential signal into Rx data, which is the original data, and outputs the resultant data. Herein, the Rx data is data transmitted from the sink apparatus to the source apparatus in the two-way IP communication between the source apparatus and the sink apparatus.

At a data transmitting timing, the switch 133 is supplied with a CEC signal from the control unit (CPU) of the source apparatus or the partial signal forming the differential signal corresponding to the TX data from the converting unit 131, and at a data receiving timing, the switch 133 is supplied with a CEC signal from the sink apparatus or the partial signal forming the differential signal corresponding to the Rx data from the sink apparatus. Under the control of the switching control unit 121, the switch 133 selects one of the CEC signal from the control unit (CPU), the CEC signal from the sink apparatus, the partial signal forming the differential signal corresponding to the Tx data, and the partial signal forming the differential signal corresponding to the Rx data, and outputs the selected signal.

That is, at a timing at which the source apparatus transmits the data to the sink apparatus, the switch 133 selects either the CEC signal supplied from the control unit (CPU) or the partial signal supplied from the converting unit 131. The switch 133 transmits one of the selected CEC signal and the partial signal to the sink apparatus via the CEC line 84.

Also, at a timing at which the source apparatus receives the data transmitted from the sink apparatus, the switch 133 receives the CEC signal transmitted from the sink apparatus via the CEC line 84 or the partial signal of the differential signal corresponding to the Rx data, and supplies one of the received CEC signal and partial signal to the control unit (CPU) or the decoding unit 132.

The switching control unit 121 controls the switch 133 to switch the switch 133 so that one of the signals supplied to the switch 133 is selected. The timing control unit 122 controls a receiving timing of the differential signal by the decoding unit 132.

The high-speed data line interface 253 in the sink apparatus includes a converting unit 134, a decoding unit 136, a switch 135, a switching control unit 124, and a timing control unit 123. The converting unit 134 is constructed of a differential amplifier, for example, and the converting unit 134 is supplied with the Rx data. Under the control of the timing control unit 123, the converting unit 134 converts the supplied Rx data into a differential signal formed of two partial signals, and transmits the differential signal obtained through the conversion to the source apparatus via the CEC line 84 and the reserved line 88.

That is, the converting unit 134 supplies one partial signal forming the differential signal obtained through the conversion to the switch 135 via the CEC line 84, more specifically, a signal line arranged in the sink apparatus, the signal line being connected to the CEC line 84 of the HDMI cable 351, and supplies the other partial signal forming the differential signal to the source apparatus via the reserved line 88, more specifically, a signal line arranged in the sink apparatus, the signal line being connected to the reserved line 88 of the HDMI cable 351, and the reserved line 88.

At a data receiving timing, the switch 135 is supplied with one of a CEC signal from the source apparatus and the partial signal forming the differential signal corresponding to the TX data from the source apparatus, and at a data transmitting timing, the switch 135 is supplied with one of the partial signal forming the differential signal corresponding to the Rx data from the converting unit 134 and a CEC signal from the control unit (CPU) of the sink apparatus. Under the control of the switching control unit 124, the switch 135 selects one of the CEC signal from the source apparatus, the CEC signal from the control unit (CPU), the partial signal forming the differential signal corresponding to the Tx data, and the partial signal forming the differential signal corresponding to the Rx data, and outputs the selected signal.

That is, at a timing at which the sink apparatus transmits the data to the source apparatus, the switch 135 selects one of the CEC signal supplied from the control unit (CPU) of the sink apparatus and the partial signal supplied from the converting unit 134, and transmits the selected one of the CEC signal and the partial signal to the source apparatus via the CEC line 84.

Also, at a timing at which the sink apparatus receives the data transmitted from the source apparatus, the switch 135 receives the CEC signal transmitted from the source apparatus via the CEC line 84 or the partial signal of the differential signal corresponding to the Tx data, and supplies the received CEC signal or partial signal to the control unit (CPU) or the decoding unit 136.

The decoding unit 136 is constructed of a differential amplifier, for example, and input terminals of the decoding unit 136 are connected to the CEC line 84 and the reserved line 88. The decoding unit 136 receives the differential signal transmitted from the source apparatus via the CEC line 84 and the reserved line 88, i.e., the differential signal formed of the partial signal on the CEC line 84 and the partial signal on the reserved line 88, decodes the received differential signal into the Tx data, which is the original data, and outputs the resultant data.

The switching control unit 124 controls the switch 135 to switch the switch 135 so that one of the signals supplied to the switch 135 is selected. The timing control unit 123 controls a transmitting timing of the differential signal by the converting unit 134.

Figure 14:
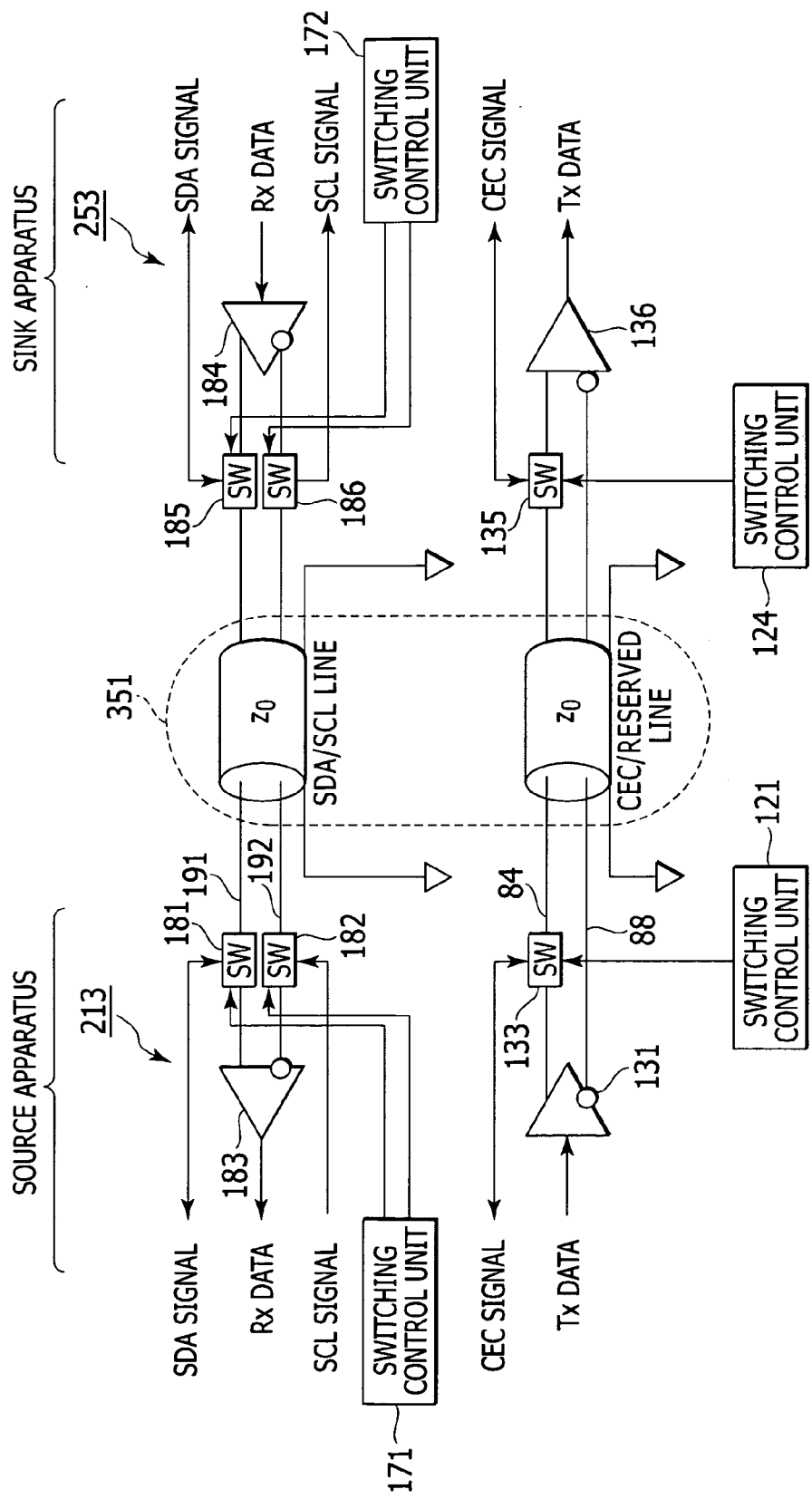
FIG. 14 is a connection diagram showing yet another configuration example of high-speed data line interfaces of the disc recorder and the television receiver.

FIG. 14 is an example in which the CEC line 84 and the reserved line 88, together with a signal line through which an SDA signal is transported (SDA line) and a signal line through which an SCL signal is transported (SCL line), are used to perform an IP communication in a full duplex mode. Portions in FIG. 14 corresponding to those in FIG. 13 are designated by the same numerals, and the description is omitted, where appropriate.

The high-speed data line interface 213 of the source apparatus includes the converting unit 131, the switch 133, a switch 181, a switch 182, a decoding unit 183, the switching control unit 121, and a switching control unit 171.

At a data transmitting timing, the switch 181 is supplied with the SDA signal from the control unit (CPU) of the source apparatus, and at a data receiving timing, the switch 181 is supplied with the SDA signal from the sink apparatus or the partial signal forming the differential signal corresponding to the Rx data from the sink apparatus. Under the control of the switching control unit 171, the switch 181 selects the SDA signal from the control unit (CPU), the SDA signal from the sink apparatus, or the partial signal forming the differential signal corresponding to the Rx data, and outputs the selected signal.

That is, at a timing at which the source apparatus receives the data transmitted from the sink apparatus, the switch 181 receives the SDA signal transmitted from the sink apparatus via the SDA line 191 as the signal line through which the SDA signal is transported or the partial signal of the differential signal corresponding to the Rx data, and supplies the received SDA signal or partial signal to the control unit (CPU) or the decoding unit 183.

Also at a timing at which the source apparatus transmits the data to the sink apparatus, the switch 181 transmits the SDA signal supplied from the control unit (CPU) to the sink apparatus via the SDA line 191 or transmits no signal to the sink apparatus.

At a data transmitting timing, the switch 182 is supplied with the SCL signal from the control unit (CPU) of the source apparatus. At a data receiving timing, the switch 182 is supplied with the partial signal forming the differential signal corresponding to the Rx data from the sink apparatus. Under the control of the switching control unit 171, the switch 182 selects either the SCL signal or the partial signal forming the differential signal corresponding to the Rx data, and outputs the selected signal.

That is, at a timing at which the source apparatus receives the data transmitted from the sink apparatus, the switch 182 receives the partial signal of the differential signal which corresponds to the Rx data and is transmitted from the sink apparatus via the SCL line 192 as the signal line transporting the SCL signal, and supplies the received partial signal to the decoding unit 183. Alternatively, the switch 182 receives no signal.

Also, at a timing at which the source apparatus transmits the data to the sink apparatus, the switch 182 transmits to the sink apparatus via the SCL line 192 the SCL signal supplied from the control unit (CPU) of the source apparatus or transmits no signal to the sink apparatus.

The decoding unit 183 is constructed of a differential amplifier, for example, and input terminals of the decoding unit 183 are connected to the SDA line 191 and the SCL line 192. The decoding unit 183 receives the differential signal transmitted from the sink apparatus via the SDA line 191 and the SCL line 192, i.e., the differential signal formed of the partial signal on the SDA line 191 and the partial signal on the SCL line 192, decodes the received differential signal into Rx data, which is the original data, and outputs the resultant data.

The switching control unit 171 controls the switch 181 and the switch 182 to switch the switch 181 and the switch 182 so that each of the switch 181 and the switch 182 selects one of the supplied signals.

Also, the high-speed data line interface 253 configuring the sink apparatus includes a converting unit 184, the switch 135, a switch 185, a switch 186, the decoding unit 136, a switching control unit 172, and the switching control unit 124.

The converting unit 184 is constructed of a differential amplifier, for example, and the converting unit 184 is supplied with the Rx data. The converting unit 184 converts the supplied Rx data into a differential signal formed of two partial signals, and transmits the differential signal obtained through the conversion to the source apparatus via the SDA line 191 and the SCL line 192. That is, the converting unit 184 transmits one partial signal forming the differential signal obtained through the conversion to the source apparatus via the switch 185, and transmits the other partial signal forming the differential signal to the source apparatus via the switch 186.

At a data transmitting timing, the switch 185 is supplied with one of the partial signal forming the differential signal corresponding to Rx data from the converting unit 184 and the SDA signal from the control unit (CPU) of the sink apparatus, and at a data receiving timing, the switch 185 is supplied with the SDA signal from the source apparatus. Under the control of the switching control unit 172, the switch 185 selects one of the SDA signal from the control unit (CPU), the SDA signal from the source apparatus, and the partial signal forming the differential signal corresponding to the Rx data, and outputs the selected signal.

That is, at a timing at which the sink apparatus receives the data transmitted from the source apparatus, the switch 185 receives the SDA signal transmitted from the source apparatus via the SDA line 191, and supplies the received SDA signal to the control unit (CPU). Alternatively, the switch 185 receives no signal.

Also, at a timing at which the sink apparatus transmits the data to the source apparatus, the switch 185 transmits one of the SDA signal supplied from the control unit (CPU) and the partial signal supplied from the converting unit 184 to the source apparatus via the SDA line 191.

At a data transmitting timing, the switch 186 is supplied with the partial signal, from the converting unit 184, forming the differential signal corresponding to the Rx data, and at a data receiving timing, the switch 186 is supplied with the SCL signal from the source apparatus. Under the control of the switching control unit 172, the switch 186 selects either the partial signal forming the differential signal corresponding to Rx data or the SCL signal, and outputs the selected signal.

That is, at a timing at which the sink apparatus receives the data transmitted from the source apparatus, the switch 186 receives the SCL signal transmitted from the source apparatus via the SCL line 192, and supplies the received SCL signal to the control unit (CPU). Alternatively, the switch 186 receives no signal.

Also, at a timing at which the sink apparatus transmits the data to the source apparatus, the switch 186 transmits to the source apparatus via the SCL line 192 the partial signal supplied from the converting unit 184. Alternatively, the switch 186 transmits no signal.

The switching control unit 172 controls the switch 185 and the switch 186 to switch the switch 185 and the switch 186 so that each of the switch 185 and the switch 186 selects one of the supplied signals.

In the mean time, when the source apparatus and the sink apparatus perform the IP communication, the configurations of the source apparatus and the sink apparatus determine whether the half duplex communication or the full duplex communication is possible. Therefore, the source apparatus refers to the E-EDID received from the sink apparatus to determine whether to perform one of the half duplex communication, the full duplex communication, and the bi-directional communication by transmitting and receiving the CEC signal.

Figure 15:
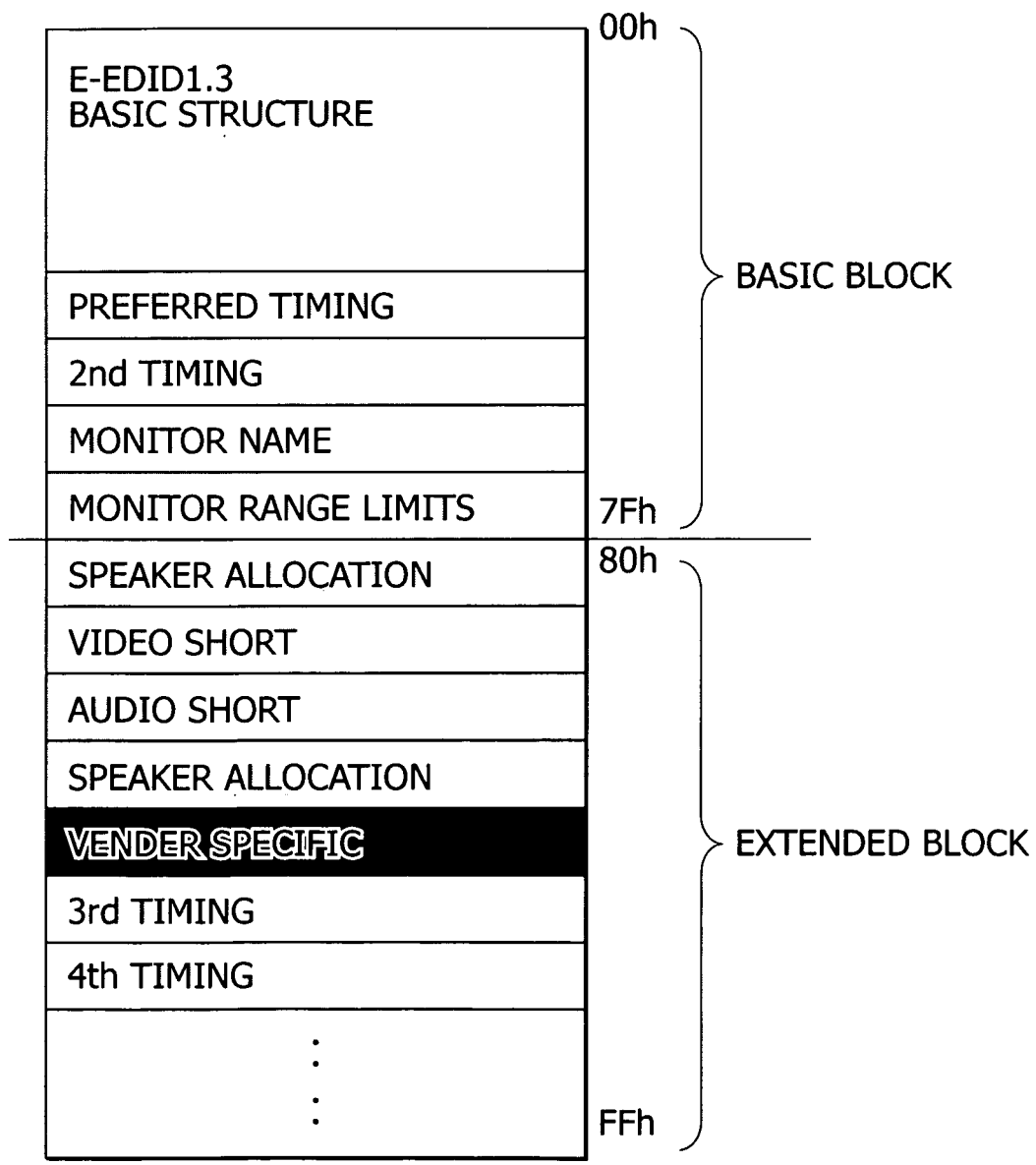
FIG. 15 is a diagram showing a structure of E-EDID received by the source apparatus.

The E-EDID received by the source apparatus is formed of a basic block and an extended block, as shown in FIG. 15, for example.

Data represented by "E-EDID 1.3 Basic Structure" and defined by an E-EDID 1.3 standard is placed at a head of the basic block of the E-EDID. The data is then followed by timing information for keeping compatibility with a conventional EDID, represented by "Preferred timing", and timing information, different from "Preferred timing", for keeping compatibility with the conventional EDID, represented by "2nd timing".

Also, in the basic block, "2nd timing" is followed in order by information that is represented by "Monitor NAME" and indicates a name of the display device, and information, represented by "Monitor Range Limits", indicating the number of pixel displayable when aspect ratios are 4:3 and 16:9.

On the other hand, information, represented by "Speaker Allocation", relating to right and left speakers is placed at a head of the extended block. The information is then followed in order by: data, represented by "VIDEO SHORT", in which a displayable image size, a frame rate, information indicating whether interlace or progressive, information about an aspect ratio, etc., are written; data, represented by "AUDIO SHORT", in which information about a reproducible audio codec system, a sampling frequency, a cut-off bandwidth, a codec bit number, etc., is written; and information, represented by "Speaker Allocation" relating to right and left speakers.

Also in the extended block, "Speaker Allocation" is followed by data, represented by "Vender Specific", defined uniquely for each manufacturer, timing information, represented by "3rd timing", for keeping compatibility with a conventional EDID, and timing information, represented by "4th timing", for keeping compatibility with a conventional EDID.

Moreover, the data represented by "Vender Specific" has a data structure shown in FIG. 16. That is, a 0-th block to an N-th block, each of which is a 1-byte block, are arranged in the data represented by "Vender Specific".

A header, represented by "Vendor-Specific tag code (=3)", indicating a data region of the data "Vender Specific", and information, represented by "Length (=N)", indicating a length of the data "Vender Specific" are placed in the 0-th block placed at a head of the data represented by "Vender Specific".

Further placed in the first block to the third block is information, represented by "24-bit IEEE Registration Identifier (0x000C03) LSB first", indicating a number "0x000C03" registered for HDMI (R). Moreover information, each piece of which is represented by "A", "B", "C", and "D", indicating physical addresses of a 24-bit sink apparatus is placed in the fourth block and the fifth block.

Placed in the sixth block area are a flag, represented by "Supports-AI", and indicating a function with which the sink apparatus is compatible, pieces of information, which are represented by "DC-48 bit", "DC-36 bit", and "DC-30 bit", and designating the number of bits per each pixel, a flag, represented by "DC-Y444", and indicating whether the sink apparatus is compatible with a transport of an image of YCbCr 4:4:4, and a flag, represented by "DVI-Dual", and indicating whether the sink apparatus is compatible with a dual DVI (Digital Visual Interface).

Moreover, information, represented by "Max-TMDS-Clock", and indicating a maximum frequency of the pixel clock of TMDS is placed in the seventh block. Furthermore, placed in the eighth block area are a flag, represented by "Latency", and indicating presence or absence of delay information of the video and the audio, a full duplex flag, represented by "Full Duplex" and indicating whether the full duplex communication is possible, and a half duplex flag, represented by "Half Duplex", and indicating whether the half duplex communication is possible.

Herein, for example, the set full duplex flag (for example, which is set to "1") indicates that the sink apparatus has a function for performing the full duplex communication, i.e., the sink apparatus is configured as shown in FIG. 14, and the reset full duplex flag (for example, which is set to "0") indicates that the sink apparatus does not have a function for performing the full duplex communication.

Similarly, the set half duplex flag (for example, which is set to "1") indicates that the sink apparatus has a function for performing the half duplex communication, i.e., the sink apparatus is configured as shown in FIG. 13, and the reset half duplex flag (for example, which is set to "0") indicates that the sink apparatus does not have a function for performing the half duplex communication.

Also, delay time data of a progressive video, represented by "Video Latency", is placed in the ninth block of the data represented by "Vender Specific". Delay time data of the audio accompanying the progressive video, and represented by "Audio Latency", is placed in the tenth block. Moreover, delay time data of the interlaced video, represented by "Interlaced Video Latency", is placed in the 11th block. Delay time data of the audio accompanying the interlaced video, represented by "Interlaced Audio Latency", is placed in the 12th block.

The source apparatus determines whether to perform the half duplex communication, the full duplex communication, or the bi-directional communication by transmitting and receiving the CEC signals, based on the full duplex flag and the half duplex flag included in the E-EDID received from the sink apparatus, and according to the determination result, the source apparatus performs the two-way communication with the sink apparatus.

For example, if the source apparatus is configured as shown in FIG. 13, the source apparatus can perform the half duplex communication with the sink apparatus shown in FIG. 13 but cannot perform the half duplex communication with the sink apparatus shown in FIG. 14. Therefore, the source apparatus starts a communication process when a power supply of the source apparatus is turned on, and performs the two-way communication corresponding to the function provided in the sink apparatus connected to the source apparatus.

Figure 17:
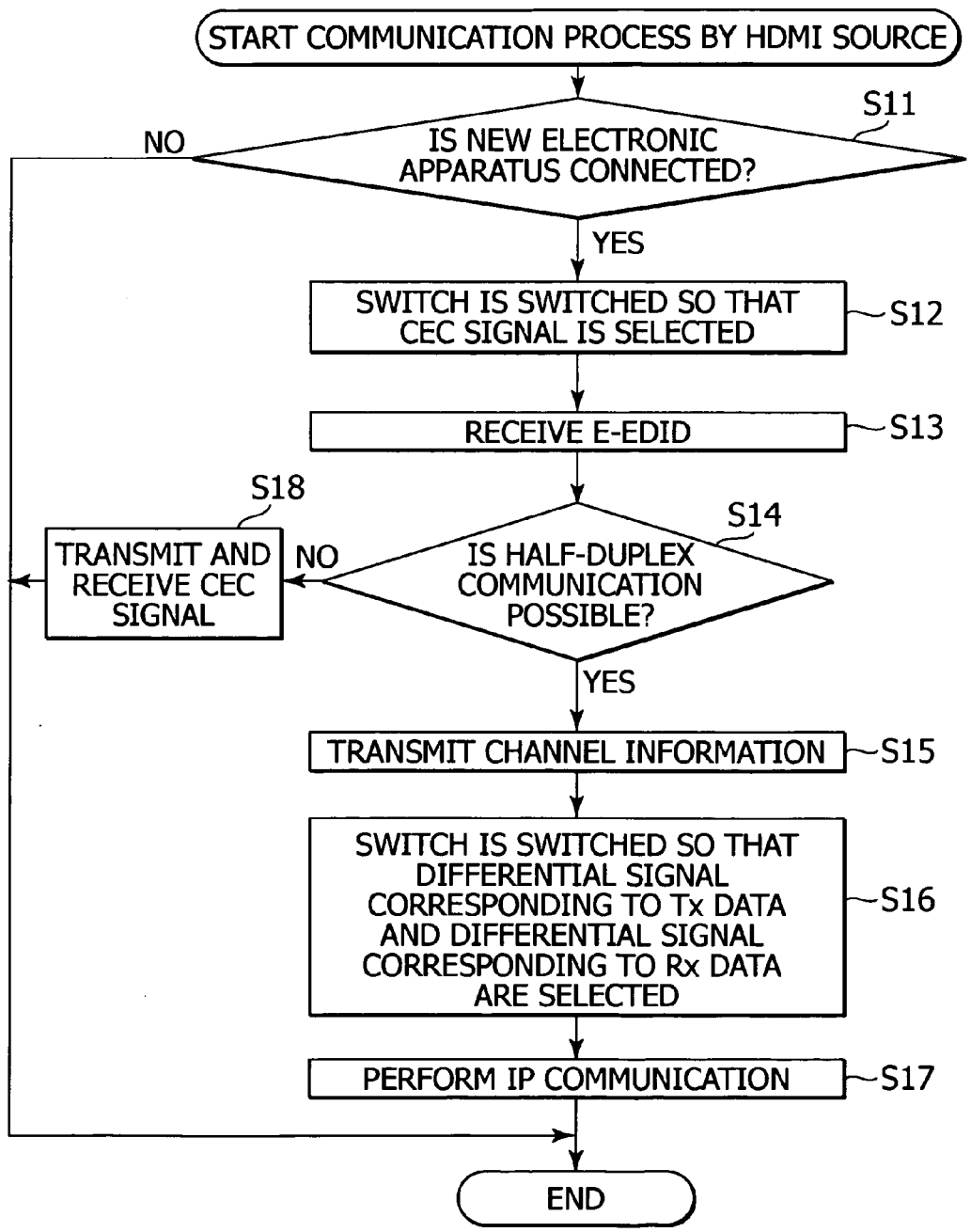
FIG. 17 is a flowchart describing a communication process by the source apparatus.

Hereinafter, the communication process of the source apparatus shown in FIG. 13 is described with reference to a flowchart in FIG. 17.

At step S11, the source apparatus determines whether a new electronic apparatus is connected to the source apparatus. For example, based on a magnitude of voltage added to a pin called a "Hot Plug Detect" connected with the HPD line 86, the source apparatus determines whether the new electronic apparatus (sink apparatus) is connected.

At step S11, if it is determined that the new electronic apparatus is not connected, no communication is performed, and thus, the communication process is ended. On the other hand, if it is determined at step S11 that the new electronic apparatus is connected, the switching control unit 121 controls the switch 133 at step S12 to switch the switch 133 so that the CEC signal from the control unit (CPU) of the source apparatus is selected at a data transmitting time and so that the CEC signal from the sink apparatus is selected at a data receiving time.

At step S13, the source apparatus receives the E-EDID transmitted from the sink apparatus via the DDC 83. That is, upon detection of the connection of the source apparatus, the sink apparatus reads out the E-EDID from EDID ROM 85 and transmits the read E-EDID to the source apparatus via the DDC 83, and thus, the source apparatus receives the E-EDID transmitted from the sink apparatus.

At step S14, the source apparatus determines whether the half duplex communication is possible with the sink apparatus. That is, the source apparatus refers to the E-EDID received from the sink apparatus to determine whether the half duplex flag "Half Duplex" in FIG. 16 is set. If the half duplex flag is set, for example, the source apparatus determines that the two-way IP communication in the half duplex mode, i.e., the half duplex communication, is possible.

If it is determined at step S14 that the half duplex communication is possible, the source apparatus transmits at step S15, as channel information indicating a channel used for the two-way communication, a signal indicating that the IP communication in the half duplex mode using the CEC line 84 and the reserved line 88 is to be performed, to the sink apparatus via the switch 133 and the CEC line 84.

That is, if the half duplex flag is set, the source apparatus can recognize that the sink apparatus is configured as shown in FIG. 13 and that the half duplex communication using the CEC line 84 and the reserved line 88 is possible, and thus, the source apparatus transmits the channel information to the sink apparatus to notify that the half duplex communication is to be performed.

At step S16, the switching control unit 121 controls the switch 133 in a selection operation so that the differential signal corresponding to the Tx data from the converting unit 131 is selected at a data transmitting time and so that the differential signal corresponding to the Rx data from the sink apparatus is selected at a data receiving time.

At step S17, each element of the source apparatus performs the two-way IP communication with the sink apparatus in the half duplex mode, and thus, the communication process is ended. That is, at a data transmitting time, the converting unit 131 converts the Tx data supplied from the control unit (CPU) into the differential signal, supplies the switch 133 with one partial signal forming the differential signal obtained through the conversion, and transmits the other partial signal to the sink apparatus via the reserved line 88. The switch 133 transmits the partial signal supplied from the converting unit 131 to the sink apparatus via the CEC line 84. In this way, the differential signal corresponding to the Tx data is transmitted from the source apparatus to the sink apparatus.

Also, at a data receiving time, the decoding unit 132 receives the differential signal corresponding to the Rx data transmitted from the sink apparatus. That is, the switch 133 receives the partial, signal of the differential signal transmitted from the sink apparatus via the CEC line 84 and which corresponding to the Rx data, and supplies the received partial signal to the decoding unit 132. The decoding unit 132 under the control of the timing control unit 122 decodes the differential signal formed of the partial signal supplied from the switch 133 and the partial signal supplied from the sink apparatus via the reserved line 88 into the RX data which is the original data, and outputs the Rx data to the control unit (CPU).

In this way, the source apparatus transmits and receives various data such as the control data, the pixel data, the audio data, etc., to and from the sink apparatus.

Furthermore, at step S14, if it is determined that the half duplex communication is not possible, the source apparatus transmits and receives the CEC signal at step S18, thereby performing the two-way communication with the sink apparatus. The communication process is thus ended.

That is, at a data transmitting time, the source apparatus transmits the CEC signal to the sink apparatus via the switch 133 and the CEC line 84, and at a data receiving time, the source apparatus receives the CEC signal transmitted from the sink apparatus via the switch 133 and the CEC line 84 to transmit and receive the control data to and from the sink apparatus.

In this way, the source apparatus refers to the half duplex flag to perform the half duplex communication using the CEC line 84 and the reserved line 88, with the sink apparatus capable of performing the half duplex communication.

Thus, the switch 133 is switched to select the data to be transmitted and the data to be received, and thereby performing with the sink apparatus the half duplex communication using the CEC line 84 and the reserved line 88, i.e., the IP communication in the half duplex mode. In this way, a high-speed bi-directional communication may be performed with compatibility with the conventional HDMI maintained.

As the source apparatus, the sink apparatus also starts the communication process when power is on and performs the two-way communication with the source apparatus.

Figure 18:
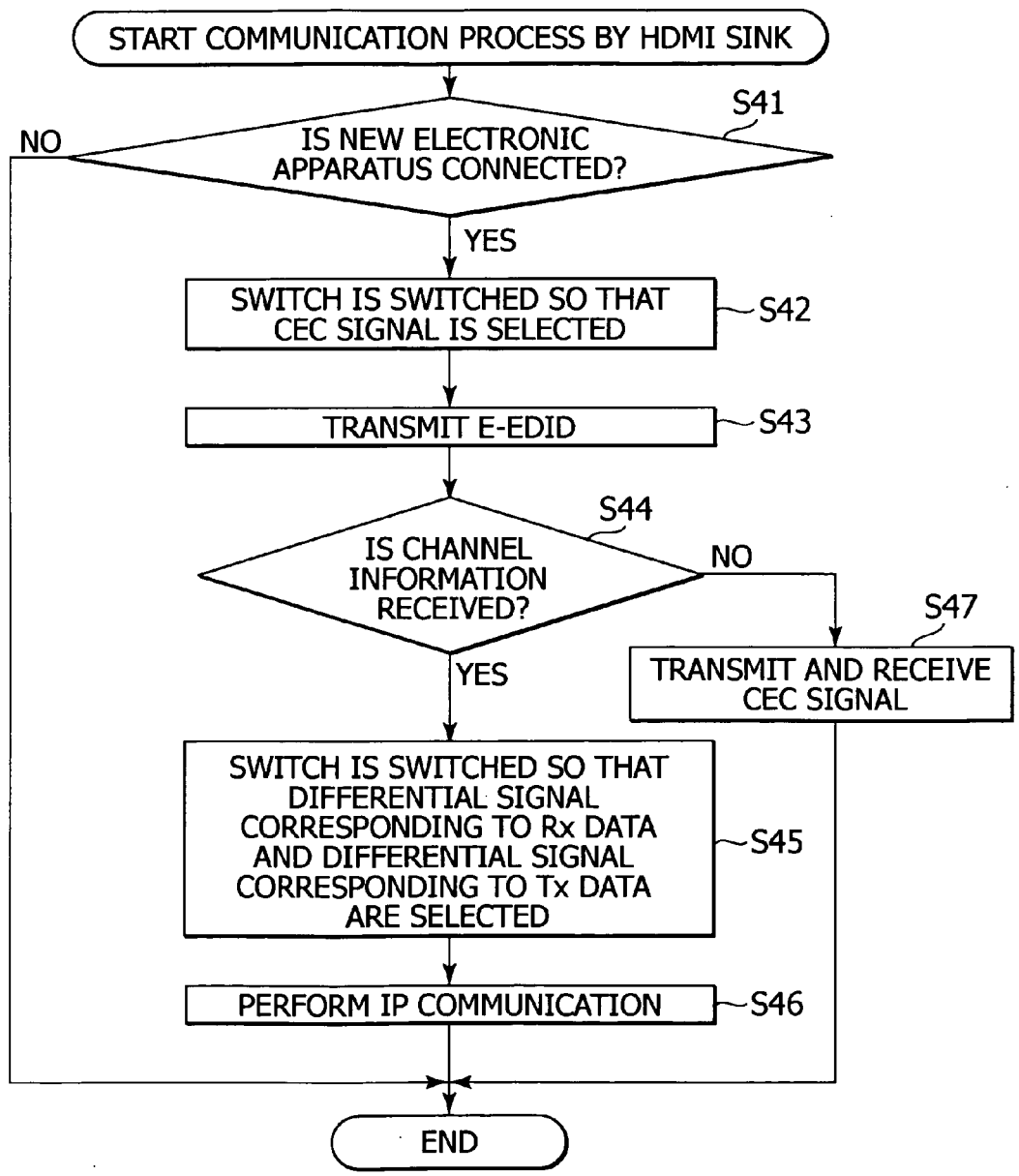
FIG. 18 is a flowchart describing a communication process by the sink apparatus.

Hereinafter, the communication process of the sink apparatus shown in FIG. 13 is described with reference to a flowchart in FIG. 18.

At step S41, the sink apparatus determines whether the sink apparatus is connected with a new electronic apparatus (source apparatus). For example, the sink apparatus determines whether the new electronic apparatus is connected, based on a magnitude of voltage added to a pin called a Hot Plug Detect connected with the HPD line 86.

At step S41, if it is determined that the new electronic apparatus is not connected, no communication is performed, and thus, the communication process is ended. On the other hand, if it is determined at step S41 that the new electronic apparatus is connected, the switching control unit 124 controls the switch 135 at step S42 to switch the switch 135 so that at a data transmitting time, the CEC signal from the control unit (CPU) of the sink apparatus is selected, and so that at a data receiving time, the CEC signal from the source apparatus is selected.

At step S43, the sink apparatus reads out the E-EDID from the EDIDROM 85, and transmits the read E-EDID to the source apparatus via the DDC 83.

At step S44, the sink apparatus determines whether the channel information transmitted from the source apparatus is received.

That is, the channel information indicating a channel of the two-way communication is transmitted from the source apparatus according to a function provided in the source apparatus and the sink apparatus. For example, if the source apparatus is configured as shown in FIG. 13, the source apparatus and the sink apparatus are capable of performing the half duplex communication using the CEC line 84 and the reserved line 88. Therefore, the channel information indicating that IP communication using the CEC line 84 and the reserved line 88 is to be performed is transmitted from the source apparatus to the sink apparatus. The sink apparatus receives the channel information transmitted from the source apparatus via the switch 135 and the CEC line 84, and determines that the channel information has been received.

On the other hand, if the source apparatus is not provided with the function for performing the half duplex communication, the channel information is not transmitted from the source apparatus to the sink apparatus, and thus, the sink apparatus determines that the channel information has not been received.

At step S44, if it is determined that the channel information has been received, the process proceeds to step S45 at which the switching control unit 124 controls the switch 135. As a result, the switch 135 is switched so that at a data transmitting time, the differential signal corresponding to the Rx data from the converting unit 134 is selected, and so that at a data receiving time, the differential signal corresponding to the Tx data from the source apparatus is selected.

At step S46, the sink apparatus performs the two-way IP communication with the source apparatus in the half duplex mode, and the communication process is ended. That is, at a data transmitting time, the converting unit 134 under the control of the timing control unit 123 converts the Rx data supplied from the control unit (CPU) of the sink apparatus into the differential signal, supplies one partial signal forming the differential signal obtained through the conversion to the switch 135, and transmits the other partial signal to the source apparatus via the reserved line 88. The switch 135 transmits the partial signal supplied from the converting unit 134 to the source apparatus via the CEC line 84. In this way, the differential signal corresponding to the Rx data is transmitted from the sink apparatus to the source apparatus.

Also, at a data receiving time, the decoding unit 136 receives the differential signal transmitted from the source apparatus and corresponding to Tx data. That is, the switch 135 receives the partial signal of the differential signal which is transmitted from the source apparatus via the CEC line 84 and which corresponds to the Tx data, and supplies the received partial signal to the decoding unit 136. The decoding unit 136 decodes the differential signal formed of the partial signal supplied from the switch 135 and the partial signal supplied from the source apparatus via the reserved line 88, into the Tx data, which is the original data, and outputs the Tx data to the control unit (CPU).

In this way, the sink apparatus transmits and receives various data such as the control data, the pixel data, and the audio data, to and from the source apparatus.

Also at step S44, if it is determined that the channel information has not been received, the sink apparatus transmits and receives the CEC signal to perform the two-way communication with the source apparatus at step S47, and the communication process is ended.

That is, at a data transmitting time, the sink apparatus transmits the CEC signal to the source apparatus via the switch 135 and the CEC line 84, and at a data receiving time, the sink apparatus receives the CEC signal transmitted from the source apparatus via the switch 135 and the CEC line 84 to transmit and receive the control data to and from the source apparatus.

In this way, upon receiving the channel information, the sink apparatus performs the half duplex communication with the sink apparatus using the CEC line 84 and the reserved line 88.

The sink apparatus switches the switch 135 to select the data to be transmitted and the data to be received, thereby performing with the source apparatus the half duplex communication using the CEC line 84 and the reserved line 88. As a result, a high-speed bi-directional communication may be performed with compatibility with the conventional HDMI maintained.

Furthermore, if the source apparatus is configured as shown in FIG. 14, the source apparatus determines in the communication process based on the full duplex flag included in the E-EDID whether the sink apparatus has the function for performing the full duplex communication, and performs a two-way communication in response to the determination result.

Figure 19:
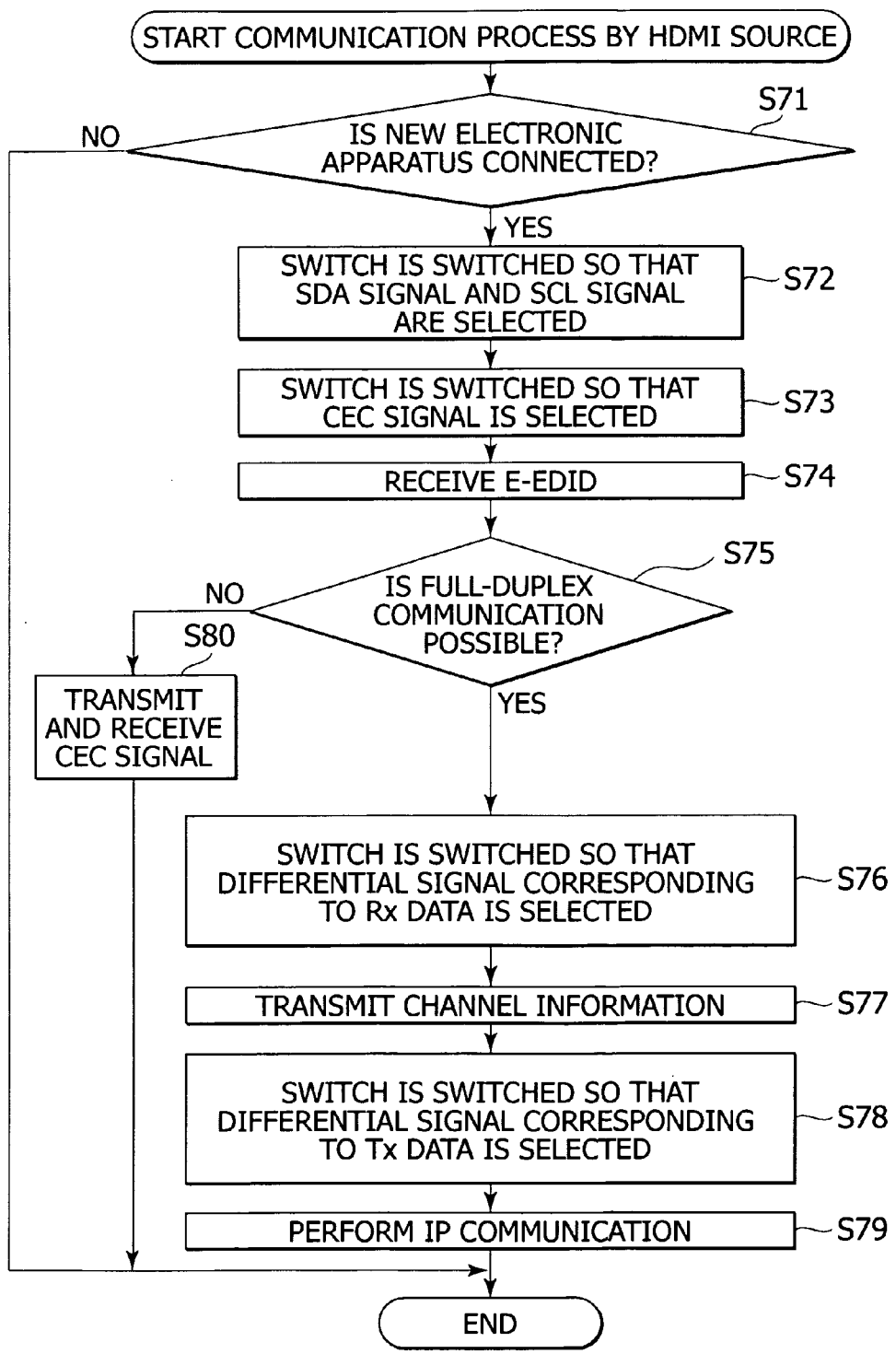
FIG. 19 is a flowchart describing a communication process by the source apparatus.

Hereinafter, the communication process of the source apparatus shown in FIG. 14 is described with reference to a flowchart in FIG. 19.

At step S71, the source apparatus determines whether a new electronic apparatus is connected to the source apparatus. At step S71, if it is determined that the new electronic apparatus is not connected, no communication is performed, and thus, the communication process is ended.

On the other hand, if it is determined at step S71 that the new electronic apparatus is connected, the switching control unit 171 controls the switch 181 and the switch 182 at step S72 to switch the switch 181 and the switch 182 so that at a data transmitting time, the SDA signal from the control unit (CPU) of the source apparatus is selected by the switch 181 and the SCL signal from the control unit (CPU) of the source apparatus is selected by the switch 182, and so that at a data receiving time, the SDA signal from the sink apparatus is selected by the switch 181.

At step S73, the switching control unit 121 controls the switch 133 to switch the switch 133 so that at a data transmitting time, the CEC signal from the control unit (CPU) of the source apparatus is selected, and so that at a data receiving time, the CEC signal from the sink apparatus is selected.

At step S74, the source apparatus receives the E-EDID transmitted from the sink apparatus via the SDA line 191 of the DDC 83. That is, upon detection of the connection of the source apparatus, the sink apparatus reads out the E-EDID from EDIDROM 85 and transmits the read E-EDID to the source apparatus via the SDA line 191 of the DDC 83, and thus, the source apparatus receives the E-EDID transmitted from the sink apparatus.

At step S75, the source apparatus determines whether the full duplex communication with the sink apparatus is possible. That is, the source apparatus refers to the E-EDID received from the sink apparatus to determine whether the full duplex flag "Full Duplex" in FIG. 16 is set, and for example, if the full duplex flag is set, the source apparatus determines that the two-way IP communication in the full duplex mode, i.e., the full duplex communication, is possible.

If it is determined at step S75 that the full duplex communication is possible, the switching control unit 171 controls the switch 181 and the switch 182 at step S76 to switch the switch 181 and the switch 182 so that the differential signal corresponding to the Rx data from the sink apparatus is selected at a data receiving time.

That is, at a data receiving time, the switching control unit 171 switches the switch 181 and the switch 182 so that out of the partial signal forming the differential signal transmitted from the sink apparatus and corresponding to the Rx data, the partial signal transmitted via the SDA line 191 is selected by the switch 181 and so that the partial signal transmitted via the SCL line 192 is selected by the switch 182.

The SDA line 191 and the SCL line 192 configuring the DDC 83 are not utilized after the E-EDID is transmitted from the sink apparatus to the source apparatus, i.e., transmitting and receiving the SDA signal and the SCL signal via the SDA line 191 and the SCL line 192 are not performed. Thus, the switch 181 and the switch 182 are switched so that the SDA line 191 and the SCL line 192 may be utilized as a transport channel of the Rx data in the full duplex communication.

At step S77, the source apparatus transmits to the sink apparatus via the switch 133 and the CEC line 84, as the channel information indicating the two-way communication channel, a signal indicating that the IP communication in the full duplex mode using the CEC line 84 and the reserved line 88, and the SDA line 191 and the SCL line 192, is to be performed.

Figure 24:
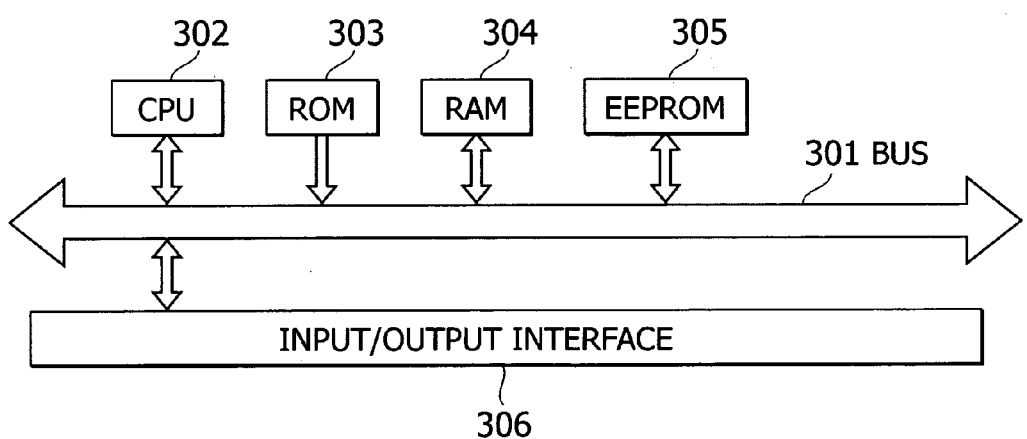
FIG. 24 is a block diagram showing a configuration example of a computer to which the present invention is applied.

That is, if the full duplex flag is set, the source apparatus can recognize that the sink apparatus is configured as shown in FIG. 24 and that the full duplex communication using the CEC line 84 and the reserved line 88, and the SDA line 191 and the SCL line 192, is possible. Thus, the source apparatus transmits the channel information to the sink apparatus to notify that the full duplex communication is to be performed.

At step S78, the switching control unit 121 controls the switch 133 to switch the switch 133 so that the differential signal corresponding to the Tx data from the converting unit 131 is selected at a data transmitting time. That is, the switching control unit 121 switches the switch 133 so that the partial signal of the differential signal supplied from the converting unit 131 to the switch 133 and corresponding to the Tx data is selected.

At step S79, the source apparatus performs the two-way IP communication with the sink apparatus in the full duplex mode, and the communicating process is ended. That is, at a data transmitting time, the converting unit 131 converts the Tx data supplied from the control unit (CPU) of the source apparatus into the differential signal, supplies the switch 133 with one partial signal forming the differential signal obtained through the conversion, and transmits the other partial signal to the sink apparatus via the reserved line 88. The switch 133 transmits the partial signal supplied from the converting unit 131 to the sink apparatus via the CEC line 84. In this way, the differential signal corresponding to the Tx data is transmitted from the source apparatus to the sink apparatus.

Also, at a data receiving time, the decoding unit 183 receives the differential signal corresponding to the Rx data transmitted from the sink apparatus. That is, the switch 181 receives the partial signal of the differential signal transmitted from the sink apparatus via the SDA line 191 and corresponding to the Rx data, and supplies the received partial signal to the decoding unit 183. Also, the switch 182 receives the other partial signal of the differential signal transmitted from the sink apparatus via the SCL line 192 and corresponding to the Rx data, and supplies the received partial signal to the decoding unit 183. The decoding unit 183 decodes the differential signal formed of the partial signals supplied from the switch 181 and the switch 182 into the Rx data, which is the original data, and outputs the Rx data to the control unit (CPU).

In this way, the source apparatus transmits and receives various data such as the control data, the pixel data, and the audio data, to and from the sink apparatus.

Also, if it is determined at step S75 that the full duplex communication is not possible, the source apparatus transmits and receives the CEC signal at step S80 thereby to perform the two-way communication with the sink apparatus, and then, the communicating process is ended.

That is, at a data transmitting time, the source apparatus transmits the CEC signal to the sink apparatus via the switch 133 and the CEC line 84, and at a data receiving time, the source apparatus receives the CEC signal transmitted from the sink apparatus via the switch 133 and the CEC line 84 to transmit and receive the control data to and from the sink apparatus.

In this way, the source apparatus refers to the full duplex flag to perform the full duplex communication using the CEC line 84 and the reserved line 88, and the SDA line 191 and the SCL line 192, with the sink apparatus capable of performing the full duplex communication.

Thus, the switch 133, the switch 181, and the switch 182 are switched to select the transmitted data and the received data, thereby performing with the sink apparatus the full duplex communication using the CEC line 84 and the reserved line 88, together with the SDA line 191 and the SCL line 192. In this way, a high-speed bi-directional communication may be performed while maintaining compatibility with the conventional HDMI.

Also if the sink apparatus is configured as shown in FIG. 14, the sink apparatus performs the communication process to perform the two-way communication with the source apparatus in a manner similar to a case of the sink apparatus shown in FIG. 13.

Figure 20:
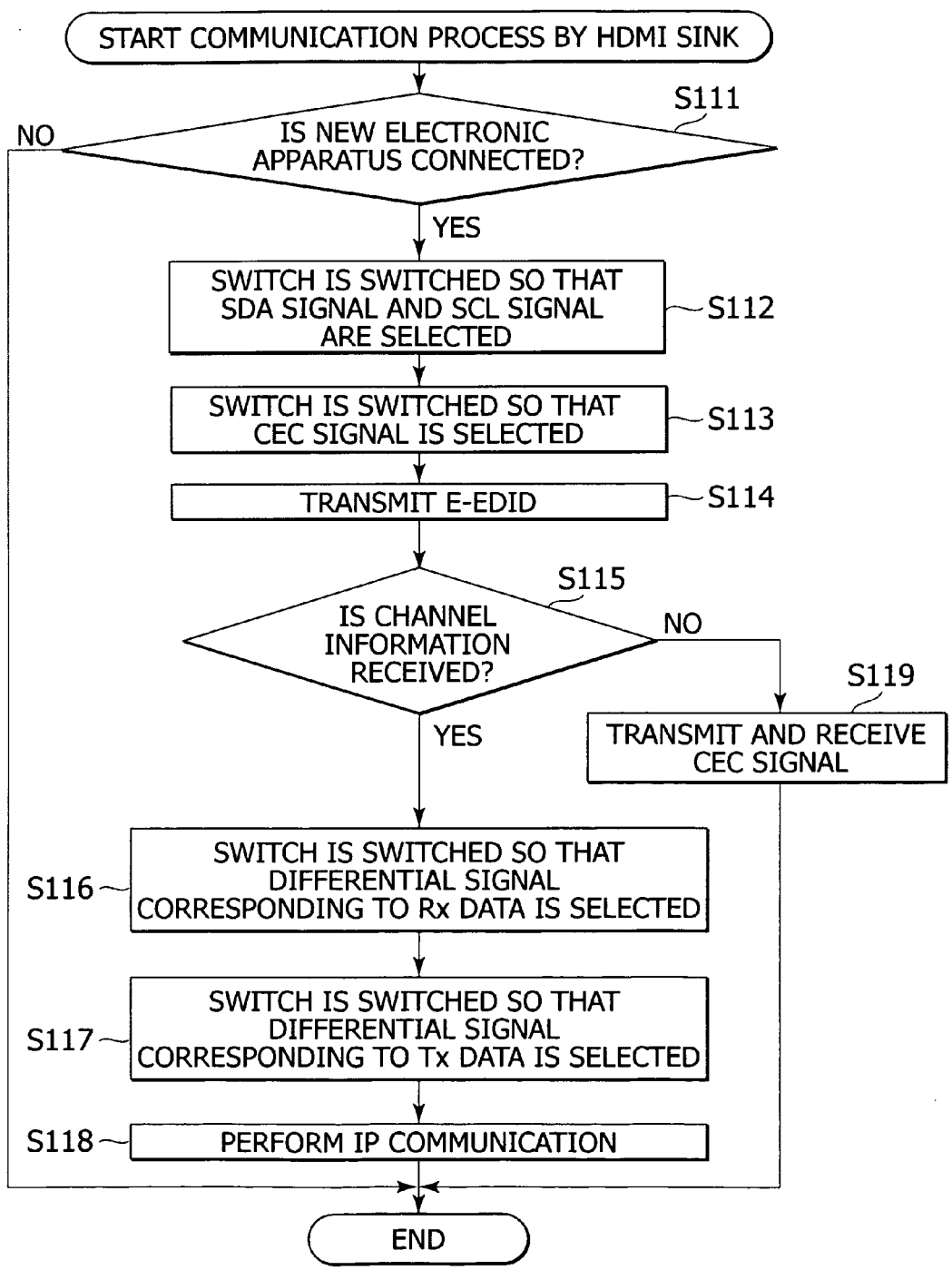
FIG. 20 is a flowchart for describing a communication process by the sink apparatus.

Hereinafter, the communication process of the sink apparatus shown in FIG. 14 is described with reference to a flowchart in FIG. 20.

At step S111, the sink apparatus determines whether the sink apparatus is connected with a new electronic apparatus (source apparatus). At step S111, if it is determined that the new electronic apparatus is not connected, no communication is performed, and thus, the communication process is ended.

On the other hand, if it is determined at step S111 that the new electronic apparatus is connected, the switching control unit 172 controls the switch 185 and the switch 186 at step S112 to switch the switch 185 and the switch 186 so that at a data transmitting time, the SDA signal from the control unit (CPU) of the sink apparatus is selected by the switch 185, and so that at a data receiving time, the SDA signal from the source apparatus is selected by the switch 185 and the SCL signal from the source apparatus is selected by the switch 186.

At step S113, the switching control unit 124 controls the switch 135 to switch the switch 135 so that at a data transmitting time, the CEC signal from the control unit (CPU) of the sink apparatus is selected, and so that at a data receiving time, the CEC signal from the source apparatus is selected.

At step S114, the sink apparatus reads out the E-EDID from the EDIDROM 85, and transmits the read E-EDID to the source apparatus via the switch 185 and the SDA line 191 of the DDC 83.

At step S115, the sink apparatus determines whether the channel information transmitted from the source apparatus has been received.

That is, the channel information indicating a channel of the two-way communication is transmitted from the source apparatus according to a function provided in the source apparatus and the sink apparatus. For example, if the source apparatus is configured as shown in FIG. 14, the source apparatus and the sink apparatus are capable of performing the full duplex communication, and thus, the channel information indicating that the IP communication in the full duplex mode, using the CEC line 84 and the reserved line 88, together with the SDA line 191 and the SCL line 192, is performed is transmitted from the source apparatus to the sink apparatus. As a result, the sink apparatus receives the channel information transmitted from the source apparatus via the switch 135 and the CEC line 84, and determines that the channel information has been received.

On the other hand, if the source apparatus is not provided with the function for performing the full duplex communication, the channel information is not transmitted from the source apparatus to the sink apparatus, and thus, the sink apparatus determines that the channel information has not been received.

If it is determined at step S115 that the channel information is received, the process proceeds to step S116 at which the switching control unit 172 controls the switch 185 and the switch 186 to switch the switch 185 and the switch 186 so that at a data transmitting time, the differential signal corresponding to the Rx data from the converting unit 184 is selected.

At step S117, the switching control unit 124 controls the switch 135 to switch the switch 135 so that at a data receiving time, the differential signal corresponding to the Tx data from the source apparatus is selected.

At step S118, the sink apparatus performs the two-way IP communication in the full duplex mode, with the source apparatus, and thus, the communication process is ended. That is, at a data transmitting time, the converting unit 184 converts the Rx data supplied from the control unit (CPU) of the sink apparatus into the differential signal, supplies one partial signal forming the differential signal obtained through the conversion to the switch 185, and supplies the other partial signal to the switch 186. The switch 185 and the switch 186 transmit the partial signals supplied from the converting unit 184 to the source apparatus via the SDA line 191 and the SCL line 192. In this way, the differential signal corresponding to the Rx data is transmitted from the sink apparatus to the source apparatus.

Also, at a data receiving time, the decoding unit 136 receives the differential signal transmitted from the source apparatus and corresponding to Tx data. That is, the switch 135 receives the partial signal of the differential signal transmitted from the source apparatus via the CEC line 84 and corresponding to the Tx data, and supplies the received partial signal to the decoding unit 136. The decoding unit 136 decodes the differential signal formed of the partial signal supplied from the switch 135 and the partial signal supplied from the source apparatus via the reserved line 88, into the TX data, which is the original data, and outputs the Tx data to the control unit (CPU).

In this way, the sink apparatus transmits and receives various data such as the control data, the pixel data, and the audio data, to and from the source apparatus.

Also if it is determined at step S115 that the channel information is not received, the sink apparatus transmits and receives the CEC signal to perform the two-way communication with the source apparatus at step S119, and the communication process is ended.

In this way, upon receipt of the channel information, the sink apparatus uses the CEC line 84 and the reserved line 88, together with the SDA line 191 and the SCL line 192, to perform the full duplex communication with the sink apparatus.

Thus, when the sink apparatus switches the switch 135, the switch 185, and the switch 186 to select the data to be transmitted and the data to be received, the full duplex communication is performed using the CEC line 84 and the reserved line 88, together with the SDA line 191 and the SCL line 192, with the source apparatus. In this way, a high-speed bi-directional communication may be performed while maintaining compatibility with the conventional HDMI.

Moreover, in an example in FIG. 14, the source apparatus is configured so that the CEC line 84 and the reserved line 88 are connected with the converting unit 131, and so that the SDA line 191 and the SCL line 192 are connected with the decoding unit 183. However, the source apparatus may be configured so that the CEC line 84 and the reserved line 88 are connected with the decoding unit 183, and so that the SDA line 191 and the SCL line 192 are connected with the converting unit 131.

In such a case, the switch 181 and the switch 182 are connected to the CEC line 84 and the reserved line 88, and also connected to the decoding unit 183. The switch 133 is connected to the SDA line 191, and also connected to the converting unit 131.

Likewise, the sink apparatus in FIG. 14 may also be configured so that the CEC line 84 and the reserved line 88 are connected with the converting unit 184, and so that the SDA line 191 and SCL line 192 are connected with the decoding unit 136. In such a case, the switch 185 and the switch 186 are connected to the CEC line 84 and the reserved line 88, and also connected to the converting unit 184. The switch 135 is connected to the SDA line 191, and also connected to the decoding unit 136.

Furthermore, in FIG. 13, the CEC line 84 and the reserved line 88 may be the SDA line 191 and the SCL line 192. That is, the converting unit 131 and the decoding unit 132 of the source apparatus, and the converting unit 134 and the decoding unit 136 of the sink apparatus may be connected to the SDA line 191 and the SCL line 192, and thereby, the source apparatus and the sink apparatus may perform the IP communication in the half duplex mode. Furthermore, in this case, the reserve line 88 may be used to detect the connection of the electronic apparatus.

Each of the source apparatus and the sink apparatus may be provided with both the function for performing the half duplex communication and the function for performing the full duplex communication. In such a case, depending on the function provided in the connected electronic apparatus, the source apparatus and the sink apparatus may be able to perform the IP communication in the half duplex mode or the full duplex mode.

Figure 21:
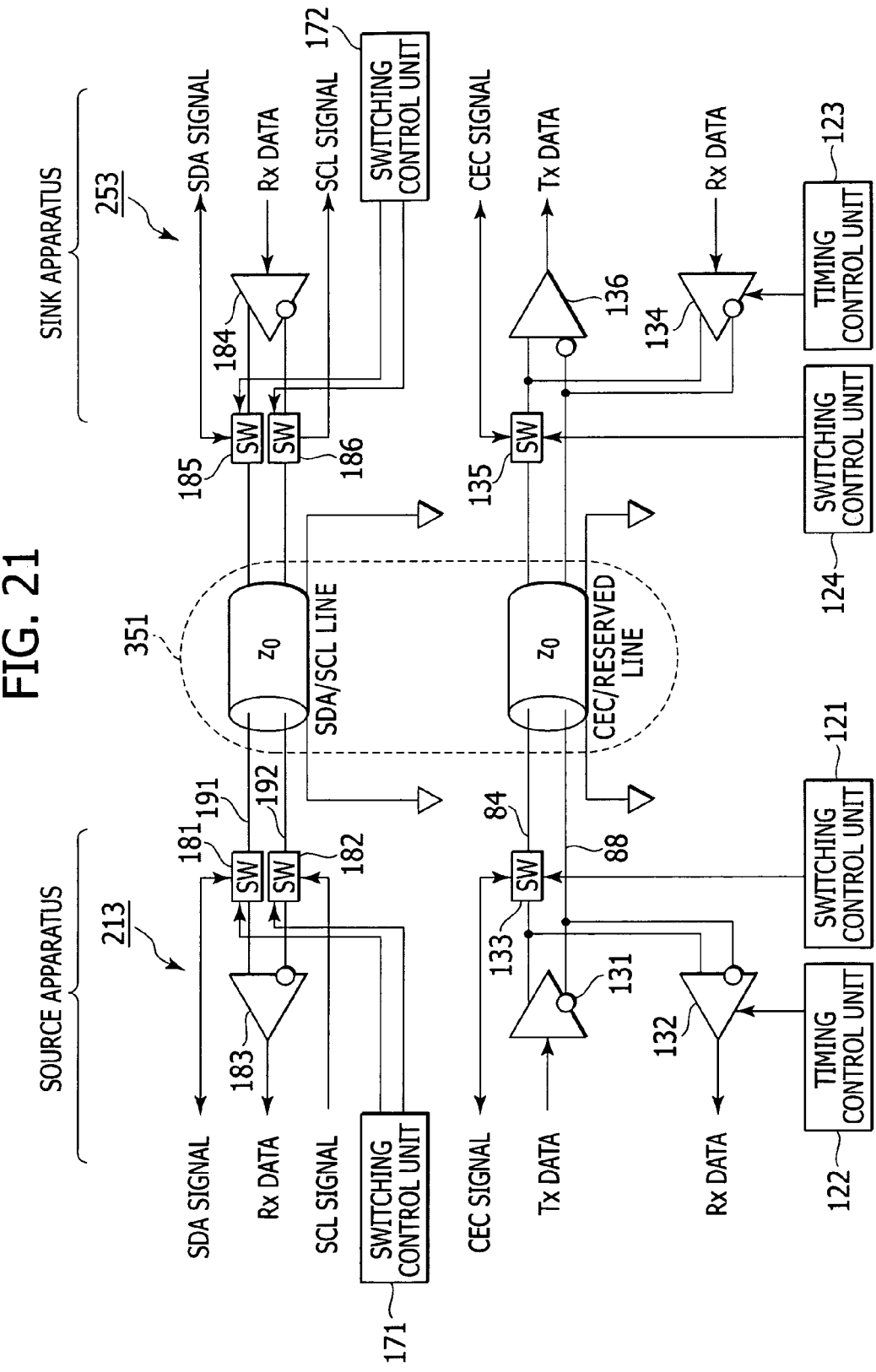
FIG. 21 is a connection diagram showing another configuration example of high-speed data line interfaces of the disc recorder and the television receiver.

If each of the source apparatus and the sink apparatus is provided with both the function for performing the half duplex communication and the function for performing the full duplex, the source apparatus and the sink apparatus are configured as shown in FIG. 21, for example. Moreover, in FIG. 21, portions corresponding to those in FIG. 13 or FIG. 14 are designated with the same numerals, and the description thereof is omitted, where appropriate.

The high-speed data line interface 213 of the source apparatus shown in FIG. 21 includes the converting unit 131, the decoding unit 132, the switch 133, the switch 181, the switch 182, the decoding unit 183, the switching control unit 121, the timing control unit 122, and the switching control unit 171. That is, the high-speed data line interface 213 in the source apparatus in FIG. 21 is so configured that the high-speed data line interface 213 in the source apparatus shown in FIG. 14 further includes the timing control unit 122 and the decoding unit 132 in FIG. 13.

Furthermore, the high-speed data line interface 213 in the sink apparatus shown in FIG. 21 includes the converting unit 134, the switch 135, the decoding unit 136, the converting unit 184, the switch 185, the switch 186, the timing control unit 123, the switching control unit 124, and the switching control unit 172. That is, the sink apparatus in FIG. 21 is so configured that the sink apparatus shown in FIG. 14 further includes the timing control unit 123 and the converting unit 134 in FIG. 13.

Next, a communication process of the source apparatus and the sink apparatus shown in FIG. 21 is described.

Figure 22:
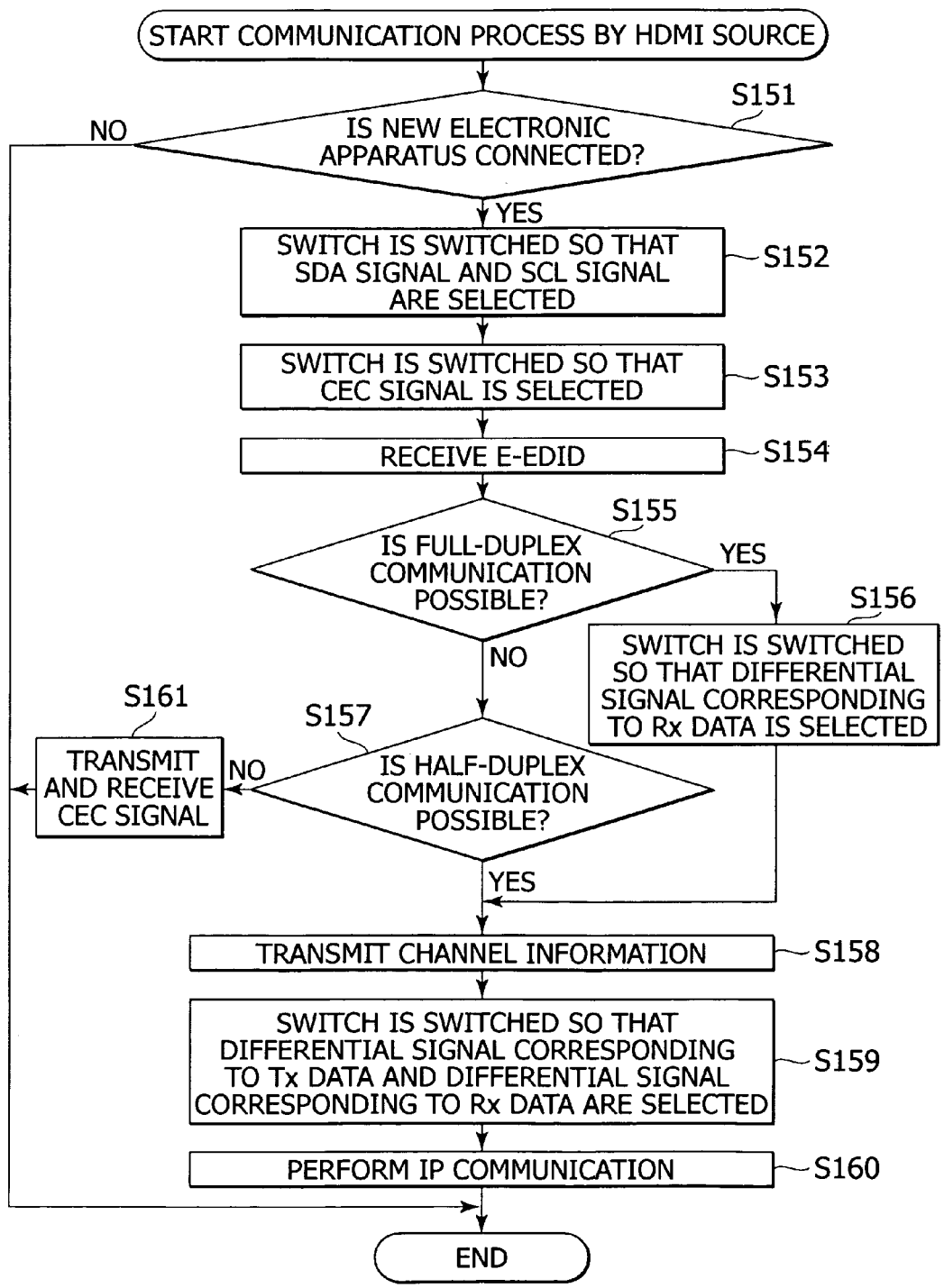
FIG. 22 is a flowchart describing a communication process by the source apparatus.

Firstly, the communication process of the source apparatus in FIG. 21 is described with reference to a flowchart in FIG. 22. Processes from the step S151 to the step S154 are the same as those of the step S71 to the step S74 in FIG. 19, respectively, and thus, the description thereof is omitted.

At step S155, the source apparatus determines whether the full duplex communication with the sink apparatus is possible. That is, the source apparatus refers to the E-EDID received from the sink apparatus to determine whether the full duplex flag "Full Duplex" in FIG. 16 is set.

If it is determined at step S155 that the full duplex communication is possible, i.e., if the sink apparatus shown in FIG. 21 or FIG. 14 is connected to the source apparatus, the switching control unit 171 controls the switch 181 and the switch 182 at step S156 to switch the switch 181 and the switch 182 so that at a data receiving time, the differential signal corresponding to the Rx data from the sink apparatus is selected.

On the other hand, if it is determined at step S155 that the full duplex communication is not possible, the source apparatus determines at step S157 whether the half duplex communication is possible. That is, the source apparatus refers to the received E-EDID to determine whether the half duplex flag "Half Duplex" in FIG. 16 is set. In other words, the source apparatus determines whether the sink apparatus shown in FIG. 13 is connected to the source apparatus.

If it is determined at step S157 that the half duplex communication is possible, or if the switch 181 and the switch 182 are switched at step S156, the source apparatus transmits the channel information to the sink apparatus via the switch 133 and the CEC line 84 at step S158.

Herein, if it is determined at step S155 that the full duplex communication is possible, the sink apparatus has the function for performing the full duplex communication. The source apparatus thus transmits, as the channel information, the signal indicating that the IP communication using the CEC line 84 and the reserved line 88, together with the SDA line 191 and the SCL line 192, is performed, to the sink apparatus via the switch 133 and the CEC line 84.

Also, if it is determined at step S157 that the half duplex communication is possible, the sink apparatus does not have the function for performing the full duplex communication but has the function for performing the half duplex communication. The source apparatus thus transmits, as the channel information, the signal indicating that the IP communication using the CEC line 84 and the reserved line 88 is performed, to the sink apparatus via the switch 133 and the CEC line 84.

At step S159, the switching control unit 121 controls the switch 133 to switch the switch 133 so that at a data transmitting time, the differential signal corresponding to the Tx data from the converting unit 131 is selected, and so that at a data receiving time, the differential signal corresponding to the Rx data transmitted from the sink apparatus is selected. Moreover, if the source apparatus and the sink apparatus perform the full duplex communication, the differential signal corresponding to the Rx data is not transmitted via the CEC line 84 and the reserved line 88 from the sink apparatus during a data receiving time of the source apparatus. Thus, the differential signal corresponding to the Rx data is not supplied to the decoding unit 132.

At step S160, the source apparatus performs the two-way IP communication with the sink apparatus, and the communicating process is ended. That is, if the source apparatus performs the full duplex communication or if the source apparatus performs the half duplex communication with the sink apparatus, the converting unit 131 converts the Tx data supplied from the control unit (CPU) of the source apparatus into the differential signal at a data transmitting time, transmits one partial signal forming the differential signal obtained through the conversion to the sink apparatus via the switch 133 and the CEC line 84, and transmits the other partial signal to the sink apparatus via the reserved line 88.

Also, if the source apparatus performs the full duplex communication with the sink apparatus, the decoding unit 183 receives the differential signal corresponding to the Rx data transmitted from the sink apparatus at a data receiving time, decodes the received differential signal into the Rx data, which is the original data, and outputs the Rx data to the control unit (CPU).

On the other hand, if the source apparatus performs the half duplex communication with the sink apparatus, the decoding unit 132 under the control of the timing control unit 122 receives the differential signal corresponding to the Rx data transmitted from the sink apparatus at a data receiving time, decodes the received differential signal into the Rx data, which is the original data, and outputs the Rx data to the control unit (CPU).

In this way, the source apparatus transmits and receives various data such as the control data, the pixel data, and the audio data, to and from the sink apparatus.

Also if it is determined at step S157 that the half duplex communication is not possible, the source apparatus transmits and receives the CEC signal via the CEC line 84 at step S161 thereby to perform the two-way communication with the sink apparatus, and then, the communicating process is ended.

In this way, the source apparatus refers to the full duplex flag and the half duplex flag to perform one of the full duplex communication and the half duplex communication according to the function provided in the sink apparatus which is a communication partner.

Thus, according to the function provided in the sink apparatus which is the communication partner, the switch 133, the switch 181, and the switch 182 are switched to select the data to be transmitted and the data to be received, thereby performing one of the full duplex communication and the half duplex communication. As a result, a more appropriate communicating method is selected while maintaining compatibility with the conventional HDMI, and a high-speed bi-directional communication may be performed.

Figure 23:
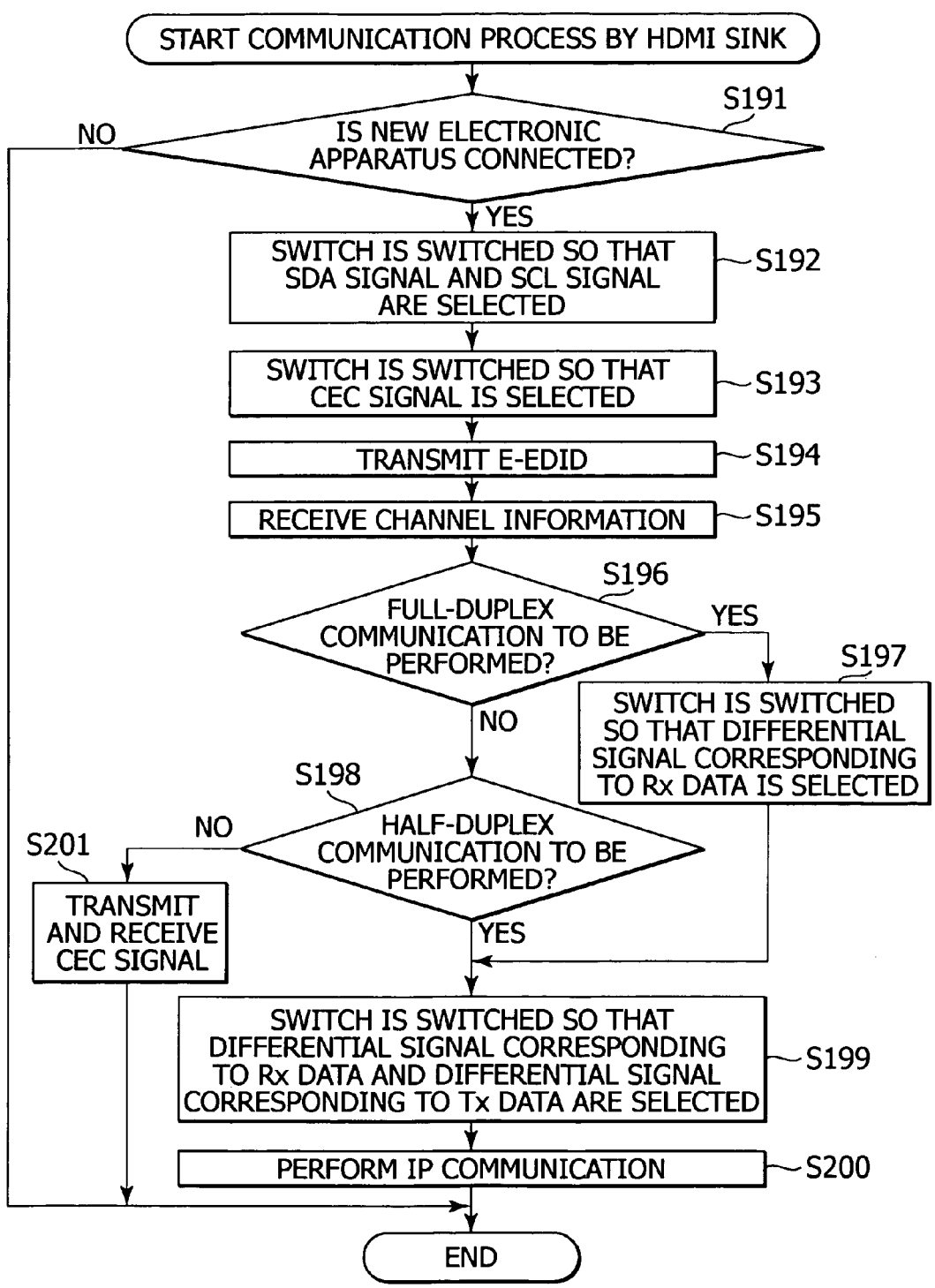
FIG. 23 is a flowchart describing a communication process by the sink apparatus.

Next, the communication process of the sink apparatus in FIG. 21 is described with reference to a flowchart in FIG. 23. Processes from the step S191 to the step S194 are the same as those of the step S111 to the step S114 in FIG. 20, respectively, and thus, the description thereof is omitted.

At step S195, the sink apparatus receives the channel information transmitted from the source apparatus via the switch 135 and the CEC line 84. Moreover, if the source apparatus connected to the sink apparatus has neither the function for performing the full duplex communication nor the function for performing the half duplex communication, no channel information is transmitted from the source apparatus to the sink apparatus, and thus, the sink apparatus does not receive the channel information.

At step S196, the sink apparatus determines whether to perform the full duplex communication based on the received channel information. For example, upon receipt of the channel information indicating that the IP communication using the CEC line 84 and the reserved line 88, together with the SDA line 191 and the SCL line 192, is performed, the sink apparatus determines that the full duplex communication is to be performed.

If it is determined at step S196 that the full duplex communication is to be performed, the switching control unit 172 controls the switch 185 and the switch 186 at step S197 to switch the switch 185 and the switch 186 so that at a data transmitting time, the differential signal corresponding to the Rx data from the converting unit 184 is selected.

Also, if it is determined at step S196 that the full duplex communication is not to be performed, the sink apparatus determines whether to perform the half duplex communication based on the received channel information at step S198. For example, upon receipt of the channel information indicating that the IP communication using the CEC line 84 and the reserved line 88 is performed, the sink apparatus determines that the half duplex communication is to be performed.

If it is determined at step S198 that the half duplex communication is to performed or if the switch 185 and the switch 186 are switched at step S197, the switching control unit 124 controls the switch 135 at step S199 to switch the switch 135 so that at a data transmitting time, the differential signal corresponding to the Rx data from the converting unit 134 is selected and so that at a data receiving time, the differential signal corresponding to Tx data from the source apparatus is selected.

Moreover, if the source apparatus and the sink apparatus perform the full duplex communication, the differential signal corresponding to the Rx data is not transmitted from the converting unit 134 to the transmitter 81 at a data transmitting time in the sink apparatus, and thus, the differential signal corresponding to the Rx data is not supplied to the switch 135.

At step S200, the sink apparatus performs the two-way IP communication with the source apparatus, and thus, the communication process is ended.

That is, if the sink apparatus performs the full duplex communication with the source apparatus, the converting unit 184 converts at a data transmitting time the Rx data supplied from the control unit (CPU) of the sink apparatus into the differential signal, transmits one partial signal forming the differential signal obtained through the conversion to the source apparatus via the switch 185 and the SDA line 191, and transmits the other partial signal to the source apparatus via the switch 186 and the SCL line 192.

Also, if the sink apparatus performs the half duplex communication with the source apparatus, the converting unit 134 converts at a data transmitting time the Rx data supplied from the control unit (CPU) of the sink apparatus into the differential signal, transmits one partial signal forming the differential signal obtained through the conversion to the transmitter 81 via the switch 135 and the CEC line 84, and transmits the other partial signal to the source apparatus via the reserved line 88.

Furthermore, if the sink apparatus performs the full duplex communication and the half duplex communication with the source apparatus, the decoding unit 136 receives at a data receiving time the differential signal corresponding to the Tx data transmitted from the source apparatus, decodes the received differential signal into the Tx data, which is the original data, and outputs the Tx data to the control unit (CPU).

Also, if it is determined at step S198 that the half duplex communication is not to be performed, i.e., if the channel information is not transmitted, for example, the sink apparatus transmits and receives the CEC signal at step S201 to perform the two-way communication with the source apparatus, and then, the communication process is ended.

In this way, the sink apparatus performs one of the full duplex communication and the half duplex communication depending on the received channel information, i.e., depending on the function provided in the source apparatus which is a communication partner.

In this way, according to the function provided in the source apparatus which is the communication partner, the switch 135, the switch 185, and the switch 186 are switched to select the data to be transmitted and the data to be received, thereby performing one of the full duplex communication and the half duplex communication. As a result, a more appropriate communicating method is selected while maintaining compatibility with the conventional HDMI (R), and a high-speed bi-directional communication may be performed.

Moreover, the source apparatus and the sink apparatus are connected by the HDMI cable 351 including the CEC line 84 and the reserved line 88, each of which lines is shielded through differential-twist-pair coupling with each other and connected to a grounding line, and the SDA line 191 and the SCL line 192, each of which lines is shielded through differential-twist-pair coupling with each other and connected to a grounding line. The high-speed two-way IP communication can thus be performed in the half duplex mode or the full duplex mode while maintaining compatibility with the conventional HDMI cable.

Next, a series of above-described processes may be performed not only using dedicated hardware but also using software. If the series of processes are performed using the software, a program configuring the software is installed to a microcomputer, etc., which controls the source apparatus and the sink apparatus, for example.

Therefore, FIG. 24 shows a configuration example of one embodiment of a computer in which the program for executing a series of above-described processes is installed.

The program may be recorded beforehand in EEPROM (Electrically Erasable Programmable Read-only Memory) 305 or ROM 303, as a recording medium contained in the computer.

Alternately, the program may be stored (recorded) temporarily or eternally in a removable recording medium such as a flexible disc, a CD-ROM (Compact Disc Read Only Memory), an MO (Magneto Optical) disc, a DVD (Digital Versatile Disc), a magnetic disc, and a semiconductor memory. Such a removable recording medium may be provided as so-called package software.

Moreover, the program may not only be installed from the above-described removable recording medium into the computer but also installed by wirelessly transmitting the program to the computer from a download site via an artificial satellite for a digital satellite broadcast, or by transmitting the program to the computer in a wired fashion via a network such as a LAN and the Internet. The computer receives the thus transmitted program thus by the input/output interface 360 so that the program may be installed in the contained EEPROM 305.

The computer contains a CPU (Central Processing Unit) 302. The CPU 302 is connected with an input/output interface 306 via a bus 301, and the CPU 302 loads the program stored in the ROM (Read Only Memory) 303 or the EEPROM 305 into the RAM (Random Access Memory) 304, and executes the loaded program. In this way, the CPU 302 performs the process of the above-described flowchart, and alternatively, performs the process performed by the configurations shown in the above-described block diagrams.

Processing steps setting forth a program for causing the computer to perform various kinds of processes are not always required to be processed in a time sequential order set forth as in the flowchart in the present specification. The process may include those to be carried out in a parallel manner or separately (for example, parallel processing or processing using objects). Furthermore, the program may be processed by means of a single computer, and alternatively, implemented as distributed processing by means of a plurality of computers.

Figure 25:
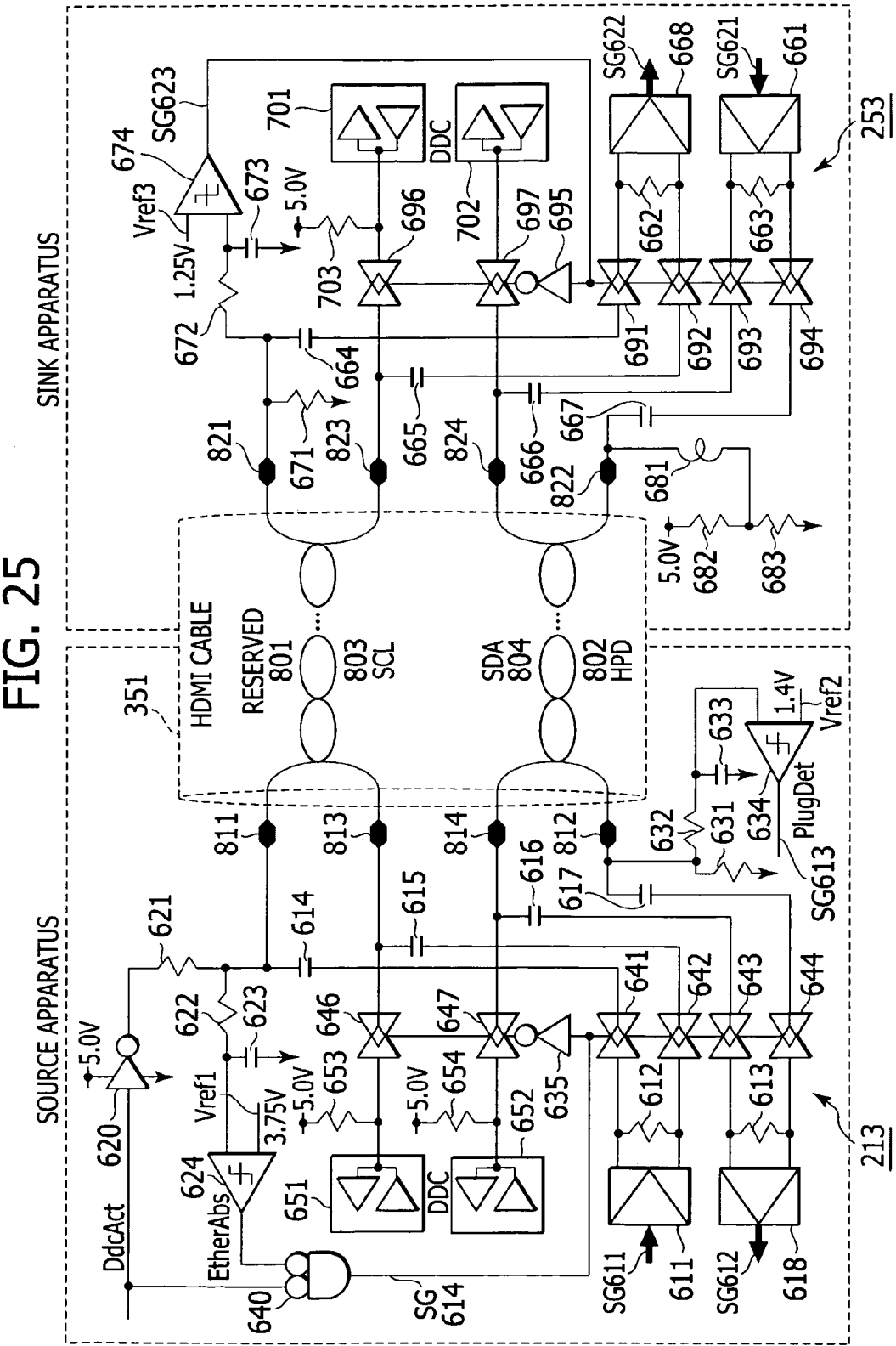
FIG. 25 is a connection diagram showing yet another configuration example of high-speed data line interfaces of the disc recorder and the television receiver.

The configuration example shown in FIG. 9 allows a circuit to be constructed for the LAN communication irrespective of an electrical specification formulated about the DDC. However, FIG. 25 shows another configuration example having a similar effect.

This example shows an interface that performs, with a single cable, a data transport of video and audio, an exchange and verification of connection-apparatus information, a communication of apparatus control data, and a LAN communication. The interface is characterized in that the LAN communication is performed by a single-direction communication via two pairs of differential transport channels, that the interface has a configuration in which a connection state of the interface is notified by at least one DC bias potential of the transport channel, and that at least two transport channels are used for a communication for exchanging and verifying the connection-apparatus information in a time division manner with the LAN communication.

The source apparatus includes a LAN signal transmitting circuit 611, end-terminal resistances 612 and 613, AC-coupling capacitances 614 to 617, a LAN signal receiving circuit 618, an inverter 620, a resistance 621, a resistance 622 and capacitance 623 forming a low-pulse filter, a comparator 624, a pull-down resistance 631, a resistance 632 and a capacitance 633 forming a low-pass filter, a comparator 634, a NOR gate 640, analog switches 641 to 644, an inverter 645, analog switches 646 and 747, DDC transceivers 651 and 652, and pull-up resistances 653 and 654.

The sink apparatus 602 includes a LAN signal transmitting circuit 661, end-terminal resistances 662 and 663, AC-coupling capacitances 664 to 667, a LAN signal receiving circuit 668, a pull-down resistance 671, a resistance 672 and a capacitance 673 forming a low-pulse filter, a comparator 674, a choke coil 681, resistances 682 and 683 connected in series between a power supply potential and a reference potential, analog switches 691 to 694, an inverter 695, analog switches 696 and 697, DDC transceivers 701 and 702, and pull-up resistances 703 and 704.

The HDMI cable 351 includes a differential transport channel formed of a reserved line 801 and an SCL line 803 and a differential transport channel formed of an SDA line 804 and an HPD line 802. Source-side terminals 811 to 814 and sink-side terminals 821 to 824 of those lines are formed.

The reserved line 801 and the SCL line 803 and the SDA line 804 and the HPD line 802 are coupled as differential twisted pairs.

In the source apparatus, the terminals 811 and 813 are connected, via the AC-coupling capacitances 614 and 605 and the analog switches 641 and 642, to a transmitting circuit 611 for transmitting a LAN transmission signal SG611 to the sink and the end-terminal resistance 612. The terminals 814 and 812 are connected, via the AC-coupling capacitances 616 and 617 and the analog switches 643 and 644, to a receiving circuit 618 for receiving the LAN signal from the sink apparatus and the end-terminal resistance 613.

In the sink apparatus, the terminals 821 to 824 are connected, via the AC-coupling capacitances 664, 665, 666, and 667 and the analog switches 691 to 694, to the transmitting circuit 661, the receiving circuit 668, and the end-terminal resistances 662 and 663. When the LAN communication is performed, the analog switches 641 to 644 and 691 to 694 are conductive, and when the DDC communication is performed, these switches are opened.

In the source apparatus, the terminal 813 and the terminal 814 are connected, via the other analog switches 646 and 647, to the DDC transceivers 651 and 652 and the pull-up resistances 653 and 654.

In the sink apparatus, the terminal 823 and the terminal 824 are connected, via the analog switches 696 and 697, to the DDC transceivers 701 and 702 and the pull-up resistance 703. When the DDC communication is performed, the analog switches 646 and 647 are conductive, and when the LAN communication is performed, these switches are opened.

A recognition mechanism of the e-HDMI compatible apparatus by the potential of the reserved line 801 is basically similar to the example shown in FIG. 9 except that the resistance 62 of the source apparatus 601 is driven by the inverter 620.

When input of the inverter 620 is HIGH, the resistance 621 becomes a pull-down resistance, and thus, as viewed from the sink apparatus, a 0-V state similar to a case that the e-HDMI non-compatible apparatus is connected is established. As a result, a signal SG623 indicating an e-HDMI compatibility recognition result of the sink apparatus becomes LOW, and thus, the analog switches 691 to 694 controlled by the signal SG623 are opened, and the analog switches 696 and 697 controlled by a signal obtained by inverting the signal SG623 by the inverter 695 are conductive. As a result, the sink apparatus 602 keeps the SCL line 803 and the SDA line 804 isolated from a LAN transmitting and receiver, thereby establishing a state of being connected to a DDC transmitting and receiving device.

On the other hand, in the source apparatus, an input of the inverter 620 is also inputted to the NOR gates 640, and an output SG614 thereof is rendered LOW. The analog switches 641 to 644 controlled by the output signal SG614 of the NOR gates 640 are opened, and the analog switches 646 and 647 controlled by a signal obtained by inverting the signal SG614 by the inverter 645 are conductive. As a result, also, the source apparatus 601 keeps the SCL line 803 and the SDA line 804 isolated from the LAN transmitting and receiving device, thereby establishing a state of being connected to the DDC transmitting and receiving device.

On the contrary, when the input of the inverter 620 is LOW, both the source apparatus and the sink apparatus keep the SCL line 803 and the SDA line 804 isolated from the DDC transmitting and receiving device, thereby establishing a state of being connected to the LAN transmitting and receiving device.

The circuits 631 to 634 and 681 to 683 for confirming the connection by a DC bias potential of the HPD line 802 have a function similar to that in the example shown in FIG. 9. That is, the HPD line 802 notifies the source apparatus of a connection of the cable 351 to the sink apparatus by a DC bias level, besides the above-described LAN communication. When the cable 351 is connected to the sink apparatus, the resistances 682 and 683 and the choke coil 681 within the sink apparatus bias the HPD line 802 to about 4V via the terminal 822.

The source apparatus extracts the DC bias of the HPD line 802 by the low-pass filter formed of the resistance 632 and the capacitance 633, and compares the extracted DC bias with a reference potential Vref2 (for example, 1.4V) in the comparator 634. If the cable 351 is not connected to the sink apparatus, the potential of the terminal 812 is lower than the reference potential Vref2 because of the pull-down resistance 631, and if the cable 351 is connected, the potential thereof is higher than the reference potential Vref2. Therefore, when an output signal SG613 of the comparator 634 is HIGH, it indicates that the cable 351 and the sink apparatus are connected. On the other hand, when the output signal SG613 of the comparator 634 is LOW, it indicates that the cable 351 and the sink apparatus are not connected.

Thus, according to the configuration example shown in FIG. 25, the interface performs with a single cable a data transport of video and audio, an exchange and verification of connected apparatus information, a communication of apparatus control data, and a LAN communication. The interface is so configured that the LAN communication is performed by a single-direction communication via two pairs of differential transport channels, that a configuration is provided so that a connection state of the interface is notified by at least one DC bias potential of the transport channel, and that at least two transport channels are used for a communication for exchanging and verifying the connection-apparatus information in a time division manner with the LAN communication. Thus, a time division for dividing into a time zone in which the SCL line and the SDA line are connected to the LAN communication circuit by the switch and a time zone in which these lines are connected to the DDC circuit may be performed. This division allows the circuit for the LAN communication to be formed irrespective of an electrical specification formulated about the DDC, and thus, a stable and reliable LAN communication may be realized at a low cost.

Furthermore, the resistance 621 shown in FIG. 25 may be arranged within the HDMI cable 351 not within the source apparatus. In such a case, the terminals of the resistance 621 are connected to, out of the lines arranged within the HDMI cable 351, the reserved line 801 and the line (signal line) connected to the power supply (power supply potential), respectively.

Furthermore, the pull-down resistance 671 and the resistance 683 shown in FIG. 25 may be arranged within the HDMI cable 351 not within the sink apparatus. In such a case, the terminals of the pull-down resistance 671 are connected to, out of the lines arranged within the HDMI cable 351, the reserved line 801 and the line (grounding line) connected to the ground (reference potential), respectively. Furthermore, the terminals of the resistance 683 are connected to, out of the lines arranged within the HDMI cable 351, the HPD line 802 and the line (grounding line) connected to the ground (reference potential), respectively.

The SDA and the SCL are those for performing a pull-down communication in which H is a 1.5-KΩ pull-up and L is a low impedance. The CEC also is that for performing a pull-down communication in which H is a 27-KΩ pull-up and L is a low impedance. When these functions are maintained to keep compatibility with the existing HDMI, it may probably become difficult to share a function of the LAN for performing a high-speed data communication that requires that end terminals of a transport line channel be terminated in matched condition.

In the configuration examples in FIG. 9 and FIG. 25, such a problem can be avoided. That is, the configuration example in FIG. 9 is so configured that the use of the SDA, SCL, and CEC lines is avoided, and that the reserved line and the HPD line are used as a differential pair to perform the full duplex communication in a 1-pair bi-directional communication. The configuration example in FIG. 25 is so configured to perform a 2-pair full duplex communication in which the HPD line and the SDA line, together with the SCL line and the reserved line, are used to form two sets of differentials pairs, and a single-direction communication is performed in each of the sets.

FIGS. 26(A) to 26(E) show bi-directional communication waveforms in the configuration example in FIG. 9 or the configuration example in FIG. 25.

Figure 26:
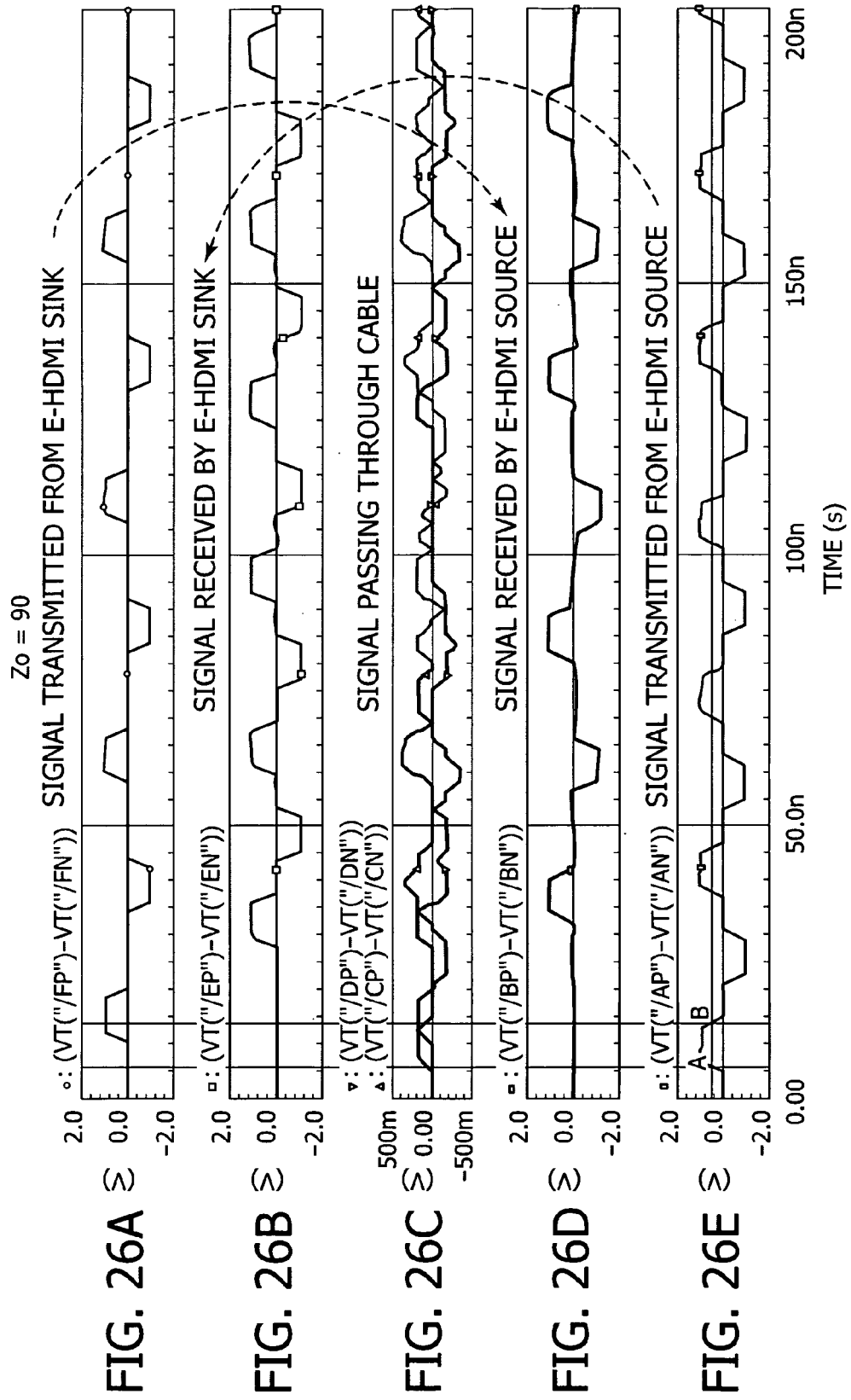
FIG. 26 is a diagram showing waveforms of a bi-directional communication.
Figure 27:
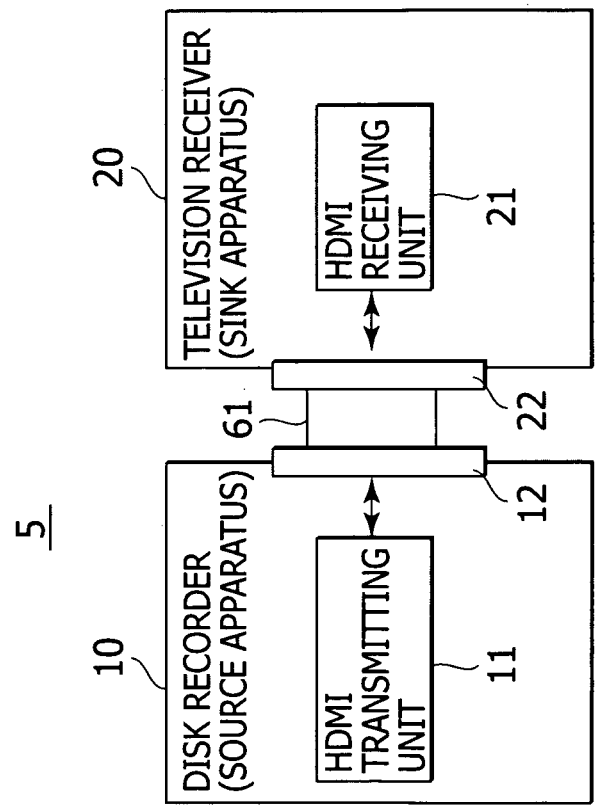
FIG. 27 is a block diagram showing a configuration example of the AV system.
Figure 28:
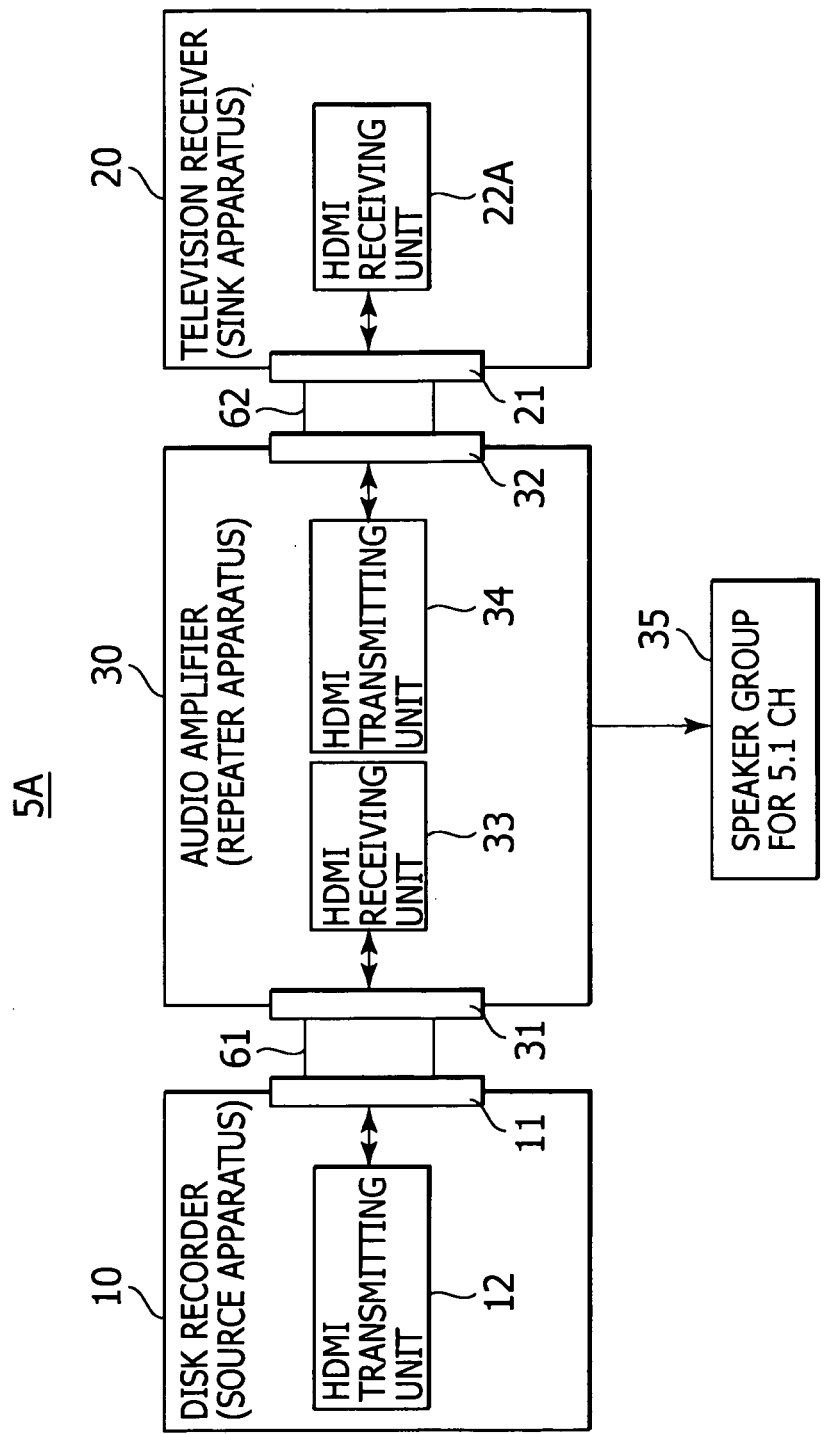
FIG. 28 is a block diagram showing another configuration example of the AV system.
Figure 29:
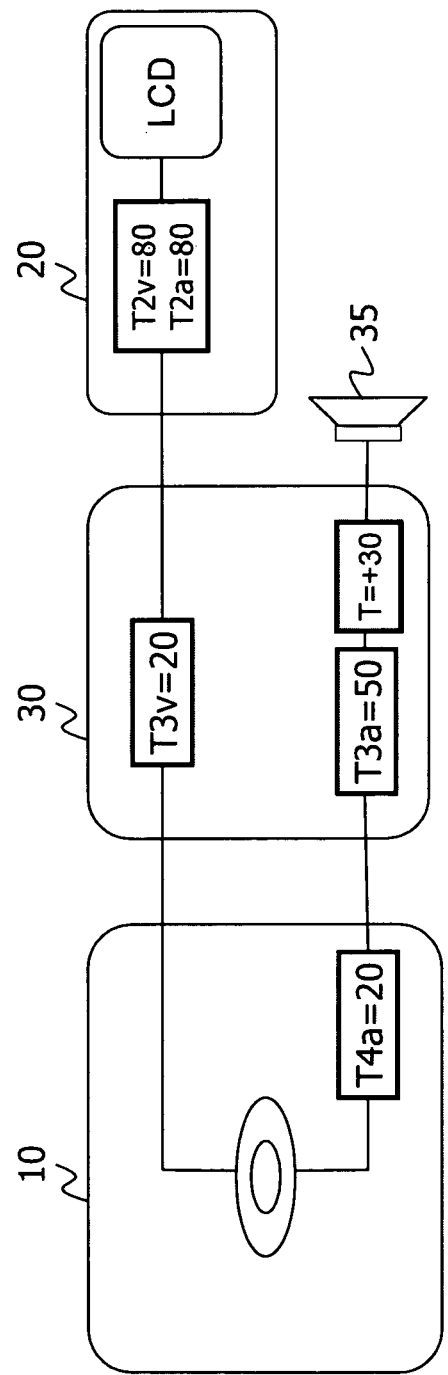
FIG. 29 is a diagram describing a synchronization process between an image and an audio.

FIG. 26(A) shows a waveform of a signal transmitted from the source apparatus, FIG. 26(B) shows a waveform of a signal received by the sink apparatus, FIG. 26(C) shows a waveform of a signal passing through a cable, FIG. 26(D) shows a waveform of a signal received by the source apparatus, and FIG. 26(E) shows a waveform of a signal transmitted from the source apparatus, respectively. As is apparent from FIGS. 26, according to the configuration example in FIG. 9 or FIG. 25, a good bi-directional communication may be realized.

Moreover, in the aforementioned embodiment, both the television receiver 250 and the audio amplifier 310 are e-HDMI compatible apparatuses, and the communication of the audio data, the delay information, etc., between the television receiver 250 and the audio amplifier 310 is performed by a high-speed data line. However, the present invention can be applied even to a case that the audio output device of the audio amplifier, etc., connected to the television receiver 250 is not an e-HDMI compatible apparatus. In this case, the television receiver 250 and the audio output device are connected via a different digital interface, and the communication of the audio data, the delay information, etc., is performed. For example, the television receiver 250 and the audio output device may be connected via a network terminal so as to perform the communication by Ethernet.

Furthermore, in the aforementioned embodiment, when the television receiver 250 computes the delay time T2a' of the audio signal transmitted from the television receiver 250 to the audio amplifier 310, the delay information (T4a) transported from the disc recorder 210 is used in addition to the video delay information (T2v) stored as the EDID data and the information of the time T2c required until the audio data (audio signal) received from the disc recorder 210 is transmitted to the audio amplifier 310.

However, for example, when there is no time difference between the image data (video signal) and the audio data (audio signal) outputted from the disc recorder 210, the delay information (T4a) is sometimes not transported from the disc recorder 210. In this case, upon computing of the delay time T2a', only the video delay information (T2v) stored as the EDID data and the time T2c required until the audio data (audio signal) received from the disc recorder 210 is transmitted to the audio amplifier 310 are to be used.

Moreover, the embodiment is described on the assumption of the interface that complies with an HDMI standard as the transport channel that connects each apparatus. However, the present invention may be applicable to other similar transport standards. Furthermore, there has been shown an example in which the disc recorder is used as the source apparatus and the television receiver is used as the sink apparatus. However, the present invention can be similarly applied to an example in which another transmitting device, and another receiving device are used.

In the embodiment, the electronic apparatuses are connected with each other by the HDMI cable. However, the present invention is similarly applicable to a case that the electronic apparatuses are wirelessly connected with each other.

Industrial Applicability

According to the present invention, for example, the synchronization of an audio output with a displayed image can be easily performed when an audio output device receives an audio signal from a sink apparatus and the present invention can be applied to a system such as an AV system that is so configured that the audio output is obtained by supplying audio data from a source apparatus to the audio output device via the sink apparatus.

The invention claimed is:

1. A receiving device, comprising:
a signal receiving unit configured to receive a video signal and an audio signal via a transport channel from an external apparatus;
a delay-information receiving unit configured to receive, from the external apparatus via the transport channel, delay information indicating the delay time (T4a) of the audio signal received by the signal receiving unit with respect to the video signal received by the signal receiving unit;
an image display unit configured to process the video signal received by the signal receiving unit to display an image;
an audio output unit configured to process the audio signal received by the signal receiving unit to output an audio;
a storage unit configured to store video delay information indicating a delay time (T2v) lasting until the image responsive to the video signal received by the signal receiving unit is displayed on the image display unit and audio delay information indicating a delay time (T2c) lasting until the audio responsive to the audio signal received by the signal receiving unit is outputted by the audio output unit;

an audio-signal transmitting unit configured to transmit the audio signal received by the signal receiving unit to another external apparatus different from the external apparatus via another transport channel different from the transport channel;
a computing unit configured to compute a delay time (T2a') of the image displayed on the image display unit with respect to the audio signal to be transmitted from the audio-signal transmitting unit, wherein the computing device computes the delay time (T2a') using the equation:

$$T2a'=T2v-T4a-T2c;\text{ and}$$

a delay-information transmitting unit configured to transmit, to the other external apparatus, delay information indicating the delay time (T2a') obtained by the computing unit.

2. The receiving device according to claim 1, wherein the delay-information receiving unit extracts the delay information from the video signal received by the signal receiving unit from within a blanking period of the video signal.

3. The receiving device according to claim 1, wherein the delay-information receiving unit receives the delay information via a control data line configuring the transport channel.

4. The receiving device according to claim 1, wherein the signal receiving unit receives the video signal from the external apparatus by a differential signal through a plurality of channels and also extracts the audio signal from the video signal from within a blanking period thereof.

5. The receiving device according to claim 1, wherein the audio-signal transmitting unit transmits the audio signal to the other external apparatus via a digital interface.

6. The receiving device according to claim 5, further comprising a communicating unit configured to a bi-directional communication via predetermined lines configuring the other transport channel, wherein the audio-signal transmitting unit transmits the audio signal to the other external apparatus by the communicating unit.

7. The receiving device according to claim 1, wherein the delay-information transmitting unit transmits the delay information to the external apparatus via a digital interface.

8. The receiving device according to claim 7, further comprising a communicating unit configured to a bi-directional communication via predetermined lines configuring the other transport channel, wherein the delay-information transmitting unit transmits the delay information to the other external apparatus via the communicating unit.

9. The receiving device according to claim 1, further comprising a request-signal receiving unit configured to receive a request signal requesting the delay information from the other external apparatus, wherein the delay-information transmitting unit transmits the delay information to the other external apparatus when the request signal is received by the request-signal receiving unit.

10. A delay-information transmitting method in a receiving device, the receiving device including:
a signal receiving unit configured to a video signal and an audio signal via a transport channel from an external apparatus,
a delay-information receiving unit for receiving, from the external apparatus via the transport channel, delay information indicating the delay time (T4a) of the audio signal received by the signal receiving unit with respect to the video signal received by the signal receiving unit,
an image display unit configured to process the video signal received by the signal receiving unit to display an image,
an audio output unit configured to process the audio signal received by the signal receiving unit to output an audio, and
an audio-signal transmitting unit configured to transmit the audio signal received by the signal receiving unit to another external apparatus different from the external apparatus via another transport channel different from the transport channel, the delay-information transmitting method, comprising:
a computing step of computing delay information indicating a delay time (T2a') of the image displayed on the image display unit with respect to the audio signal to be transmitted from the audio-signal transmitting unit, based on at least: the delay time (T4a);
video delay information indicating a delay time (T2v) until the image to be displayed by the video signal received by the signal receiving unit is displayed on the image display unit; and audio delay information of a time (T2c) required until the audio signal received by the signal receiving unit is transmitted by the audio-signal transmitting unit, wherein the computing step computes the delay time (T2a') using the equation:

$$T2a'=T2v-T4a-T2c;\text{ and}$$

a delay-information transmitting step of transmitting the delay information computed at the computing step to the other external apparatus when a request signal requesting the delay information is received from the other external apparatus.

11. An audio output device, comprising:
an audio-signal receiving unit configured to receive an audio signal via a transport channel from an external apparatus;
an audio output unit configured to process the audio signal received by the audio-signal receiving unit to output an audio;
a delay-information receiving unit configured to receive, from the external apparatus, delay information indicating a delay time (T2a') of a displayed image in the external apparatus with respect to the audio signal received by the audio-signal receiving unit; and
a delay controller configured to control a delay time (T) lasting until the audio responsive to the audio signal received by the audio-signal receiving unit is outputted by the audio output unit so that the delay time matches the delay time (T2a') indicated by the delay information received by the delay-information receiving unit, wherein the delay controller controls the delay time (T) based on a time (T5a) required for processing the audio signal, the delay time (T) being computed using the equation:

$$T=T2a'-T5a.$$

12. The audio output device according to claim 11, wherein the audio-signal receiving unit receives the audio signal from the external apparatus via a digital interface.

13. The audio output device according to claim 12, further comprising a communicating unit configured to perform a bi-directional communication via predetermined lines configuring the transport channel, wherein the audio-signal receiving unit receives the audio signal from the external apparatus via the communicating unit.

14. The audio output device according to claim 11, wherein the delay-information receiving unit receives the delay information from the other external apparatus via a digital interface.

15. The audio output device according to claim 14, further comprising a communicating unit configured to perform a bi-directional communication via predetermined lines configuring the transport channel, wherein the delay-information receiving unit receives the delay information from the other external apparatus via the communicating unit.

16. The audio output device according to claim 11, further comprising a request-signal transmitting unit configured to transmit a request signal requesting the delay information to the external apparatus.

17. A delay-control method in an audio output device, the audio output device including an audio-signal receiving unit configured to receive an audio signal via a transport channel from an external apparatus, and an audio output unit configured to process the audio signal received by the audio-signal receiving unit to output an audio, the delay-control method, comprising:

a delay-information receiving step of receiving, from the external apparatus, delay information indicating a delay time ($T2a'$) of a displayed image in the external apparatus with respect to the audio signal received by the audio-signal receiving unit; and a delay control step of controlling a delay time (T) lasting until the audio responsive to the audio signal received by the audio-signal receiving unit is outputted by the audio output unit so that the delay time matches the delay time ($T2a'$) indicated by the delay information received by the delay-information receiving step, wherein the delay controller controls the delay time (T) based on a time ($T5a$) required for processing the audio signal, the delay time (T) being computed using the equation:

$T=T2a'-T5a.$

* * * * *